US012592380B2

(12) United States Patent
Yushin et al.

(10) Patent No.: US 12,592,380 B2
(45) Date of Patent: Mar. 31, 2026

(54) BATTERY ELECTRODE COMPOSITION COMPRISING CARBON AND SILICON WITH SPECIFIC PROPERTIES FOR SUPERIOR PERFORMANCE

(71) Applicant: Sila Nanotechnologies Inc., Alameda, CA (US)

(72) Inventors: Gleb Yushin, Atlanta, GA (US); Matthew Clark, Oakland, CA (US); Adam Kajdos, Stockton, CA (US); Timothy Milakovich, San Francisco, CA (US); Saujan Sivaram, Castro Valley, CA (US); Valentin Lulevich, Stockton, CA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 616 days.

(21) Appl. No.: 17/930,366

(22) Filed: Sep. 7, 2022

(65) Prior Publication Data

US 2023/0079476 A1      Mar. 16, 2023

Related U.S. Application Data

(60) Provisional application No. 63/241,407, filed on Sep. 7, 2021.

(51) Int. Cl.
*H01M 4/36*          (2006.01)
*H01M 4/38*          (2006.01)
          (Continued)

(52) U.S. Cl.
CPC ........... *H01M 4/362* (2013.01); *H01M 4/386* (2013.01); *H01M 4/625* (2013.01);
          (Continued)

(58) Field of Classification Search
None
See application file for complete search history.

(56) References Cited

U.S. PATENT DOCUMENTS

| | | | |
|---|---|---|---|
| 11,688,854 B2 * | 6/2023 | Park | H01M 4/133 |
| | | | 429/209 |
| 2013/0252082 A1 | 9/2013 | Thompkins et al. | |

(Continued)

FOREIGN PATENT DOCUMENTS

JP          2007290936 A      11/2007

OTHER PUBLICATIONS

Garcia-Negron et al., "Elucidating nano and mesa-structures of lignin carbon composites: A comprehensive study of feedstock and temperature dependence," www.elsevier.com/locate/carbon, Carbon 161 (2020) pp. 856-869.

(Continued)

*Primary Examiner* — Wyatt P Mcconnell
(74) *Attorney, Agent, or Firm* — MUNCY, GEISSLER, OLDS & LOWE, P.C.; Daniel Podhajny

(57)          ABSTRACT

In an aspect, a lithium-ion battery anode composition comprises a porous composite particle comprising carbon (C) and an active material comprising silicon (Si), wherein the carbon is characterized by a domain size (r), as estimated from an atomic pair distribution function G(r) obtained from a synchrotron x-ray diffraction measurement of the porous composite particle, ranging from around 10 Å (1 nm) to around 60 Å (6 nm). In a further aspect, a carbon material for use in making an anode composition for use in a Li-ion battery is characterized by a domain size (r), as estimated from an atomic pair distribution function G(r) obtained from a synchrotron x-ray diffraction measurement of the carbon material, ranging from around 10 Å (1 nm) to around 60 Å (6 nm).

28 Claims, 15 Drawing Sheets

(51) Int. Cl.
   H01M 4/62         (2006.01)
   H01M 10/0525      (2010.01)
   H01M 4/02         (2006.01)

(52) U.S. Cl.
   CPC .. H01M 10/0525 (2013.01); *H01M 2004/021* (2013.01); *H01M 2004/027* (2013.01)

(56)                References Cited

U.S. PATENT DOCUMENTS

| | | |
|---|---|---|
| 2014/0209541 A1 | 7/2014 | Siedle et al. |
| 2017/0263386 A1 | 9/2017 | Ishikawa et al. |
| 2018/0269486 A1* | 9/2018 | Umetsu ................. H01G 11/64 |
| 2023/0163311 A1 | 5/2023 | Wang |
| 2023/0238514 A1 | 7/2023 | Lee et al. |

OTHER PUBLICATIONS

Liu et al., "Electrochemical characterization of a novel Si-graphite-Li2.6Co0.4N composite as anode material for lithium secondary batteries," www.elsevier.com/locate/matchemphys, Materials Chemistry and Physics 89 (2005) pp. 80-84.

Nguyen T. et al., "Characterization of accessible and inaccessible pores in microporous carbons by a combination of adsorption and small angle neutron scattering," Carbon 50 (2012) 3045-3054, 2012 Elsevier Ltd., Mar. 7, 2012, http://dx.doi.org/10.1016/j.carbon.2012.02.091.

* cited by examiner

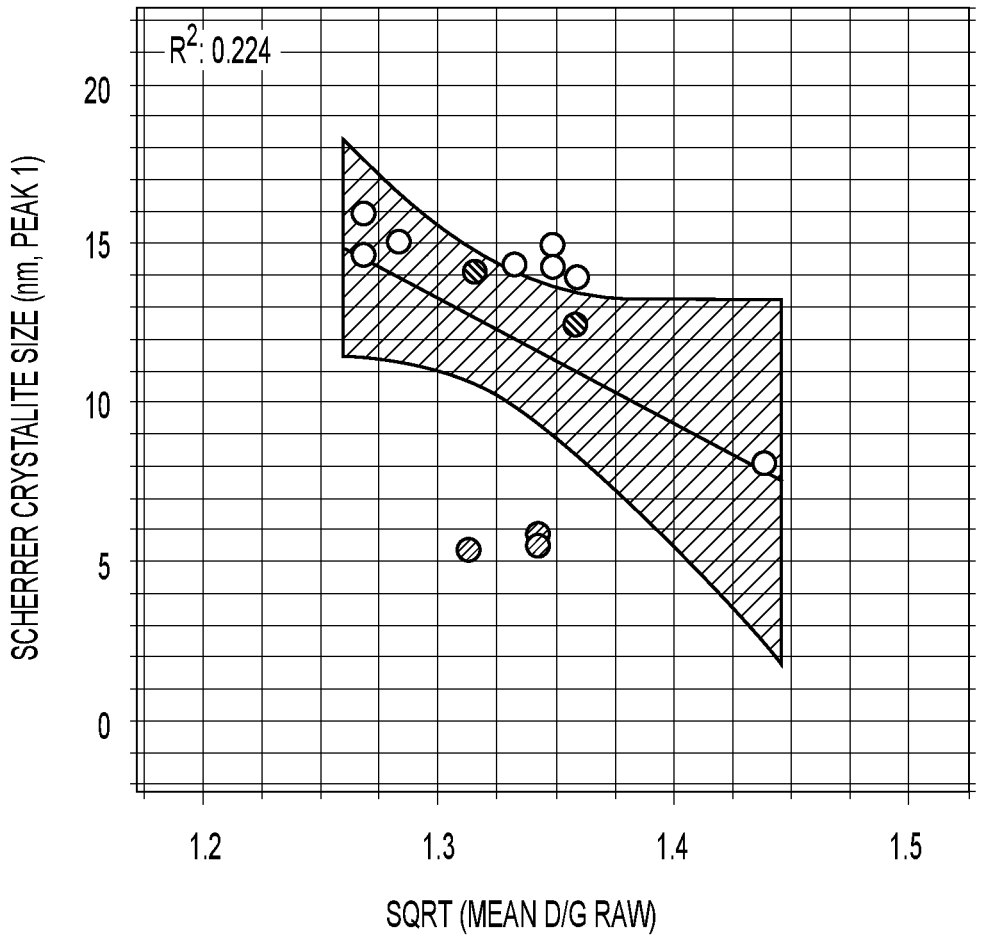

Si CRYSTALLITE SIZE (EVALUATED USING THE SCHERRER EQUATION APPLIED TO THE Si (111) BRAGG PEAK ("PEAK 1"). K = 1, $\lambda$ = 0.15406 nm) AS A FUNCTION OF SQUARE ROOT OF RAMAN D/G CARBON PEAK RATIO IN SEVERAL CARBON-BASED ANODE COMPOSITE POWDER SAMPLES COMPRISING Si AS ACTIVE MATERIAL (EMBEDDED IN DIFFERENT CARBON STRUCTURES). DIFFERENT COLOR PLOTS CORRESPOND TO DIFFERENT EXPERIMENTAL SERIES OF SUITABLE Si- AND C-CONTAINING COMPOSITES PRODUCED.

*FIG. 2A*

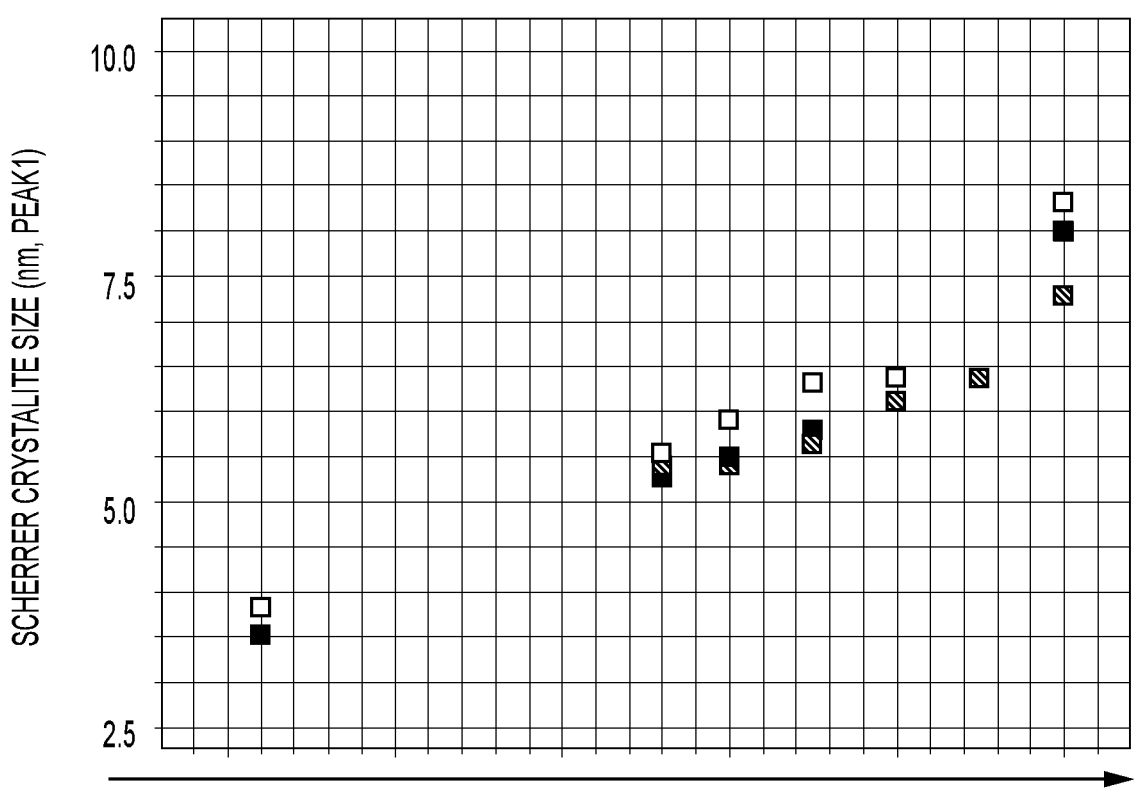

TEMPERATURE OF ONE OF THE SYNTHESIS
STEPS (a.u.)

Si CRYSTALLITE SIZE (EVALUATED USING THE SCHERRER EQUATION APPLIED TO
THE Si (111) BRAGG PEAK ("PEAK 1"). K = 1, λ = 0.15406 nm) AS A FUNCTION OF A
TEMPERATURE VALUE IN ONE OF THE SYNTHESIS STEPS FOR THE FORMATION OF
SEVERAL CARBON-BASED ANODE COMPOSITE POWDER SAMPLES COMPRISING Si AS
ACTIVE MATERIAL. DIFFERENT COLOR PLOTS CORRESPOND TO DIFFERENT EXPERI-
MENTAL SERIES OF SUITABLE Si- AND C- CONTAINING COMPOSITES PRODUCED

*FIG. 2B*

XRD OF TWO SUITABLE POROUS CARBONS AS A FUNCTION OF VACUUM ANNEALING TEMPERATURE, SHOWING CRYSTALLIZATION ONSET TEMPERATURE BETWEEN 1600 °C AND 1800 °C UPON ANNEALING IN VACUUM FOR 1 HOUR.

XRD OF TWO SUITABLE POROUS CARBONS AS A FUNCTION OF VACUUM ANNEALING TEMPERATURE, SHOWING CRYSTALLIZATION ONSET TEMPERATURE BETWEEN 1600 °C AND 1800 °C UPON ANNEALING IN VACUUM FOR 1 HOUR.

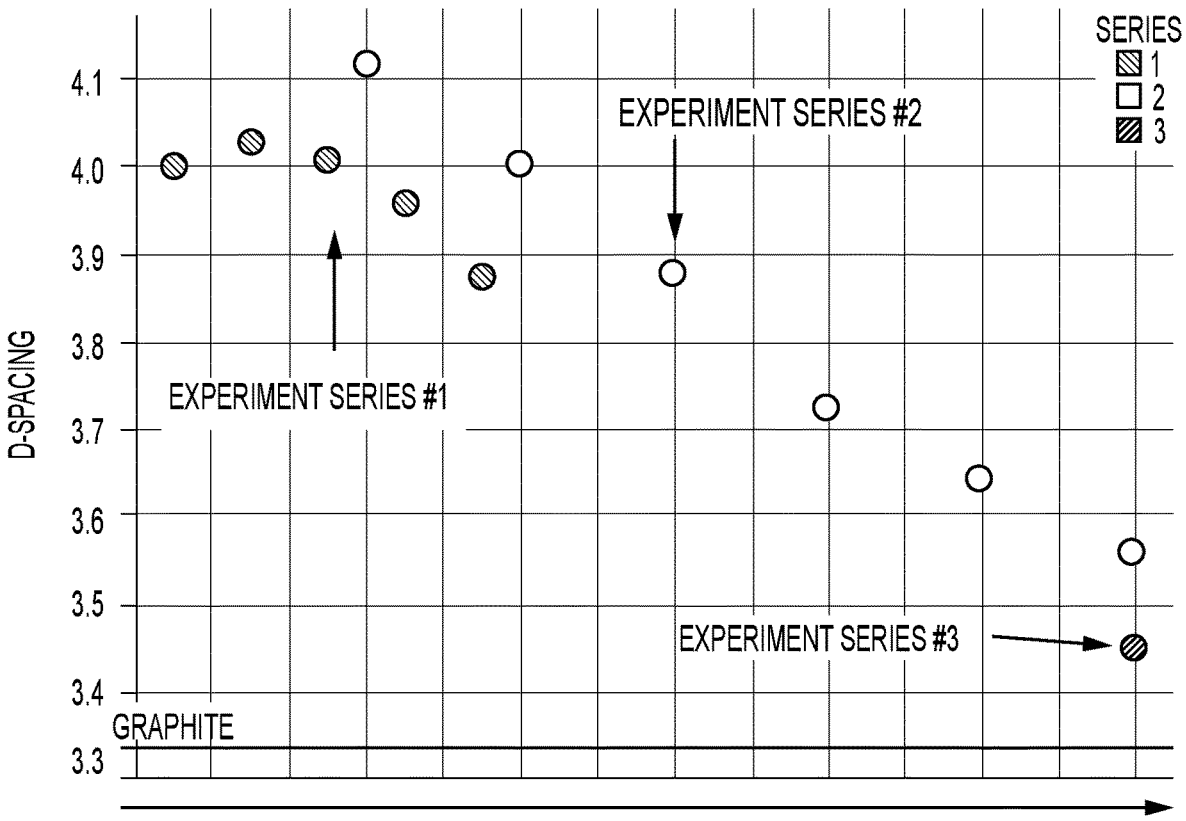

CARBON (002) SPACING (ALSO CALLED D-SPACING) MEASURED IN ANGSTROMS (Å) FOR THREE DIFFERENT TYPES OF SUITABLE CARBON AS A FUNCTION OF ANNEALING IN VACUUM FOR 2h. IN ALL CASES, THE D-SPACING IS SUBSTANTIALLY LARGER THAN THAT IN A GRAPHITE. SUCH A HIGH VALUES OF D SPACING WAS FOUND TO BE PARTICULARLY IMPORTANT IN APPLICATIONS OF SUCH CARBONS IN SUITABLE CARBON-BASED COMPOSITES.

*FIG. 3C*

MASS DELTA VS. ANNEAL TEMP (degC)

NITROGEN (N) UPTAKE (HERE PRESENTED BY MASS INCREASE) BY
ANNEALING OF EXAMPLE SUITABLE CARBON-CONTAINING COMPOSITE
POWDER SAMPLE (COMPRISING Si ACTIVE MATERIAL) IN $N_2$ GAS FOR
2h

XRD PATTERNS OF A SUITABLE CARBON-BASED Si-COMPRISING COMPOSITE POWDER ANNEALED IN N₂ AT DIFFERENT TEMPERATURES AND SHOWING SiC FORMATION AT AROUND 850 °C

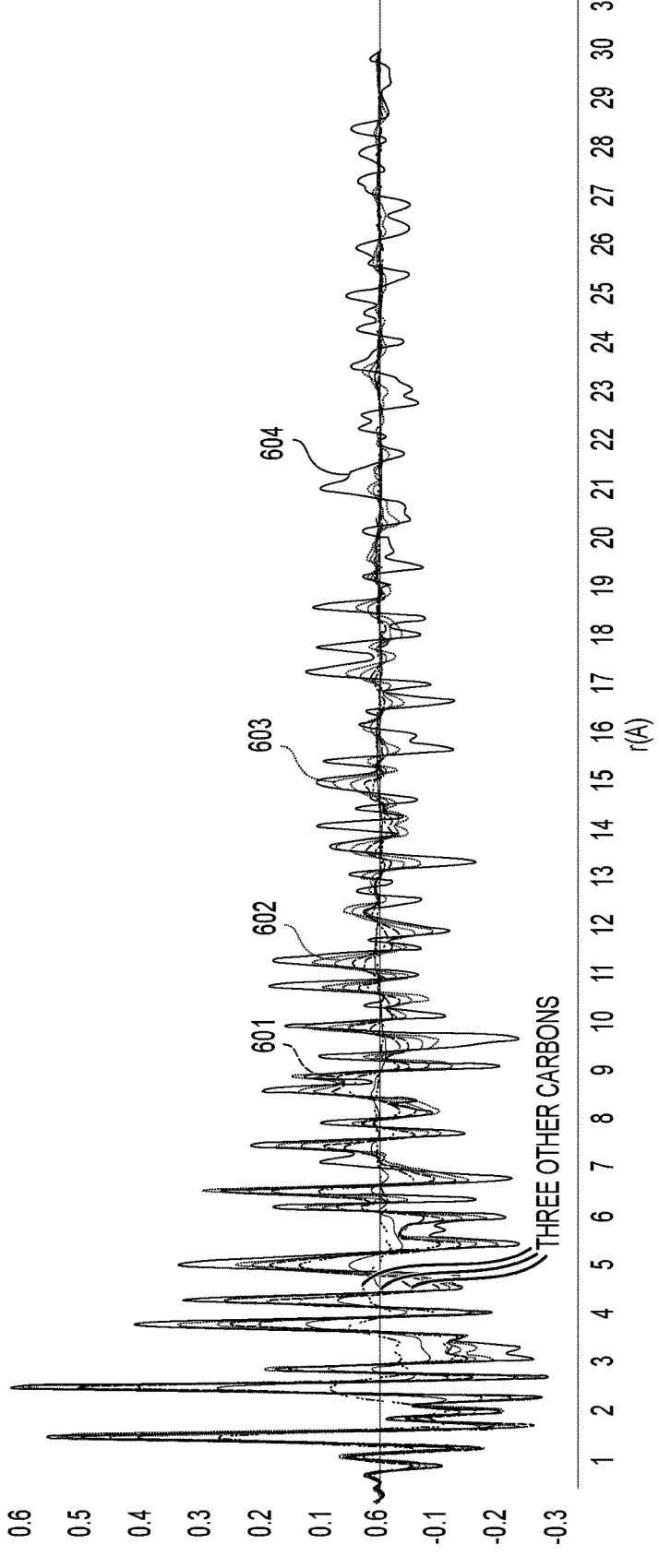

EXAMPLES OF PAIR DISTRIBUTION FUNCTION G(r) ANALYSIS CONDUCTED ON SEVERAL SUITABLE CARBONS WITH A SCATTERING DOMAIN SIZE OF AROUND 15-19 Å (601), 19-22 Å (602), 24-28 Å (603) AND 40-55 Å (604), AMONG OTHERS. SIZE OF A CARBON DOMAIN MEASURED VIA PDF IS A MEASUREMENT OF THE SIZE OF COHERENTLY SCATTERING STRUCTURAL DOMAINS, AVERAGED OVER ALL THE MATERIAL WITHIN THE BEAM PATH. THE SIZE IS DETERMINED BY THE r CORRESPONDING TO THE LOSS OF COHERENCE (AS DEFINED AS THE FUNCTION FALLING BELOW G(r)= +/- 0.01). THE TOP INSET ILLUSTRATES THE MEANS OF CALCULATING THE SCATTERING DOMAIN SIZE FROM G(r) VARIATIONS OF AN EXAMPLE SAMPLE.

*FIG. 6B*

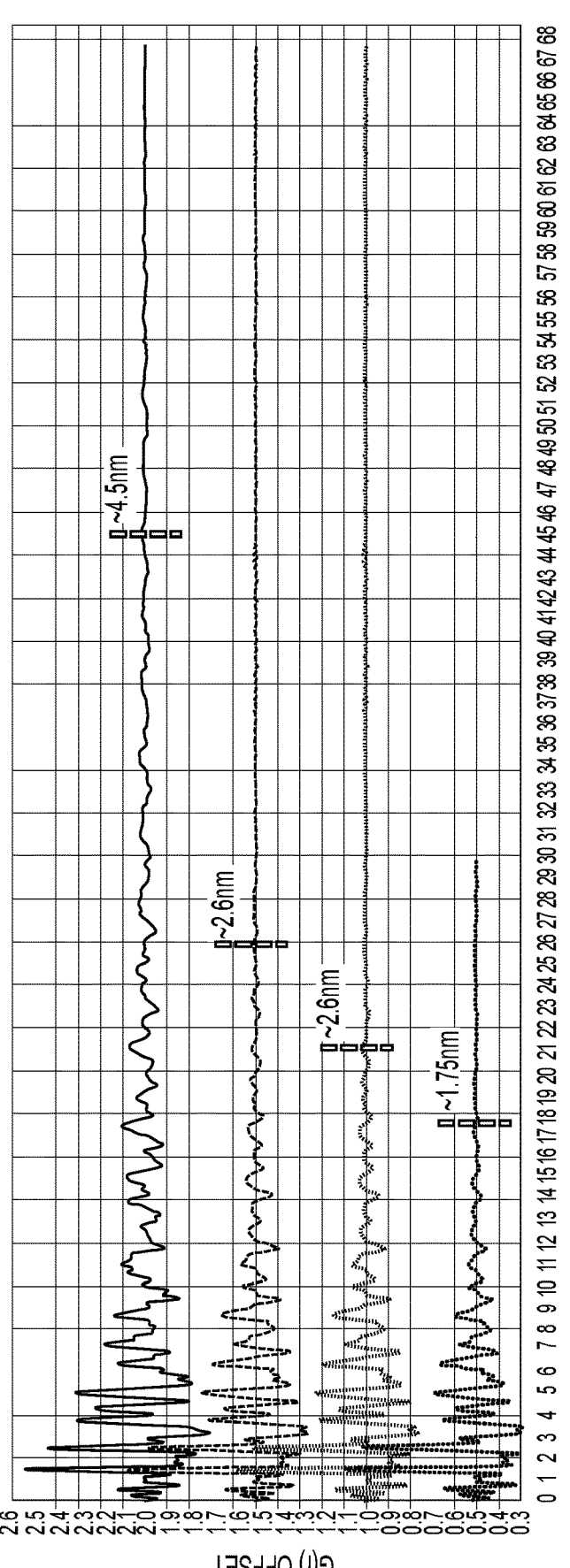

EXAMPLES OF PAIR DISTRIBUTION FUNCTION G(r) ANALYSIS CONDUCTED ON SEVERAL SUITABLE CARBONS WITH A SCATTERING DOMAIN SIZE OF ~17.5 Å, ~21 Å, ~26 Å AND ~45 Å. SIZE OF A CARBON DOMAIN MEASURED VIA PDF IS A MEASUREMENT OF THE SIZE OF COHERENTLY SCATTERING STRUCTURAL DOMAINS, AVERAGED OVER ALL THE MATERIAL WITHIN THE BEAM PATH. THE SIZE IS DETERMINED BY THE r CORRESPONDING TO THE LOSS OF COHERENCE (AS DEFINED AS THE FUNCTION FALLING BELOW G(r)= +/- 0.01). DATA PRESENTED USING AN OFFSET TO VISUALIZE ALL SAMPLES IN A SINGLE GRAPH.

*FIG. 7*

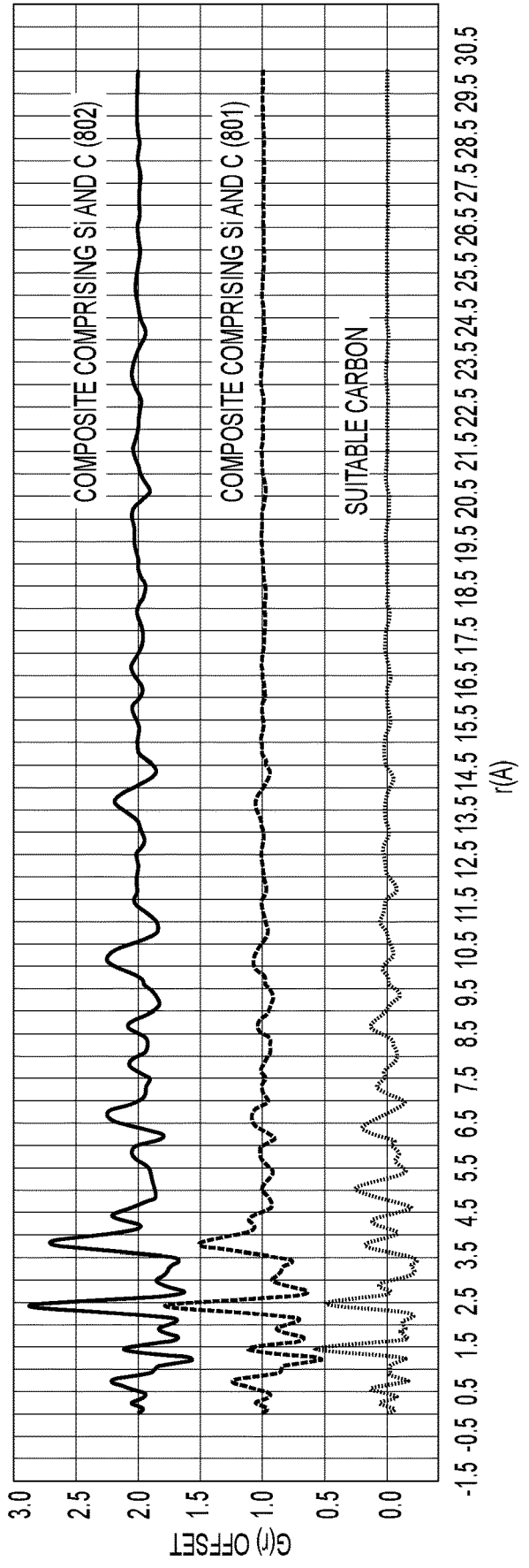

EXAMPLES OF PAIR DISTRIBUTION FUNCTION G(r) ANALYSIS CONDUCTED ON TWO SUITABLE CARBON-BASED COMPOSITES (802) AND (801) WITH Si ACTIVE MATERIAL IN COMPARISON WITH THE SUITABLE CARBON MATERIAL. THE COMPOSITE DOMAIN SIZE IS AROUND ~2.5 nm FOR (801) AND AROUND ~3.5 nm FOR (802) (BOTH LIMITED BY THE Si DOMAIN SIZE; THE INCREASED Si SCATTERING DOMAIN SIZE IN (802) RELATIVE TO (801) WAS DUE TO DEVIATION IN THE SYNTHESIS/PROCESSING CONDITIONS.

*FIG. 8*

UNCORRECTED BASELINE OF R(r)

| | Carbon #1 | Carbon #2 | Carbon #3 | Carbon #4 |
|---|---|---|---|---|
| 1st- to 2nd C-C Peak Intensity Ratio | 0.660 | 0.625 | 0.596 | 0.595 |

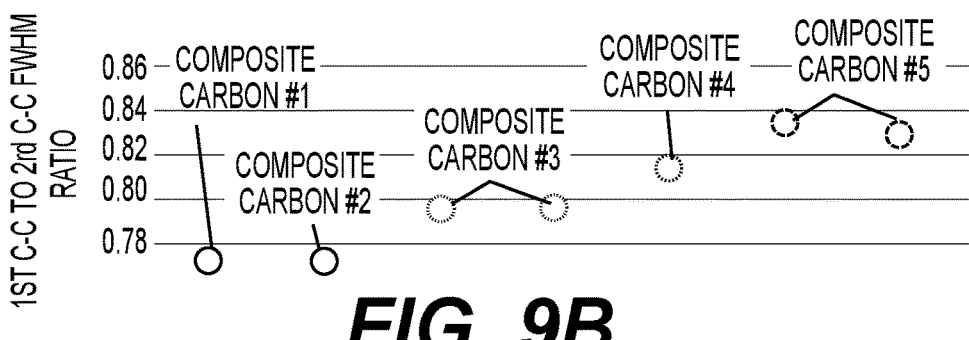

FIG. 9B

|  | Carbon #1 | Carbon #2 | Carbon #3 | Carbon #4 |
|---|---|---|---|---|
| 1st- to 3rd C-C Peak Intensity Ratio | 1.237 | 1.210 | 1.194 | 1.230 |

FIG. 9C

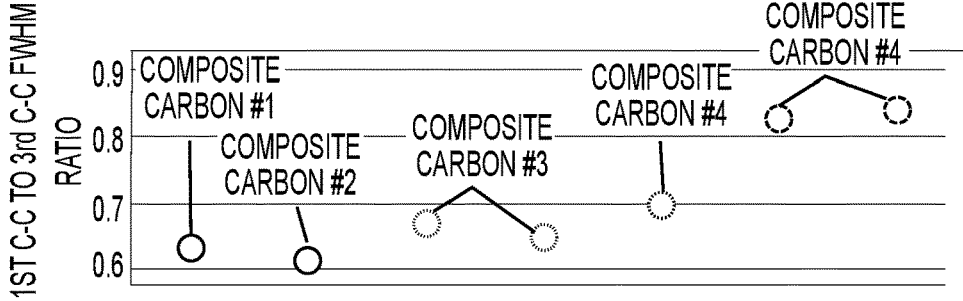

EXAMPLES OF PAIR DISTRIBUTION FUNCTION G(r) ANALYSIS CONDUCTED ON 4-5 ILLUSTRATIVE SUITABLE CARBONS FOR USE IN THE COMPOSITES: (A) THE RATIO OF THE HEIGHTS OF THE REAL SPACE PEAKS FOR THE FIRST AND THE SECOND COORDINATION SPHERE IN SUITABLE CARBONS. LOWER VALUE OF THE RATIO INDICATES A HIGHER DEGREE OF ORDER IN THE SUITABLE CARBONS' EXAMPLES; (B) THE RATIO OF THE FWHM VALUES FOR THE FIRST AND THE SECOND COORDINATION SPHERE IN SUITABLE CARBONS; (C) THE RATIO OF THE HEIGHTS OF THE REAL SPACE PEAKS FOR THE FIRST AND THE THIRD COORDINATION SPHERE IN SUITABLE CARBONS; (D) THE RATIO OF THE FWHM VALUES FOR THE FIRST AND THE SECOND COORDINATION SPHERE IN SUITABLE CARBONS. SCHEMATICS ON THE TOP OF ALL THE FIGURES ILLUSTRATES THE CALCULATING PROCEDURES.

FIG. 9D

BATTERY ELECTRODE COMPOSITION COMPRISING CARBON AND SILICON WITH SPECIFIC PROPERTIES FOR SUPERIOR PERFORMANCE

CROSS-REFERENCE TO RELATED APPLICATIONS

The present Application for Patent claims the benefit of U.S. Provisional Application No. 63/241,407, entitled "BATTERY ELECTRODE COMPOSITION COMPRISING CARBON AND SILICON WITH SPECIFIC PROPERTIES FOR SUPERIOR PERFORMANCE," filed Sep. 7, 2021, assigned to the assignee hereof, and expressly incorporated herein by reference in its entirety.

BACKGROUND

Field

Aspects of the present disclosure relates generally to energy storage devices, and more particularly to battery technology, supercapacitor technology and the like.

Background

Owing in part to their relatively high energy densities, relatively high specific energy, relatively high specific power, relatively fast charging, light weight, and potential for long lifetimes and cycle life, advanced rechargeable batteries are desirable for a wide range of electronic devices, electric vehicles, grid storage and other important applications.

However, despite the increasing commercial prevalence of electrochemical energy storage technologies, further development of the batteries is needed, particularly for potential applications in low- or zero-emission, hybrid-electrical or fully-electrical vehicles, consumer electronics, energy-efficient cargo ships and locomotives, aerospace applications, and power grids. In particular, further improvements are desired for various rechargeable batteries, such as rechargeable metal and metal-ion batteries (such as rechargeable Li and Li-ion batteries, rechargeable Na and Na-ion batteries, rechargeable Mg and Mg-ion batteries, rechargeable K and K-ion batteries, rechargeable Ca and Ca-ion batteries, etc.). The following energy storage devices may similarly benefit from the additional improvements: rechargeable halogen-ion batteries (such as F-ion and Cl-ion batteries, etc.), rechargeable mixed ion batteries, rechargeable aqueous batteries (e.g., rechargeable batteries with pH-neutral or acidic or caustic electrolytes), electrochemical capacitors (e.g., supercapacitors or double layer capacitors), hybrid devices, rechargeable polymer electrolyte batteries and supercapacitors, rechargeable polymer gel electrolyte batteries and supercapacitors, rechargeable solid ceramic or solid glass electrolyte batteries, rechargeable composite electrolyte batteries, to name a few.

A broad range of active (charge-storing) materials, a broad range of polymer binders, a broad range of conductive additives and various mixing recipes may be utilized in the construction of battery electrodes. In some designs, active materials may be utilized in the form of composite particles. However, for improved electrode performance (low and stable resistance, high cycling stability, high-rate capability, acceptable energy, good volumetric capacity, etc.), the optimal composite formulations need to be identified. Furthermore, the choice of binders, additives, and mixing protocols needs to be discovered for specific types, specific physical and chemical properties, and specific sizes of active particles. In many cases, the choices of the composite particle architecture and compositions as well as the composition of the electrodes are not trivial and can be counter-intuitive.

In many different types of rechargeable batteries, charge storing materials may be produced as (nano)composite powders, which may comprise conductive carbon. As a subset of such particles, conductive carbon may be distributed not only on the surface, but also within the bulk of the (nano)composite particles. In principle, such a class of charge-storing (nano)composite particles may offer great promises for scalable (and, in some cases, sustainable) manufacturing and achieving good charge storage performance characteristics. Unfortunately, it largely remains unclear what types and what properties of carbon would be advantageous in such applications of composite ((nano)composite) particles. In addition, it is further unclear how to achieve effective processing of such (nano)composite particles into electrodes that would result in good performance characteristics, including high capacity, fast charging, fast discharging, and long cycle stability. The performance of battery electrodes comprised of similar (nano)composites may become particularly poor when the electrode capacity loading becomes moderate (for batteries) (2-4 $mAh/cm^2$) or even more so when it becomes high (e.g., 4-16 $mAh/cm^2$). Higher capacity loading, however, is advantageous for increasing battery cell energy density and reducing cell manufacturing costs.

Accordingly, there remains a need for improved batteries, components, electrode materials and other related materials and manufacturing processes.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a lithium-ion battery anode composition includes a porous composite particle comprising carbon (C) and an active material comprising silicon (Si), wherein the carbon is characterized by a domain size (r), as estimated from an atomic pair distribution function G(r) obtained from a synchrotron x-ray diffraction measurement of the porous composite particle, ranging from around 10 Å (1 nm) to around 60 Å (6 nm).

In some aspects, the carbon is characterized by one or more of the following: (1) a domain size ranging between around 15 Å and around 19 Å, (2) a domain size ranging between around 19 Å and around 22 Å, (3) a domain size ranging between around 24 Å and around 28 Å, and (4) a domain size ranging between around 28 Å and 55 Å, and the domain sizes are as estimated from the atomic pair distribution function G(r).

In some aspects, the carbon comprises porous carbon.

In some aspects, $G(r=r_1)$ is a value of the atomic pair distribution function at a real space position of a first coordination sphere of the carbon, wherein $G(r=r_2)$ is a value of the atomic pair distribution function at a real space position of a second coordination sphere of the carbon, and wherein a ratio $G(r=r_1)/G(r=r_2)$ is in a range of around 0.700 to around 0.590.

In some aspects, $W(r=r_1)$ is a value of a full width at half maximum of the atomic pair distribution function at a real space position of a first coordination sphere of the carbon, wherein $W(r=r_2)$ is a value of a full width at half maximum of the atomic pair distribution function at a real space position of a second coordination sphere of the carbon; and a ratio $W(r=r_1)/W(r=r_2)$ is in a range of around 0.700 to around 0.850.

In some aspects, $G(r=r_1)$ is a value of the atomic pair distribution function at a real space position of a first coordination sphere of the carbon, wherein $G(r=r_3)$ is a value of the atomic pair distribution function at a real space position of a third coordination sphere of the carbon, and wherein a ratio $G(r=r_1)/G(r=r_3)$ is in a range of around 1.100 to around 1.300.

In some aspects, $W(r=r_1)$ is a value of a full width at half maximum of the atomic pair distribution function at a real space position of a first coordination sphere of the carbon, wherein $W(r=r_3)$ is a value of a full width at half maximum of the atomic pair distribution function at a real space position of a third coordination sphere of the carbon, and wherein a ratio $W(r=r_1)/W(r=r_3)$ is in a range of around 0.600 to around 0.850.

In some aspects, an anode comprising the anode composition exhibits an areal capacity loading that ranges from around 2 mAh/cm² to around 16 mAh/cm².

In some aspects, from around 10% to around 100% of the areal capacity loading of the anode is provided by composite particles that are each configured as the porous composite particle.

In some aspects, the composite particles on average exhibit a silicon (Si) to carbon (C) weight ratio in the range from around 5:1 to 1:5.

In some aspects, the porous composite particle is characterized by an average scattering domain size (r), as estimated from the atomic pair distribution function G(r), ranging from around 1 nm to around 40 nm.

In some aspects, the porous composite particle is characterized by the average scattering domain size (r) ranging from around 1 nm to around 10 nm.

In some aspects, the porous composite particle on average comprises less than about 1 wt. % hydrogen (H), less than about 5 wt. % nitrogen (N) and less than about 2 wt. % oxygen (O).

In some aspects, the porous composite particle on average exhibits uptake from around 1.5 wt. % to around 25 wt. % nitrogen (N) when heated in a nitrogen gas (N₂) at 1050° C. for a period of 2 hours, as measured on a powder that comprises the porous composite particle.

In some aspects, the porous composite particle exhibits average uptake from around 0.5 wt. % to around 10 wt. % nitrogen (N) when heated in a nitrogen gas (N₂) at 850° C. for a period of 2 hours, as measured on a powder that comprises the porous composite particle.

In some aspects, the porous composite particle forms from around 1 wt. % to around 100 wt. % silicon carbide (SiC) when heated in a nitrogen gas (N₂) or in an argon gas (Ar) in a temperature range from around 750° C. to around 950° C. for a period of 2 hours or more, as detected by X-ray diffraction (XRD) or Fourier Transform Infrared Spectroscopy (FTIR).

In some aspects, the porous composite particle exhibits an average Brunauer-Emmett-Teller (BET) specific surface area in the range from around 1 to around 40 m²/g, as measured using nitrogen sorption isotherm on a powder that comprises the porous composite particle.

In some aspects, the porous composite particle exhibits average density in the range from around 0.9 g/cm³ to around 2.2 g/cm³, as measured using nitrogen or argon pycnometry on a powder that comprises the porous composite particle.

In some aspects, the porous composite particle exhibits volume-average particle size in the range from around 0.2 micron to around 20 microns, as measured using scanning electron microscope (SEM) image analysis or particle scattering techniques on a powder that comprises the porous composite particle.

In some aspects, Raman spectra of the porous composite particle exhibits carbon D and G peaks, a ratio of average intensities of the D to G peaks ($I_D/I_G$) ranges from around 0.7 to around 2.7.

In an aspect, a Li-ion battery comprises an anode comprising the lithium-ion battery anode composition, a cathode that is electrically separated from the anode; and an electrolyte ionically coupling the anode and the cathode.

In some aspects, the battery capacity ranges from around 0.2 Ah to around 400 Ah.

In some aspects, $R(r=rSi—C)$ is a value of a radial distribution function $R(r)$ at a real space position of a first coordination sphere of a Si—C pair in the porous composite particle, wherein $R(r=rC—C)$ is a value of the radial distribution function $R(r)$ at a real space position of a first coordination sphere of a C—C pair in the porous composite particle, wherein the radial distribution function $R(r)$ and the atomic pair distribution function are related by $R(r)=G(r)r+4\pi r^2\rho_0$, $\rho_0$ being a constant relating to a number density of scatterers, and wherein a ratio $R(r=rSi—C)/R(r=rC—C)$ is in a range of 0.050 to around 1.000.

In an aspect, a carbon material for use in making an anode composition for use in a Li-ion battery, wherein the carbon material is characterized by a domain size (r), as estimated from an atomic pair distribution function G(r) obtained from a synchrotron x-ray diffraction measurement of the carbon material, ranging from around 10 Å (1 nm) to around 60 Å (6 nm).

In some aspects, the domain size (r) corresponds to one of the following: (1) a first domain size ranging between around 15 Å and around 19 Å, (2) a second domain size ranging between around 19 Å and around 22 Å, (3) a third domain size ranging between around 24 Å and around 28 Å, and (4) a fourth domain size ranging between around 40 Å and 55 Å.

In some aspects, the carbon material comprises porous carbon.

In some aspects, $G(r=r_1)$ is a value of the atomic pair distribution function at a real space position of a first coordination sphere of the carbon material, wherein $G(r=r_2)$ is a value of the atomic pair distribution function at a real space position of a second coordination sphere of the carbon material, and wherein a ratio $G(r=r_1)/G(r=r_2)$ is in a range of around 0.700 to around 0.590.

In some aspects, $W(r=r_1)$ is a value of a full width at half maximum of the atomic pair distribution function at a real space position of a first coordination sphere of the carbon material, wherein $W(r=r_2)$ is a value of a full width at half maximum of the atomic pair distribution function at a real space position of a second coordination sphere of the carbon material, and wherein a ratio $W(r=r_1)/W(r=r_2)$ is in a range of around 0.700 to around 0.850.

In some aspects, $G(r=r_1)$ is a value of the atomic pair distribution function at a real space position of a first coordination sphere of the carbon material, wherein $G(r=r_3)$ is a value of the atomic pair distribution function at a real space position of a third coordination sphere of the carbon material, and wherein a ratio $G(r=r_1)/G(r=r_3)$ is in a range of around 1.100 to around 1.300.

In some aspects, $W(r=r_1)$ is a value of a full width at half maximum of the atomic pair distribution function at a real space position of a first coordination sphere of the carbon material, wherein $W(r=r_3)$ is a value of a full width at half maximum of the atomic pair distribution function at a real space position of a third coordination sphere of the carbon material, and wherein a ratio $W(r=r_1)/W(r=r_3)$ is in a range of around 0.600 to around 0.850.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 2A is a graphical plot of Si crystallite size as a function of square root of Raman D/G carbon peak intensity ratios for several carbon-based anode composite samples.

FIG. 2B is a graphical plot of Si crystallite size as a function of temperature in one of the synthetic steps in the making of several carbon-based anode composite samples.

FIG. 3C illustrates another example of suitable porous carbons that exhibit (002) carbon spacing exceeding that of graphite.

FIGS. 6A-6B show graphical plots of atomic pair distribution function G(r) for several suitable carbon materials.

FIG. 7 shows graphical plots of atomic pair distribution function G(r) for several suitable carbon materials.

FIG. 8 shows graphical plots of atomic pair distribution function G(r) for: one suitable carbon material and two composite materials comprising Si and C formed under differing synthesis and processing conditions.

FIG. 9B shows the ratios of the values of full width at half-maximum (FWHM) of the atomic pair distribution function at the first and second carbon-carbon coordination spheres, for illustrative carbon materials.

FIG. 9C tabulates the ratios of the peak amplitudes (values of the atomic pair distribution function) of the first and third carbon-carbon coordination spheres, for illustrative carbon materials.

FIG. 9D shows the ratios of the values of FWHM of the atomic pair distribution function at the first and third carbon-carbon coordination spheres, for illustrative carbon materials.

DETAILED DESCRIPTION

Figure 1:
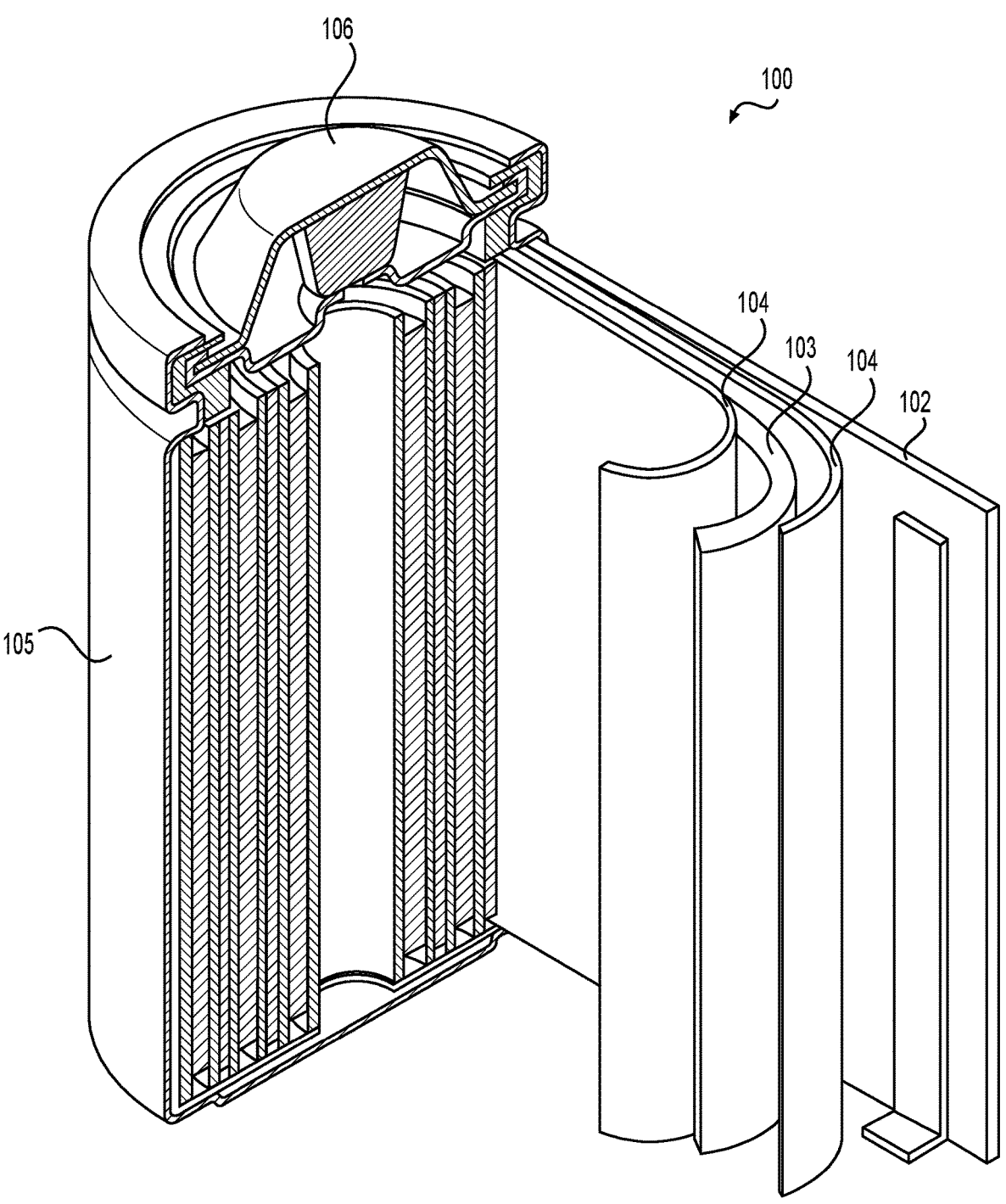
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternative embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from around $-120°$ C. to around $-60°$ C. encompasses (in $°$ C.) a set of temperature ranges from around $-120°$ C. to around $-119°$ C., from around $-119°$ C. to around $-118°$ C., . . . from around $-61°$ C. to around $-60°$ C., as if the intervening numbers (in $°$ C.) between $-120°$ C. and $-60°$ C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of Li metal and Li-ion batteries (for brevity and convenience, and because of the current popularity of Li technology), it will be appreciated that various aspects may be applicable to other rechargeable and primary batteries (such as Na metal and Na-ion, Mg metal and Mg-ion, K metal and K-ion, Ca metal and Ca-ion and other metal and metal-ion batteries, alkaline batteries with OH⁻ ions, mixed ion batteries, etc.) as well as electrochemical capacitors or hybrid devices (e.g., with one electrode being battery-like and another electrode being electrochemical capacitor-like).

While the description below may describe certain examples in the context of active ions being contained within active particles, it will be appreciated that various aspects may be applicable to active ions residing in the electrolyte at some stage of the cell assembling or charge or discharge.

Further, while the description below may also describe certain examples of the active material formulations in a Li-containing (e.g., lithiated) state, it will be appreciated that various aspects may be applicable to Li-free (e.g., unlithiated) electrodes.

Further, while the description below may also describe certain examples of the active electrode material belonging to so-called conversion-type active material(s) (including so-called alloying type active materials, true conversion-type active materials, chemical transformation-type active materials, metal active material, etc.), it will be appreciated that various aspects may be applicable to so-called intercalation-type active material(s), so-called pseudocapacitive active materials, as well as mixed type active materials (or components of active materials) that may store charge by more than one mechanism (e.g., active materials that exhibit both intercalation and conversion-type electrochemical reactions during cell operation, among many other combinations).

Further, while the description below may also describe certain examples of active (reversibly ion-storing) materials (as component(s) of the (nano)composites) in the form of crystalline (or nanocrystalline) materials, it will be appreciated that various aspects may be applicable to highly disordered or amorphous active materials.

Further, while the description below may also describe certain examples of active (reversibly ion-storing) materials as not based on carbon (e.g., comprising less than around 10 at. % of $sp^2$-bonded carbon; in some designs—less than around 1 at. % of $sp^2$-bonded carbon; in some designs— comprising from around 0 to around 1 at. % of carbon atoms), it will be appreciated that carbon materials (including materials that comprise 90-100 at. % $sp^2$-bonded carbon) may also reversibly store ions in certain potential ranges of battery operation (although commonly exhibiting a substantially smaller volumetric and gravimetric capacity for ion storage). So, when discussing active materials in various embodiments of this disclosure, the active material in the carbon-containing composites may be characterized as "substantially more active than carbon" materials (e.g., storing at least 2 times more ions per atom in the "active" material than in carbon in the operational electrochemical potential range).

Further, while the description below may also describe certain examples of specific sources (precursors) of carbon materials, it will be appreciated that various aspects may be applicable to other types of carbon material sources, including those produced from both organic and inorganic precursors, those that utilize (e.g., sacrificial) templates for the formation of some of the pores, those that utilize organic waste products, among others.

Further, while the description below may also describe certain examples of (nano)composite particles or porous carbon particles having irregular or spherical or spheroidal three dimensional (3D) shape, it will be appreciated that various aspects may be applicable to particles having other shapes, including, for example, elongated two-dimensional (2D, such as (nano)composite platelets or porous carbon sheets, etc.) or one dimensional (1D, such as, for example, (nano)composite nanofibers and fibers or porous carbon nanofibers and fibers, etc.) shapes.

Further, while the description below may also describe certain examples of liquid organic electrolytes as components of electrochemical cells (batteries or electrochemical capacitors) based on the (nano)composite electrodes, it will be appreciated that various aspects may be applicable to aqueous electrolytes, ionic salt electrolytes, molten salt electrolytes, solid ceramic electrolytes, solid glass electrolyte, solid polymer electrolytes (including single-ion conducting solid polymer electrolytes, where one ion (e.g., cation) is mobile, while the counter ion (e.g., anion) is chemically attached to the polymer backbone), gel electrolytes, composite (e.g., glass-ceramic or glass-polymer or ceramic-polymer or liquid-ceramic or liquid-polymer or liquid-ceramic-polymer or liquid-glass-polymer or liquid-glass-ceramic-polymer) electrolytes, and others. In some designs, more than one electrolyte could be used in a single cell construction (e.g., one electrolyte infiltrated/coating the surface of the electrode or active material and another electrolyte interpenetrating remaining pores in the electrode (s) or comprising at least a part of the separator membrane; or, as another illustrative example, one electrolyte contacting the anode and another electrolyte contacting the cathode).

In some examples and designs, the solid (at device operating temperatures) electrolytes may be melt-infiltrated into at least some of the pores within electrodes (e.g., at elevated temperatures, where the electrolyte becomes liquid). In some examples and designs, the solid (at device operating temperatures) electrolytes may be dissolved into a solvent, infiltrated into at least some of the pores of the electrodes, followed by solvent evaporation (drying). In some examples and designs, the solid (at device operating temperatures) electrolytes may be infiltrated into at least some of the pores of the electrodes in an intermediate stage when such electrolytes are liquid, followed by the conversion of the liquid into a solid. In some examples and designs, the polymer electrolytes may be infiltrated into at least some of the pores within electrodes or active materials in a liquid state and polymerized after the infiltration (e.g., during heating or after sufficient storage in a suitable temperature range or UV treatment, etc.). In some designs, such polymerization may take place prior to cell use (application). In some designs, such polymerization may take place after (e.g., or as a final stage of) the cell assembling. In some designs, such polymerization may take place after (e.g., or as a final stage of) the cell sealing. In some designs, the remaining pores (if present) after the polymerization may be filled by another electrolyte in a fully assembled device (such as a Li-ion battery cell).

During battery (such as a Li-ion battery) operation, intercalation-type active materials operate by insertion (intercalation) and extraction (de-intercalation) of Li ions into/from the interstitial positions (nanoscale or sub-nanoscale voids) present in crystalline or disordered or fully amorphous structure of such intercalation compounds. This intercalation/de-intercalation process is accompanied by the changes in the oxidation state of the non-Li atoms (ions) (e.g., such as transition metal ions). Chemical bonds typically do not break or reform during such processes. Li ions diffuse in/out of the active materials.

During battery (such as a Li-ion battery) operation, conversion materials change (convert) from one crystal structure to another (hence the name "conversion"-type). During (e.g., Li-ion) battery operation, Li ions are inserted into alloying type materials forming lithium alloys (hence the name "alloying"-type). Sometimes, "alloying"-type electrode materials (commonly metals and semimetals) are considered to be a sub-class of "conversion"-type electrode materials. Known examples of suitable "alloying"-type active electrode materials for metal-ion (e.g., Li-ion or Na-ion, etc.) batteries may include, but are not limited to silicon (Si), tin (Sn), antimony (Sb), germanium (Ge), their various alloys and combinations, among others.

"Alloying"-type electrode materials may also comprise other type(s) of conversion materials (such as oxides, hydrides, nitrides, etc.) as minor (e.g., around 0.1%-50 wt. %) additions as well as less active materials (which may exhibit significantly lower, e.g., around 0.01%-30% of the alloying material gravimetric capacity) that may help to enhance mechanical or electrochemical stability of the alloying materials or enhance their electrical conductivity in a delithiated state (these may be intercalation-type materials). The electrochemical reaction processes between Li ions and alloying or conversion materials may be accompanied by the breakage of some of the original chemical bonds and the formation of new chemical bonds. In an ideal case for some designs, the process is somewhat reversible and only little (or no) loss of active material (or Li) takes place during the battery operation (e.g., preferably no more than around 30% during the lifetime of a battery).

While the description below may describe certain examples in the context of metal-ion batteries, other conversion-type electrodes that may benefit from various aspects of the present disclosure include various chemistries used in a broad range of aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, and metal hydrides, to name a few.

FIG. 1 illustrates an example metal or metal-ion (e.g., Li or Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104 (and typically impregnating both anode 102 and cathode 103), a battery case 105, and a sealing member 106 sealing the battery case 105. In some designs in case of solid electrolyte (s), a solid electrolyte membrane may serve as a separator 104.

Both liquid and solid electrolytes may be used for the designs herein. Conventional electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of organic solvents (such as a mixture of carbonates). Other common organic solvents that may be suitable in the context of one or more embodiments of the present disclosure include nitriles, esters, sulfones, sulfoxides, phosphorous-based solvents, silicon-based solvents, ethers, and others. In some designs, some of such solvents may also be modified (e.g., be sulfonated or fluorinated). The electrolytes may also comprise ionic liquids (in some designs, neutral ionic liquids; in other designs, acidic or basic ionic liquids). In some designs, suitable electrolytes may also comprise mixtures of various salts (e.g., mixtures of several Li salts or mixtures of Li and non-Li salts for rechargeable Li and Li-ion batteries). The most common salt used in certain conventional Li-ion battery electrolyte, for example, is $LiPF_6$, while less common salts that may also be suitable in the context of one or more embodiments of the present disclosure include lithium tetrafluoroborate ($LiBF_4$), lithium perchlorate ($LiClO_4$), lithium bis(oxalato)borate ($LiB(C_2O_4)_2$), lithium difluoro (oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), and others. Electrolytes for Mg-ion, K-ion, Ca-ion, and Al-ion batteries may be more exotic as these batteries are in earlier stages of development. These exotic electrolytes may comprise different salts and solvents (in some cases, ionic liquids may replace organic solvents for certain applications). In some designs, more than one Li salt may advantageously be used in electrolytes. In some designs, electrolytes for Li-ion batteries may also advantageously comprise non-Li salt(s).

In the case of aqueous Li-ion (or aqueous Na-ion, K-ion, Ca-ion, etc.) batteries, suitable electrolytes may include a solution (e.g., aqueous solution or mixed aqueous-organic solution) of inorganic Li (or Na, K, Ca, etc.) salt(s) (such as $Li_2SO_4$, $LiNO_3$, $LiCl$, $LiBr$, $Li_3PO_4$, $H_2LiO_4P$, $C_2F_3LiO_2$, $C_2F_3LiO_3S$, $Na_2O_3Se$, $Na_2SO_4$, $Na_2O_7Si_3$, $Na_3O_9P_3$, $C_2F_3NaO_2$, etc.). In some designs, these electrolytes may also comprise solutions of organic Li (or Na, K, Ca, etc.) salts, such as (listed with respect to Li for brevity) metal salts of carboxylic acids (such as $HCOOLi$, $CH_3COOLi$, $CH_3CH_2COOLi$, $CH_3(CH_2)_2COOLi$, $CH_3(CH_2)_3COOLi$, $CH_3(CH_2)_4COOLi$, $CH_3(CH_2)_5COOLi$, $CH_3(CH_2)_6COOLi$, $CH_3(CH_2)_7COOLi$, $CH_3(CH_2)_8COOLi$, $CH_3(CH_2)_9COOLi$, $CH_3(CH_2)_6COOLi$, $CH_3(CH_2)_{11}COOLi$, $CH_3(CH_2)_{12}COOLi$, $CH_3(CH_2)_{13}COOLi$, $CH_3(CH_2)_{14}COOLi$, $CH_3(CH_2)_{15}COOLi$, $CH_3(CH_2)_{16}COOLi$, $CH_3(CH_2)_{17}COOLi$, $CH_3(CH_2)_{18}COOLi$ and others with the formula $CH_3(CH_2)xCOOLi$, where x ranges up to 50); metal salts of sulfonic acids (e.g., $RS(=O)_2—OH$, where R is a metal salt of an organic radical, such as a $CH_3SO_3Li$, $CH_3CH_2SO_3Li$, $C_6H_5SO_3Li$, $CH_3C_6H_4SO_3Li$, $CF_3SO_3Li$, $[CH_2CH(C_6H_4)SO_3Li]_n$ and others) and various other organometallic reagents (such as various organolithium reagents), to name a few. Such solutions may also comprise mixtures of inorganic and organic salts, various other salt mixtures (for example, a mixture of a Li salt and a salt of non-Li metals and semimetals), and, in some cases, hydroxide(s) (such as $LiOH$, $NaOH$, $KOH$, $Ca(OH)_2$, etc.), and, in some cases, acids (including organic acids). In some designs, such aqueous electrolytes may also comprise neutral or acidic or basic ionic liquids (from approximately 0.00001 wt. % to approximately 40 wt. % relative to the total weight of electrolyte). In some designs, such "aqueous" (or water containing) electrolytes may also comprise organic solvents (from approximately 0.00001 wt. % to approximately 40 wt. % relative to the total weight of electrolyte), in addition to water. Illustrative examples of suitable organic solvents may include carbonates (e.g., propylene carbonate, ethylene carbonate, diethyl carbonate, dimethyl carbonate, ethyl methyl carbonate, fluoroethylene carbonate, vinylene carbonate, and others), various nitriles (e.g., acetonitrile, etc.), various esters, various sulfones (e.g., propane sulfone, etc.), various sultones, various sulfoxides, various phosphorous-based solvents, various silicon-based solvents, various ethers, and others.

Some electrolytes in some aqueous batteries (such as alkaline batteries, including nickel-metal hydride batteries, among others) may comprise an alkaline solution (for example, a mixture of KOH and LiOH solutions). Some electrolytes in aqueous batteries (such as lead acid batteries) may comprise an acidic aqueous solution (for example, $H_2SO_4$ aqueous solution or HCl aqueous solution). Some electrolytes in aqueous batteries may comprise an organic solvent as an additive. Some electrolytes in aqueous batteries may comprise two or more organic solvent(s) or ionic liquid(s) or surfactant(s) as additive(s) or substantial components of the electrolyte.

Conventional electrodes utilized in Li or Li-ion batteries may be produced by (i) formation of a slurry comprising active materials, conductive additives, binder solutions and, in some cases, surfactant or other functional additives; (ii) casting the slurry onto a metal foil (e.g., Cu foil for most anodes used in Li or Li-ion batteries and Al foil for most cathodes used in Li or Li-ion batteries as well as for high potential anodes used in Li-ion batteries, such as lithium titanate); (iii) drying the casted slurry to completely evaporate the solvent; and (iv) optionally densifying the electrodes (e.g., by pressure calendaring). Instead of using such a solvent-based process for electrode fabrication, in some designs it may be advantageous to use dry electrode processing (without using solvents), including, but not limited to, electrostatic coating.

Some aspects of the present disclosure deal with the formation of carbon-containing composite electrode materials. A broad range of suitable active materials may be utilized in such composite electrode materials, the illustrative examples of which are described below.

Conventional cathode materials utilized in Li and Li-ion batteries may be of an intercalation-type, whereby metal ions are intercalated into and occupy the interstitial positions of such materials during the charge or discharge of a battery. Such cathode materials typically experience very small volume changes (e.g., around 0.1-8 vol. %) when used in battery electrodes during charge and discharge. Such cathode materials also typically exhibit high density (e.g., around 3.8-6 $g/cm^3$) and are relatively easy to mix in slurries. Polyvinylidene fluoride, or polyvinylidene difluoride (PVDF), is one of the most common binders used in these electrodes. Carbon black is the most common conductive additive used in these electrodes. However, such cathodes exhibit relatively small gravimetric and volumetric reversible capacities (e.g., less than around 200-220 mAh/g and less than 1 around 000 $mAh/cm^3$, respectively).

Illustrative examples of suitable intercalation-type active cathode materials that may be utilized in the context of this disclosure for Li or Li-ion cells include, but are not limited to: lithium nickel cobalt aluminum oxides (NCA—e.g., $LiNi_{0.8}Co_{0.15}Al_{0.05}O_2$, or $LiNi_xCo_yAl_zO_2$, where typically $x+y+z \le 1$, which may additionally comprise metals other than Co and Al for enhanced performance or reduced Co content), lithium nickel cobalt manganese aluminum oxides (NCMA), lithium nickel oxides (LNO—e.g., $LiNiO_2$ or others, which may also comprise metals other than Ni for enhanced stability), various lithium manganese oxides (LMO—e.g., $LiMnO_2$ or LMO, or $Li_2MnO_3$, or $LiMn_2O_4$, among others), various lithium nickel manganese cobalt oxides (NCM—e.g., $LiNi_{0.33}Co_{0.33}Mn_{0.3302}$, or $LiNi_{0.8}Co_{0.33}Mn_{0.1}O_2$ or, more generally, $LiNi_xCo_yMn_zO_2$, where typically $x+y+z \le 1$, or NCM, or NMC), various lithium nickel manganese oxide ($LiNi_{0.5}Mn_{0.5}O_2$, $LiNi_{0.25}Mn_{0.75}O_2$ or $LiNi_xMn_yO_2$, where typically $x+y \le 1$; $LiNi_{0.5}Mn_{0.15}O_4$ or $LiNi_xMn_yO_4$, where typically $x+y \le 2$ or, more broadly, NMO, which may also comprise metals other than Ni and Mn for enhanced stability and may have a layered or spinel or other suitable crystal structures), lithium cobalt oxide (LCO—e.g., in the form of $LiCoO_2$ or $LiCo_2O_4$, which may also comprise metals other than Co for enhanced performance or reduced cost), lithium cobalt aluminum oxides (LCAO), lithium manganese phosphate (LMP), lithium titanium sulfite ($LiTiS_2$), or lithium iron phosphate ($LiFePO_4$, LFP), lithium manganese phosphate ($LiMnPO_4$), lithium manganese iron phosphate (LMFP), lithium cobalt phosphate ($LiCoPO_4$), lithium nickel phosphate ($LiNiPO_4$), lithium vanadium fluoro phosphate ($LiVFPO_4$), lithium iron fluoro sulfate ($LiFeSO_4F$), various Li excess materials (e.g., lithium excess (incl. rock salt) transition metal oxides and oxy-fluorides such as $Li_{1.2}Mo_{0.467}Cr_{0.3}O_2$, $Li_{1.3}Mn_{0.4}Nb_{0.3}O_2$, $Li_{1.2}Mn_{0.4}Ti_{0.4}O_2$, $Li_{1.2}Ni_{0.333}Ti_{0.333}Mo_{0.133}O_2$ and many others), various high capacity Li-ion based materials with partial substitution of oxygen for fluorine or iodine (e.g., rock salt $Li_2Mn_{2/3}Nb_{1/3}O_2F$, $Li_2Mn_{1/2}Ti_{1/2}O_2F$, $Li_{1.5}Na_{0.5}MnO_{2.85}I_{0.12}$, among many others) and many other types of Li-containing disordered, rocksalt (including cation-disordered rocksalt), layered, tavorite, olivine, or spinel type active materials or their mixtures comprising at least oxygen or fluorine or sulfur and at least one transition metal and other lithium transition metal (TM, e.g., Mn, Ni, Co, Nb, Ti, Ta, Fe, V, Mo, etc.) oxides or phosphates or sulfates (or mixed) cathode materials that rely on the intercalation of lithium (Li) and changes in the TM oxidation state. In some designs, such materials may be doped or heavily doped. In addition to Li-based intercalation-type active materials, other examples of intercalation-type active materials may be based on (e.g., similar) Na-ion intercalation compounds, K-ion intercalation compounds, Ca-ion intercalation compounds, among others. In addition to Li-containing (or Na-containing, K-containing, Ca-containing, etc.) intercalation compounds, Li-free (or Na-free, K-free, Ca-free, etc.) version(s) of such or similar materials may be utilized (e.g., titanium oxide or oxyfluoride, niobium oxide or oxyfluoride, cobalt oxide or oxyfluoride, nickel oxide or oxyfluoride, nickel-aluminum oxide or oxyfluoride, nickel-cobalt-manganese oxide or oxyfluoride, nickel-cobalt-aluminum oxide or oxyfluoride, iron oxide or oxyfluoride, iron phosphate, many others and their various mixtures, etc.).

Some of such active intercalation materials may experience a gradient in composition or core-shell particle morphology. Some of such materials may be partially fluorinated or comprise some meaningful fraction of fluorine (e.g., around 0.001-10 at. %) in their composition. In some designs, high-voltage lithium transition metal oxide (or phosphate or sulfate or mixed or other) cathodes where TMs and oxygen (O) are covalently bonded, both TM and O may take part in electrochemical reduction-oxidation (redox) reactions during charge and discharge (including, but not limited to, those oxides or phosphate or sulfate or mixed cathodes that may comprise at least around 0.25 at. % of Mn, Fe, Ni, Co, Nb, Mg, Cr, Mo, Zr, W, Ta, Ti, Hf, Y, Sc, La, Sb, Sn, Si, or Ge). Note that Sc, Y and various lanthanides may often be considered "inner transition metals".

In addition to or instead of intercalation-type active materials, some designs of the present disclosure may comprise so-called pseudocapacitive (or mixed pseudocapacitive-intercalation-type) active materials. Suitable examples of pseudocapacitive (or mixed pseudocapacitive-intercalation-type) active materials include, but are not limited to, various (including mixed metal) oxides, hydroxides, oxyhydroxides, nitrides, oxynitrides, nitrates, phosphates, (oxy) phosphates, sulfides, sulfate hydroxide and other inorganic salts of Ru, Fe, Mn, Cu, Ti, Bi, V, Ni, Nb, Ce, Zr, Ta, Co, Sn, Sb, Si, In, Zn, Mo, Pb, La, Y and their various mixtures and derivatives. Such compounds may also comprise Li, Na, Ca, Cs, Mg and K. In some designs, such compounds may comprise two, three, four or more metals. In some designs, such compounds may comprise at least one transition metal.

Conventional anode materials utilized in Li-ion batteries are also of an intercalation-type, whereby metal ions are intercalated into and occupy interstitial positions of such materials during the charge or discharge of a battery. Such anodes experience small or very small volume changes when used in electrodes (e.g., around 0.05-10 vol. %). However, such anodes exhibit relatively small gravimetric and volumetric reversible capacities (typically less than around 200 mAh/g in case of lithium titanate (LTO) and typically less than around 370-400 mAh/g rechargeable specific capacity in the case of lithium vanadate, graphite- or hard carbon-based anodes and less than around 600 mAh/cm3 rechargeable volumetric capacity at the electrode level without considering the volume of the current collector foils).

Conversion-type active cathode materials may offer significantly higher specific capacities than intercalation-type materials. Suitable examples of these include, but are not limited to, metal fluorides, metal chlorides, metal sulfides, metal selenides, their various mixtures, composites and others. For example, fluoride-based cathodes may offer outstanding technological potential due to their very high capacities, in some cases exceeding around 300 mAh/g (greater than around 1200 mAh/cm$^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; CdF2 offers a theoretical specific capacity of 356 mAh/g; $ZnF_2$ offers a theoretical specific capacity of 519 mAh/g; $AlF_3$ also offers a high theoretical capacity, although at low lithiation potential. AgF and $AgF_2$ offer high theoretical specific capacities too and additionally exhibit very high lithiation potential. Mixtures (for example, in the form of alloys) of fluorides may typically offer a theoretical capacity approximately calculated according to the rule of mixtures. The use of mixed metal fluorides may sometimes be advantageous (e.g., may offer higher rates, lower resistance, higher practical capacity, or longer stability). The use of metal fluorides mixed with metals may also sometimes be advantageous (e.g., may offer higher rates, lower resistance, higher practical capacity, or longer stability). In a fully lithiated state, metal fluorides convert to a composite comprising a mixture of metal and LiF clusters (or nanoparticles). Examples of the overall reversible reactions of the conversion-type metal fluoride cathodes may include $2Li+CuF_2 \leftrightarrow LiF+Cu$ for $CuF_2$-based cathodes or $3Li+FeF_3 \leftrightarrow 3LiF+Fe$ for $FeF_3$-based cathodes. It will be appreciated that metal fluoride-based cathodes may be prepared in Li-free or partially lithiated or fully lithiated states. In addition to fluorides, other illustrative examples of conversion-type active electrode materials may include, but are not limited to, various metal oxy-fluorides, sulfo-fluorides, chloro-fluorides, oxy-chloro-fluorides, oxy-sulfo-fluorides, fluoro-phosphates, sulfo-phosphates, sulfo-fluoro-phosphates, mixtures of metals (e.g., Fe, Cu, Ni, Co, Bi, Cr, other metals, their various mixtures and alloys, partially oxidized metals and metal alloys, etc.) and salts (metal fluorides (including LiF or NaF), metal chlorides (including LiCl or NaF), metal oxy-fluorides, metal oxides, metal sulfo-fluorides, metal fluoro-phosphates, metal sulfides, metal oxy-sulfo-fluorides, their various combinations, etc.), and other salts that comprise halogen or sulfur or oxygen or phosphorous or a combination of these elements, among others. In some designs, F in metal fluorides may be fully or partially replaced with another halogen (e.g., Cl or Br or I, etc.) or their mixtures to form the corresponding metal chlorides or metal fluoride-chlorides and other metal halide compositions. In some designs, metal halides may be at least partially dissolved in the electrolyte. In some designs, at least a portion of active material may be stored in a liquid form (e.g., in electrolyte).

Yet another example of a promising conversion-type cathode (or, in some cases, anode) material is sulfur (S) (in a Li-free state) or lithium sulfide ($Li_2S$, in a fully lithiated state). In some designs, selenium (Se) may also be used together with S or on its own for the formation of such cathode active materials.

In some designs, conversion-type active cathode materials may also advantageously comprise metal oxides or mixed metal oxides. In some designs, such (nano)composites may advantageously comprise metal sulfides or mixed metal sulfides. In some examples, mixed metal oxides or mixed metal sulfides may comprise lithium. In some examples, mixed metal oxides may comprise titanium or vanadium or manganese or iron metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive (e.g., in the range from around $10^{-7}$ to around $10^{+4}$S/cm). In some examples, various other intercalation-type active materials may be utilized instead of or in addition to metal oxides or metal sulfides. In some designs, such an intercalation-type active material exhibits charge storage (e.g., Li insertion/extraction capacity) in the potential range close to that of S or $Li_2S$ (e.g., within around 1.5-3.8 V vs. $Li/Li^+$).

In some designs, the use of so-called Li-air cathodes (e.g., cathodes with active material in the form of $Li_2O_2$, $Li_2O$, LiOH in their lithiation state) or similar metal-air cathodes based on Na, K, Ca, Al, Fe, Mn, Zn and other metals (instead of Li) may similarly be beneficial due to their very high capacities. In some designs, such cathode active materials should ideally reversibly react with oxygen or oxygen containing species in the electrochemical cell and may fully disappear upon full de-lithiation (metal removal). These are also considered to belong to conversion-type cathodes.

Conversion-type anodes may offer specific capacities much higher than graphitic carbon through reactions generalized by: $nLi+M_aX_b \leftrightarrow aM+bLi_nX$, where M may be a metal or semimetal (intermetallic), X is an anion (e.g., O in the case of anodes, but may also be N, S, P, F, etc.) or hydrogen (H). Suitable examples of such conversion-type active anode materials include, but are not limited to, various oxides, nitrides, sulfides, phosphides, fluorides, hydrides, etc. In some designs, these may include fully or partially oxidized non-carbon group IV elements (e.g., oxides or nitrides or sulfides or phosphides of Si, Ge, Sn or Pb) and fully or partially (e.g., oxides or nitrides or sulfides or phosphides) of Al, Ga, In, Sb, Bi, Fe, Ti, Mn, Cu, Ni, Co, V, and Zn, among others.

Alloying-type active materials sometimes are considered a sub-class of conversion-type active anode materials. Alloying-type materials for use in Li-ion batteries also offer higher gravimetric and volumetric capacities compared to intercalation-type anodes. Alloying-type active anode materials also may offer lower irreversible first cycle losses compared to the described above conversion-type anode materials (such as various oxides, nitrides, sulfides, phosphides or hydrides, etc.). For example, Earth-abundant silicon (Si) offers approximately 10 times higher gravimetric capacity and approximately 3 times higher volumetric capacity compared to an intercalation-type graphite (or carbonaceous soft carbon, hard carbon or graphite-like) anode. In some designs, "Si-based" active material may include Si or, alternatively, Si doped or heavily doped with nitrogen (N), phosphorous (P), boron (B) or other elements or be alloyed with various other metals. As previously described, in addition to Si-based active material, other Si-comprising active material, such as silicon oxides ($SiO_x$) or oxynitrides ($SiO_xN_y$) or nitrides ($SiN_y$) or hydrides or other Si element-comprising active material (including those that are partially reduced by Li or Mg), and Si-comprising metal alloys may be utilized (e.g., some Si-comprising active materials include Si atoms in their compositions as in Si-based ceramics or metal alloys, but are not considered Si-based in this context, with Si-based active materials generally encompassing doped, heavily doped or undoped Si). These Si-comprising active materials offer lower capacity relative to Si-based active material but offer reduced volume changes and typically improve cycle stability, although commonly at the expense of higher first cycle losses or faster degradation or both. In addition to Si-based or (non-Si-based) Si-comprising active anode materials, other examples of such high capacity (e.g., nanocomposite) anodes comprising alloying-type (or, more broadly, conversion-type) active materials include, but are not limited to, those that are based on or comprise germanium (Ge), antimony (Sb), aluminum (Al), magnesium (Mg), zinc (Zn), gallium (Ga), arsenic (As), phosphorous (P), silver (Ag), cadmium (Cd), indium (In), tin (Sn), lead (Sb), bismuth (Bi), their various mixtures and alloys (with themselves or Si or other "inactive" metals, such as iron (Fe) or copper (Cu), among others), and others. Similarly, such materials may be doped or heavily doped and be in the form of oxides, oxynitrides, nitrides, hydrides or other metal or semi-metal comprising compounds.

Alloying-type active anode materials sometimes are considered a sub-class of conversion-type active anode materials. Alloying-type active anode materials for use in Li-ion batteries also offer higher gravimetric and volumetric capacities compared to intercalation-type anodes. Alloying-type active anode materials also may offer lower irreversible first cycle losses compared to the described above conversion-type anode materials (such as various oxides, nitrides, sulfides, phosphides or hydrides, etc.). For example, Earth-abundant silicon (Si) offers approximately 10 times higher gravimetric capacity and approximately 3 times higher volumetric capacity compared to an intercalation-type graphite (or carbonaceous soft carbon, hard carbon or graphite-like) anode. In some designs, as noted above, "Si-based" active material may include Si or Si doped or heavily doped with nitrogen (N), phosphorous (P), boron (B) or other elements or be alloyed with various other metals. In addition to Si-based active material, other Si-comprising active material, such as silicon oxides ($SiO_x$) or oxynitrides ($SiO_xN_y$) or nitrides ($SiN_y$) or hydrides or Si-comprising alloys or other Si element-comprising active material (including those that are partially reduced by Li or Mg) may be utilized. These Si-comprising active materials offer lower capacity relative to Si-based active material but offer reduced volume changes and typically improve cycle stability, although commonly at the expense of higher first cycle losses or faster degradation or both. In addition to Si-based or (non-Si-based) Si-comprising active anode materials, other examples of such high capacity (e.g., nanocomposite) anodes comprising alloying-type (or, more broadly, conversion-type) active materials include, but are not limited to, those that are based on or comprise germanium (Ge), antimony (Sb), aluminum (Al), magnesium (Mg), zinc (Zn), gallium (Ga), arsenic (As), phosphorous (P), silver (Ag), cadmium (Cd), indium (In), tin (Sn), lead (Sb), bismuth (Bi), their various mixtures and alloys (with themselves or Si or other "inactive" metals, such as iron (Fe) or copper (Cu), among others), and others. Similarly, such materials may be doped or heavily doped and be in the form of oxides, oxynitrides, nitrides, hydrides or other metal or semi-metal comprising compounds.

In some designs, pure Li metal may be used as active anode material in some aspects of the present disclosure (e.g., for use in combination of porous carbon materials in the anode). In some designs, such anodes may advantageously comprise other material(s) in addition to carbon and lithium metal (e.g., alloying or conversion-type anode materials, polymers, etc.). In some designs, such composites may be in the form of particles that are cast and formed into an electrode using a binder by suitable mechanism. In some designs, such Li metal—C composite anodes may at least partially form during the first charge (after the cell construction) using metal ions (e.g., Li ions) from the Li-containing cathode active material. For example, Li metal may plate (be electrodeposited) inside the pores of suitable carbon during the first charge. In some designs, it may be advantageous for at least a portion of such pores (e.g., around 10-100% of the pores) to remain free from electrolyte and available for Li metal deposition during cell operation. In some designs, pores within suitable porous carbon may be closed by forming a shell around the porous carbon (and/or by incorporating pore-plugging material) before or after the electrode fabrication. In some designs, solid electrolytes (e.g., polymer or inorganic or polymer-inorganic composite) may be advantageously utilized in order to reduce side reactions, reduce first cycle capacity losses, reduce Li-dendrite formation and/or improve cell safety.

A broad range of alloying-type, metal, conversion-type active anode and cathode materials as well as intercalation-type and pseudocapacitor-type active anode and cathode materials may be successfully utilized in the context of the present disclosure. In some designs, such materials may be utilized for the formation of carbon-containing composites. It may be advantageous in some designs (e.g., when active material is loaded into composite particles or electrodes prior to electrode assembling into cells) to employ those active materials that have partial vapor pressure below around $10^{-10}$ torr at around 400 K (preferably below $10^{-13}$ torr at around 400 K). For example, in some designs, electrodes may need to be dried at around 400 K prior to cell assembling and substantial evaporation of active material may not only induce contamination and create a safety hazard, but also severely reduce electrode uniformity and the resulting cell performance. In some designs, the electrodes may be assembled from the electrode composition (e.g., comprising the composite particles) while in a discharged state.

In some designs in the context of the present disclosure, the following polymer binders may be successfully used in electrodes comprising intercalation-type or conversion-type or mixed anode materials: polyvinylidene fluoride, or polyvinylidene difluoride (PVDF), various salts of carboxymethyl cellulose (CMC) such as Na-CMC and others, styrene-butadiene rubber (SBR), xanthan gum, polyvinyl chloride (PVC), polyacrylic acid (PAA) and its various derivatives including various salts of PAA (such as Na-PAA, Li-PAA, $NH_4$-PAA and others), alginic acids and its various derivatives including various salts of alginic acid (e.g., Na-alginate, Li-alginate, Ca-alginate, Al-alginate, etc.), chitosan, butylacrylate, gum Arabic, guar gum, carrageenan, gelatin, polyvinyl alcohol (PVA) and their various mixtures and co-polymers. Carbon black is the most common conductive additive used in anodes, although single-wall, double-wall and multi-wall carbon nanotubes, exfoliated graphite (multi-layered graphene flakes) and metal nanowires may also be used in some designs.

In many applications and electrode designs, batteries with intercalation-type or conversion-type or mixed cathode materials or with intercalation-type or conversion-type (incl. alloying-type, such as Si or Sn, etc.) or mixed anode materials may exhibit sufficiently fast charge and discharge rates (e.g., charging to around 80% of the maximum capacity within around 10-60 minutes). In some applications (e.g., for even faster rate performance (e.g., charging to around 80% of the maximum capacity within around 1-600 seconds with "regular" areal capacity loading or for 1-6000 sec with "high" areal capacity loading) or for better cycle stability or for better calendar life or for better performance at low or at high temperatures or for reduced reactivity with electrolyte or for higher capacity utilization or for other performance gains), it may be advantageous to produce composites comprising such active materials for use in the electrodes of batteries (e.g., Li-ion or Na-ion batteries, among others).

In some designs, it may further be advantageous for such active material-comprising composites (e.g., in the form of composite particles) to comprise carbon due to carbon's high electrical conductivity, acceptable mobility for Li and other ions, good mechanical properties and good chemical and electrochemical resistance.

In some designs, it may be advantageous for such composites (e.g., in the form of composite particles) comprising both active (ion storing) materials (including, but not limited to intercalation-type materials, conversion-type materials including alloying type materials, pseudocapacitive materials, mixed-type active materials, etc.) and (inactive) carbon to have a meaningful weight fraction of (non-carbon) active materials. In some designs, the fraction of such active materials (e.g., Si-based or Si-comprising active material(s) in case of C and Si-comprising anode composites, to provide an illustrative example) may preferably range from around 20 wt. % to around 98 wt. % (in some designs, from around 20 wt. % to around 40 wt. %; in other designs, from around 40 wt. % to around 60 wt. %; in yet other designs, from around 60 wt. % to around 80 wt. %; in yet other designs, from around 80 wt. % to around 98 wt. %) in as-produced or as-used for electrode or battery assembling stage. In some designs, the weight ratio of active material to carbon may preferably range from around 1:4 to around 50:1 (in some designs, from around 1:1 to around 20:1). Too low fraction of active materials may lead to undesirably low volumetric capacity, while too high fraction of active materials may lead to reduced rate and stability.

Note that in some designs, instead of or in addition to pure intercalation-type active materials or pure conversion-type active materials, mixed materials that experience both intercalation and conversion-type electrochemical reactions may be utilized. In some designs, intercalation-type active material within the electrodes may be in the form of the individual particles bonded together (e.g., with a binder and optional conductive additives) to form an electrode or in the form of composite particles that comprise intercalation-type active material, where particles may be similarly bonded together to form an electrode. Similarly, in some designs, conversion-type active material within the electrodes may be in the form of the individual particles bonded together (e.g., with a binder and optional conductive additives) to form an electrode or in the form of composite particles that comprise conversion-type active material, where particles may be similarly bonded together to form an electrode. In some designs, electrodes may be purposely comprised of more than one material or material type (e.g., comprise both intercalation-type active material and conversion-type active material). In some designs, the particles comprising intercalation-type active material and the particles comprising conversion-type active material may exhibit sufficiently different sizes and/or BET specific surface area. In addition to conversion-type and intercalation-type active materials, some of the materials may be of pseudocapacitive-type or at least experience pseudocapacitive reactions in addition to other energy storage electrochemical reaction mechanisms.

In some designs, the active material distribution within electrodes may comprise 100% of such carbon-containing composites (e.g., in some designs, Si-comprising anode material composites in case of anodes for Li-ion batteries) or alternatively may comprise a mixture of composites and "regular" active materials (e.g., graphite or soft carbon or hard carbon or their various mixtures in case of anodes for Li-ion batteries). In some designs, "regular" active materials may be intercalation-type active materials. In some designs, the suitable mass fraction of the composite particles in such "mixed" electrodes may range from around 1 to around 99 wt. % of all the active material particles (in some designs, from around 1 wt. % to around 5 wt. %; in other designs, from around 5 wt. % to around 10 wt. %; in yet other designs, from around 10 wt. % to around 20 wt. %; in yet other designs, from around 20 wt. % to around 30 wt. %; in yet other designs, from around 30 wt. % to around 40 wt. %; in yet other designs, from around 40 wt. % to around 50 wt. %; in yet other designs, from around 50 wt. % to around 60 wt. %; in yet other designs, from around 60 wt. % to around 70 wt. %; in yet other designs, from around 70 wt. % to around 80 wt. %; in yet other designs, from around 80 wt. % to around 90 wt. %; in yet other designs, from around 90 wt. % to around 99 wt. %) in a given electrode (that is not counting the weight of the binder, conductive and other additives as well as the weight of the current collectors), depending on the properties of such materials and also the requirements and demands of an application. In some designs, smaller than around 1 wt. % fraction may be too small to make a substantial difference. Similarly, in some designs, larger than around 99 wt. % fraction, on the other hand, may lead to undesirable increase in the electrode mixing complexity and cost and may be better replaced with around 100 wt. % of composite(s) without any substantial sacrifice with the electrode properties. However, any fraction (from around 0 to around 100 wt. %) may be suitable for some applications.

In some designs, the performance characteristics and cycle stability of electrodes comprising some of such carbon comprising composite materials (e.g., in the form of composite particles) may become particularly unsatisfactory for applications requiring ultra-fast charging (e.g., within around 1-600 seconds) or long calendar life or long cycle life or low first cycle losses or other properties, particularly if the electrode areal capacity loading exceeds around 1-2 mAh/cm$^2$, even more if the electrode areal capacity exceeds around 4-5 mAh/cm$^2$, and further more if the electrode areal capacity exceeds around 6-8 mAh/cm$^2$ (e.g., 6-18 mAh/cm$^2$ or even more). Higher loading, however, is advantageous for reducing cost of energy storage devices and increasing their energy density and specific energy. One or more embodiments of the present disclosure are directed to synthesis processes, compositions and various physical and chemical properties of carbon comprising composite electrodes that facilitate satisfactory performance for electrode area loadings in the range from around 2 mAh/cm$^2$ to around 5 mAh/cm$^2$ and more so for loadings in the range from around 5 mAh/cm$^2$ to around 8 mAh/cm$^2$ and even more so for loadings in the range from around 8 mAh/cm$^2$ to around 16 or even around 18 mAh/cm$^2$ (e.g., in some designs, an aerial capacity loading of an electrode composition may range from around 2 mAh/cm$^2$ to around 18 mAh/cm$^2$).

In some designs, degradation of Li-ion cells with some carbon-containing composite materials (e.g., in the form of the composite particles comprising both carbon and active material(s)) in at least one of their electrodes (e.g., in an anode or in a cathode or in both) may become particularly undesirably fast for multi-layered (e.g., stacked or rolled) medium sized cells (e.g., cells with cell capacity in the range from 0.2 Ah to around 10 Ah), even more so for large cells (e.g., cells with cell capacity in the range from around 10 Ah to around 40 Ah), even more so for ultra-large cells (e.g., cells with cell capacity in the range from around 40 Ah to around 400 Ah) or gigantic cells (e.g., cells with cell capacity in the range from around 400 Ah to around 4,000 Ah or even more). However, multi-layered medium or large size cells may be attractive for some electronic devices and multi-layered large, ultra-large or gigantic cells may be particularly attractive for use in some electric transportation or grid storage applications. One or more aspects of the present disclosure facilitates utilization of particular types of carbon with suitable microstructural, chemical, physical and other properties in order to mitigate or overcome some or all of such limitations of carbon-containing composite materials and substantially enhance performance of such Li-ion cells In some designs (e.g., for faster charging rate or for improved stability, etc.) it may be advantageous for such carbon comprising composites (e.g., carbon comprising composite particles) with (non-carbon) active materials to comprise pores (e.g., surface pores, closed internal pores that are inaccessible to external materials such as electrolyte, open internal pores that are accessible to external materials such as electrolyte, inter-connected open internal pores, etc.). In some designs, it may be advantageous for the "total" pore volume (inclusive of closed internal pores, if any) in the composite to range from around 0.01 cm$^3$/g to around 2.0 cm$^3$/g (in some designs, from around 2 vol. % to around 75 vol. %), depending on the volume changes in (non-carbon)

active materials during cycling, ionic conductivity of the composite components, degree of side reactions with electrolyte at operating conditions and other factors. In some designs (e.g., when volume changes in active materials are small and when side reactions are moderate, it may be advantageous for at least some portion (e.g., around 0.1-100 vol. %) of all the pores in the composites to be accessible to electrolyte while the electrode composition is made part of an energy storage device cell (e.g., in case of 100 vol. % in this context, there are essentially no closed internal pores). In some designs, it may be advantageous for at least some portion (e.g., around 1-100 vol. %) of the pores to be interconnected to neighboring pores and accessible from the interior (or center) of the composite particles. In some designs, it may be advantageous for at least some portion (e.g., around 1-100 vol. %) of the pores to exhibit characteristic dimensions (e.g., diameter or width) in the range from around 0.3 nm to around 600 nm. In some designs, it may be advantageous (e.g., to maximize volumetric capacity of the electrodes, while attaining high-rate performance) for at least some fraction (e.g., around 0.1-30 vol. %) of all the pores (including both accessible and inaccessible to electrolyte when the electrode composition is made part of an energy storage device cell) to exhibit characteristic dimensions in the range from around 10 nm to around 100 nm. In some designs, it may be advantageous (e.g., to maximize volumetric capacity of the electrodes or to improve stability) for at least some fraction (e.g., around 30-100 vol. %) of all the pores (including both accessible and inaccessible to electrolyte when the electrode composition is made part of an energy storage device cell) to exhibit characteristic dimensions in the range from around 0.3 nm to around 10 nm. In some designs, it may be advantageous (e.g., to maximize volumetric capacity of the electrodes or to improve stability) for at least some fraction (e.g., around 10-100 vol. %; in some designs around 30-100 vol. %—such as around 30-40 vol. % or around 40-50 vol. % or around 50-60 vol. % or around 60-70 vol. % or around 70-80 vol. or around 80-90 vol. % or around 90-100 vol. %) of all the pores (in composites) to exhibit characteristic dimensions in the range from around 0.3 nm to around 6 nm. In some designs (e.g., when active materials exhibit small (e.g., around 0.1-10 vol. %) or moderate (e.g., around 10-120 vol. %) volume changes during cycling and maximizing volumetric capacity of the electrodes and volumetric energy storage characteristics is desired), it may be advantageous for the volume fraction of all the pores in such composites to be small (e.g., around 0.001-5 vol. %) or moderate (e.g., around 5-20 vol. %). In some designs (e.g., to maximize energy storage characteristics, such as power or energy density or cycle stability or achieve a compromise between these or other characteristics), it may be advantageous for the so-called Brunauer—Emmett—Teller (BET) specific surface area (SSA) or density functional theory (DFT) SSA of the composite electrode materials (particles) (e.g., as measured using $N_2$ or Ar or $CO_2$ or $H_2$ sorption technique and analyzed using BET or DFT methods) to range from around 0.25 m$^2$/g to around 1000 m$^2$/g (in some designs, from around 0.25 m$^2$/g to around 2 m$^2$/g; in other designs, from around 2 m$^2$/g to around 10 m$^2$/g; in other designs, from around 10 m$^2$/g to around 40 m$^2$/g; in other designs, from around 40 m$^2$/g to around 100 m$^2$/g; in other designs, from around 100 m$^2$/g to around 400 m$^2$/g; in other designs, from around 400 m$^2$/g to around 1000 m$^2$/g, depending on the type of (non-carbon) active material and electrolyte used and depending on the desired characteristics of the battery cells, among other factors). Larger SSA may allow faster charge or discharge rate performance, but may also lead to higher fraction (rate) of some undesirable side reactions (e.g., with electrolyte). The rate of such undesirable (e.g., leading to self-discharge or to gassing or to formation of deposits or to the irreversible consumption of electrolyte or to electrode or cell swelling, faster degradation, etc.) reactions may depend on the operating electrode potential, operating temperature, and electrolyte composition, among other factors. The acceptable rates depend on the particular application. However, for many electrolyte systems and for most cell designs and applications, it may generally be preferable for the BET SSA to range from around 0.25 m²/g to around 1000 m²/g. In some designs, it may be preferable for the BET SSA to range from around 1 m²/g to around 100 m²/g. In some designs, it may be preferable for the BET SSA to range from around 1 m²/g to around 40 m²/g.

In some designs (particularly for higher BET SSE composites), it may be advantageous for the active (e.g., intercalation-type or conversion-type or mixed-type) materials to be protected (from undesirable interactions with electrolyte) by a protective surface (shell) layer. In some designs, the suitable thickness of the protective surface layer may range from around 0.3 nm to around 60 nm (e.g., in some designs, from around 0.3 nm to around 3 nm; in some designs from around 3 nm to around 6 nm; in some designs, from around 6 nm to around 10 nm; in some designs, from around 10 to around 20 nm; in some designs, from around 20 nm to around 40 nm; yet, in some designs, from around 40 nm to around 60 nm). Smaller thickness may be less effective for some applications, while larger thickness may lead to reduced rate performance of reduced volumetric and gravimetric energy densities for some applications. In some designs, the protective surface layer may directly coat at least a portion (e.g., around 1-100% of the outer surface area) of the active material(s)/particle(s) that otherwise would be exposed to electrolyte during at least some time of the battery assembling or operation. In some designs where the shell partially covers the outer surface area (e.g., protective material is applied selectively so as to predominately cover particle surface regions that include pores that would otherwise be open pores but are closed off by the protective surface layer, etc.), the protective surface layer may alternatively be characterized as pore-plugging material (rather than a shell). In some examples, the protective surface layer may comprise carbon. In some examples, the protective surface layer may comprise an oxide, a fluoride, an oxyfluoride, a sulfide, a nitride, an oxynitride, a nitride fluoride, a phosphate, a fluoro-phosphate (phosphate fluoride), or another material that comprises atoms of metals or semi-metals. In some designs, the protective surface layer material may comprise one or more of the following elements: transition, alkali or alkaline-earth metal (such as iron (Fe), manganese (Mn), copper (Cu), yttrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur (S), selenium (Se), tellurium (Te), hydrogen (H) and carbon (C).

In some designs (e.g., to maximize electrode uniformity and battery stability), it may be advantageous for such carbon comprising composite electrode particles to exhibit volume-average characteristics dimensions (e.g., diameter) in the range from around 5 nanometers (nm) to around 150 microns (in some designs, from around 200 nm to around 30 microns), as measured using a scanning electron microscope (SEM) or a laser particle size analyzer or a combination of several characterization techniques and numerical analyses/modeling. Too small of a particle size may lead to difficulties achieving high packing density for some applications. At the same time, a high-volume fraction of smaller particles may also result in small interparticle pore size, which may slow down rate performance in the electrode and lead to faster cell degradation in some designs (particularly, if batteries are operating at faster rates or at lower temperatures). Too large of an average particle size, on the other hand, may lead to local variations in the electrode capacity loading and may result in faster cell degradation in some designs (particularly if the battery is operating at lower temperatures or at faster rates). The composite particle size, the interconnectivity of the pores in the composite as well as the ionic and electronic transport within the composite materials may affect the particle-level rate performance. In some designs, too large of an average particle size may also result in poor (or insufficiently good for a given application) charge or discharge rate performance. While various electrode and electrolyte properties, battery cell operational conditions (e.g., current, rate, temperature, charge voltage, electrode operating potential, etc.), porosity and shape of the composite particles and other parameters may affect optimal composite particle size, it is advantageous in some designs for such composite electrode particles to exhibit volume-average characteristic dimensions in the range from around 200 nm to around 30 microns (in some designs—from around 0.2 micron to around 1 micron; in other designs from around 1 to around 2 micron; in yet other designs from around 2 microns to around 5 microns; in yet other designs from around 5 microns to around 10 microns; in yet other designs from around 10 microns to around 30 microns). Suitable electrode-level porosity (e.g., mostly—the volume fraction of the space in the electrode filled by the electrolyte) may be affected by the volume fraction of the binder, volume fraction of conductive and other additive and volume fraction of active (composite) particles (and their open porosity), electrolyte conductivity, electrode thickness, battery operation and other properties. Such porosity may also change during cycling if active materials or composites comprising active material exhibit substantial volume changes during cycling. However, values of such electrode porosity ranging from around 1 vol. % to around 75 vol. % (e.g., in some designs—after 0-10 cycles after so-called battery "formation" and quality control stages; in some designs—after electrode assembling/calendaring and prior to electrolyte infiltration in cells) are acceptable or advantageous for some applications (in some designs—from around 1 vol. % to around 10 vol. %; in other designs from around 10 vol. % to around 20 vol. %; in yet other designs from around 20 vol. % to around 30 vol. %; in yet other designs from around 30 vol. % to around 40 vol. %; in yet other designs from around 40 vol. % to around 50 vol. %; in yet other designs from around 50 vol. % to around 60 vol. %; in yet other designs from around 60 vol. % to around 75 vol. %). Smaller volume fraction may lead to slow charging or discharging rates and faster cell degradation in some applications. Larger fraction may undesirably reduce volumetric energy density, rate performance and increase battery costs in some applications. In some designs, the volume fraction of the electrode occupied (filled) with a suitable electrolyte may advantageously range from around 1 vol. % to around 75 vol. %. In some designs, the suitable volume fraction of the electrode occupied (filled) with a suitable electrolyte may even be in narrower range, from around 5 vol. % to around 60 vol. % (or even in a narrower range, for example, from around 10 vol. % to around 40 vol. %).

In some designs, a large portion (e.g., around 70-100 vol. %) of (non-carbon) active material within carbon comprising composite electrode particles may be in the form of smaller particles (rather than, e.g., in the form of continuous or discontinuous coatings or in the form of a porous unibody that is filled with carbon or other (inactive or less active) materials). In some designs, the volume-average size of active material particles (within the carbon comprising composite electrode particles) may advantageously range from around 0.5 nm to around 200 nm (in some designs, from around 0.5 nm to around 5 nm; in other designs, from around 5 nm to around 10 nm; in yet other designs, from around 10 nm to around 20 nm; in yet other designs, from around 20 nm to around 40 nm; in yet other designs, from around 40 nm to around 60 nm; in yet other designs, from around 60 nm to around 100 nm; in yet other designs, from around 100 nm to around 200 nm). Too large size may not provide sufficiently fast electrochemical reactions in some designs, while too small size may lead to undesirable side-reactions or too small mass loadings of active material particles within such composites, thus limiting energy characteristics of the energy storage devices built with these composite particles in some designs. In some designs, the volume-average size of crystalline grains of active material particles (within the prepared carbon comprising composite electrode particles) may advantageously range from around 0.5 nm to around 200 nm (in some designs, from around 0.5 nm to around 5 nm; in other designs, from around 5 nm to around 10 nm; in yet other designs, from around 10 nm to around 20 nm; in yet other designs, from around 20 nm to around 40 nm; in yet other designs, from around 40 nm to around 60 nm; in yet other designs, from around 60 nm to around 100 nm; in yet other designs, from around 100 nm to around 200 nm), as analyzed using diffraction or scattering techniques (e.g., X-ray diffraction, XRD) or transmission electron microscopy (TEM) or other suitable techniques.

In one illustrative example, porous composite anode powders for Li-ion batteries with individual particles were prepared, comprising: (i) porous carbon infiltrated with (ii) silicon nanoparticles and enclosed in (iii) protective shelling material, wherein such a material comprises closed pores. XRD measurements of the porous composite anode powders were conducted using a Rigaku SmartLab diffractometer utilizing a Cu K-alpha radiation source, at scan rates between 0.5 and 10 degrees/min from 3 to 158 degrees 2-theta. Powder XRD data were collected in a Bragg-Brentano geometry using X-ray wavelength of 1.5406 Å. Various incident and detector optics were used, notably beam masks between 2-15 mm, and Soller slits between 0.5 and 5°. A 2D silicon detector was used for all measurements. According to Scherrer analysis of the Si (111) Bragg peak, such porous composite anode powder samples demonstrated average Si crystallite size in the range from around 2 nm to around 100 nm (in some composite particle designs, from around 2 nm to around 20 nm; in other designs, from around 20 to around 40 nm; in yet other designs, from around 40 to around 60 nm; in yet other designs, from around 60 to around 100 nm).

FIG. 2A illustrates some suitable composite particle designs with Si embedded within a porous carbon matrix material, where average Si crystallite size determined using Scherrer analysis of the Si (111) Bragg peak was in the range from around 5 nm to around 16 nm. In FIG. 2A, different color plots correspond to different experimental series of suitable Si- and C-containing composites produced.

FIG. 2B illustrates some other suitable composite particle designs with Si embedded within a porous carbon matrix material, where average Si crystallite size determined using Scherrer analysis of the Si (111) Bragg peak was in the range from around 3.5 nm to around 8.5 nm.

Other suitable particle designs and yet other processing conditions may result in either larger (up to 60-100 nm, in some designs) or smaller (down to ~2 nm) average Si grain sizes. In some suitable particle designs and processing conditions, at least a portion of Si in the composite particles may be amorphous.

In some designs, it may be advantageous for the carbon in such carbon-containing composites (e.g., composite particles that are also comprising active (non-carbon) materials) to comprise mostly (e.g., around 90-100%) $sp^2$-bonded carbon atoms (e.g., in order to attain high electrical conductivity or for other performance benefits). In some designs, it may be advantageous (e.g., for faster rate performance) for the carbon to be sufficiently electrically conductive (e.g., with electrical conductivity in the range from around 1 S/m to around $10^6$ S/m).

In some designs, the active material particles (of the composite carbon-containing electrode particles) may preferably be located inside (e.g., confined by) the pores of the suitable carbon particles. In some designs, from around 50 wt. % to around 100 wt. % of the active material in the composite particles may be confined within pores defined in the carbon particles.

In some designs, the composite carbon-containing and active material-containing electrode particles may comprise porous carbon. In some process designs, porous carbon particles may be infiltrated with active material (or active material particles) in at least one of processing (or synthesis) stage to form such carbon-containing and active material-containing electrode particles (e.g., Si-containing composite anode particles with Si-based active material and/or Si-comprising active material). In some designs, such a porous carbon may exhibit specific properties that make composite particles perform particularly in Li-ion batteries and other related applications.

In some designs, it may be advantageous for the porous carbon (e.g., as used for the composite formation or eventually produced in the course of the composite formation) to exhibit an average so-called BET specific surface area (SSA) (as measured by $CO_2$, $N_2$, $H_2$ or Ar gas sorption) in the range from around 400 $m^2$/g to around 5,000 $m^2$/g (prior to forming composites). In some designs, it may be advantageous for the porous carbon particles to exhibit open porosity in the range from around 35 vol. % to around 93 vol. % and the total open pore volume (e.g., void space) in the range from around 0.3 $cm^3$/g to around 6 $cm^3$/g, as determined by gas sorption (e.g., $CO_2$, $N_2$, $H_2$, Ar, etc.) or other suitable measurements. In some designs, the suitable BET SSA may range from around 400 $m^2$/g to around 1,000 $m^2$/g; in other designs, the suitable BET SSA may range from around 1000 $m^2$/g to around 2,000 $m^2$/g; in yet other designs, the suitable BET SSA may range from around 2,000 $m^2$/g to around 3,000 $m^2$/g; in yet other designs, the suitable BET SSA may range from around 3,000 $m^2$/g to around 4,000 $m^2$/g; in yet other designs, the suitable BET SSA may range from around 4,000 $m^2$/g to around 5,000 $m^2$/g, depending on the active material chemistry and properties in a battery, cell fabrication procedures, processing involved in infiltrating active materials into the porous carbon, cell fabrication procedures and other factors. BET SSA larger than 5,000 $m^2/g$ may make it difficult to handle and produce composites, may also lead to inferior performance in some designs and, in some cases, be too expensive (for battery applications) to produce and handle. BET SSA smaller than 400 $m^2/g$ may undesirably limit rate performance and/or volumetric capacity (or capacitance) or other important properties of the composites in some electrochemical energy storage applications. In some designs, the suitable carbon pore volume may range from around 0.3 $cm^3/g$ to around 1 $cm^3/g$; in other designs, the suitable pore volume may range from around 1 $cm^3/g$ to around 2 $cm^3/g$; in yet other designs, the suitable pore volume may range from around 2 $cm^3/g$ to around 3 $cm^3/g$; in yet other designs, the suitable pore volume may range from around 3 $cm^3/g$ to around 4 $cm^3/g$; in yet other designs, the suitable pore volume may range from around 4 $cm^3/g$ to around 5 $cm^3/g$; in yet other designs, the suitable pore volume may range from around 5 $cm^3/g$ to around 6 $cm^3/g$, depending on the active material chemistry and properties in a battery, cell fabrication procedures, processing involved in infiltrating active materials into the porous carbon, cell fabrication procedures and other factors. In some designs, the pore volume larger than around 6 $cm^3/g$ may make it difficult to handle and produce composites, may also lead to inferior performance in some designs and, in some cases, be too expensive (for battery applications) to produce and handle. The pore volume smaller than 0.4 $cm^3/g$ may undesirably limit rate performance and/or volumetric capacity (or capacitance) or other important properties of the composites in some electrochemical energy storage applications.

In some designs, it may be advantageous for the porous carbon (for the use in the formation of suitable electrode composites; for example, for infiltration with active material or, for example, for making composites with active material precursors and subsequent conversion of the active material precursor to active material, etc.) to comprise near-spherical (or near-elliptical) pores. In some designs, it may be advantageous for such near-spherical (or near-elliptical) pores to exhibit average pore sizes in the range from about 2 nm to about 100 nm (in some designs, from about 2 nm to about 20 nm; in other designs, from about 20 nm to about 100 nm). In some designs, it may be advantageous for such near-spherical (or near-elliptical) pores to be separated from each other by microporous (comprising mostly sub-2 nm pores) carbon material. Spherical (or near-spherical) pores exhibit better mechanical properties (e.g., compared to slit-shaped pores) and may better maintain mechanical integrity if filled with active material that exhibits volume changes (e.g., Si or Sn, etc.). Separating such (e.g., relatively large) spherical pores from each other and from the surface of the composite particles may help seal them to prevent undesirable interactions with electrolyte. The mostly sub-2 nm pores in the material separating the individual spherical pores may exhibit mostly slit-shape, in some designs. In some designs, the average thickness of the mostly microporous carbon "walls" separating the spherical pores may range from about 1 nm to about 100 nm (e.g., in some designs, from about 1 nm to about 10 nm; in other designs, from about 10 nm to about 20 nm; in other designs, from about 20 nm to about 50 nm; in yet other designs, from about 50 nm to about 100 nm). In some designs, the average pore volume of such microporous carbon "walls" may range from about 0.05 cc/g to about 1.20 cc/g (in some designs, from about 0.05 cc/g to about 0.25 cc/g; in other designs, from about 0.25 cc/g to about 0.5 cc/g; in other designs, from about 0.5 cc/g to about 0.75 cc/g; in yet other designs, from about 0.75 cc/g to about 1.20 cc/g), as determined, for example, by gas (e.g., $N_2$ or $CO_2$ or $H_2$ or Ar, etc.) sorption techniques. Too small pore volume may undesirably reduce total carbon pore volume or ability to infiltrate such particles with active material (e.g., Si) or reduce rate performance or stability of the composite; while too large pore volume may undesirably reduce mechanical properties or reduce cycle stability of the (e.g., Si-comprising) composite.

In some designs, it may be advantageous for the porous carbon (for the use in the formation of suitable electrode composites; for example, for infiltration with active material or, for example, for making composites with active material precursors and subsequent conversion of the active material precursor to active material, etc.) to exhibit compositional purity of more than around 90 wt. % (e.g., less than 10 wt. % non-carbon species) prior to forming composites, as determined by chemical composition, energy dispersive spectroscopy (EDS), thermo-gravimetric analysis (TGA), combustion analyzer, X-ray photoelectron spectroscopy (XPS) or other suitable mechanism. In some designs, purity of more than around 96 wt. % is further advantageous in some designs. In some designs, prior to using in battery cells, the carbon purity of more than around 98-99 wt. % may be further advantageous. In some designs, the so-called "ash" content in carbon should preferably be less around 10 wt. % (e.g., preferably less than around 4 wt. %, more preferably less than around 2 wt. %, even more preferably less than around 1 wt. %, and most preferably below around 0.25 wt. %) prior to using such carbons in battery electrodes (in some designs, prior to infiltrating with active materials). In some designs, a higher content of various impurities (e.g., K, S, Ca, Na, Zn, P, O, etc.) may induce side reactions, significantly reduce cycle stability (particularly at elevated temperatures), induce premature failure, reduce gravimetric and volumetric energy storage characteristics, reduce power density, lead to undesirably larger cell-to-cell or batch-to-batch variations and possibly induce some sort of other undesirable outcomes that reduce performance characteristics of electrochemical cells (e.g., Li-ion batteries). In some designs, to attain high purity porous carbon, it may be advantageous to use a combination of chemical (e.g., treatment in acids) and thermal (e.g., heat-treatment at temperatures from around 800° C. to around 2000° C. and evaporation of impurities) purification stages or use low content ash carbon precursors.

In some designs, it may be important for the porous carbon to comprise less than around 10 wt. % (e.g., preferably less than around 2 wt. %, more preferably less than around 1 wt. %; even more preferably less than around 0.5 wt. %) of hydrogen atoms (e.g., present within its structure or as part of the functional groups). In some designs, higher hydrogen content (e.g., above around 2-10 wt. %) may lead to undesirable formation of gasses and cell swelling, reduced capacity utilization, reduced cycle stability, higher first cycle losses and/or other undesirable reductions in performance characteristics. In some designs, it may be important for the composite carbon-containing electrode particles (e.g., Si-containing particles which include Si-based active material and/or Si-comprising active material in case of the anode material) to comprise less than around 10 wt. % (e.g., preferably less than around 2 wt. %, more preferably less than around 1 wt. %; even more preferably less than around 0.5 wt. %) of hydrogen atoms. The hydrogen content may be determined by using a hydrogen analyzer, titration, nuclear reaction analysis (NRA), Devanathan—Stachurski method, combustion carbon hydrogen nitrogen (CHN) analysis, Instrumental Gas Analysis (IGA), scanning Kelvin probe force microscopy (SKPFM) and other suitable characterization mechanism.

Unexpectedly, thermal properties of carbon (e.g., porous carbon) used for (or used in) the formation of carbon-containing electrode composites were found to be an important indicator of its performance in Li-ion batteries and related applications. In some designs, carbon (e.g., porous carbon) used for (or used in) the formation of carbon-containing composites may preferably exhibit a specific range of crystallization onset temperatures upon annealing in vacuum or inert environment, such as Ar gas, for several hours (e.g., from around 1 h to around 6 h), above which XRD detects graphitization (formation of graphitic peak). In some designs, crystallization onset temperatures may preferably vary from around 1400° C. to around 2400° C. (in some designs, from around 1400° C. to around 1600° C.; in other designs, from around 1600° C. to around 1800° C.; in yet other designs, from around 1800° C. to around 2000° C.; in yet other designs, from around 2000° C. to around 2200° C.; in yet other designs, from around 2200° C. to around 2400° C.). In some designs, the carbon XRD d(002) peak may shift as a function of increasing thermal anneal temperature from around 4.4-4.2 Å to around 3.4 Å. Crystallization onset temperatures of porous carbon below around 1400° C. or above around 2400° C. may undesirably result in the inferior performance of the carbon-containing composite particles in Li-ion batteries and related applications.

In some designs, microstructure of carbon (e.g., porous carbon) used for (or used in) the formation of carbon-containing electrode composites was found to be an important indicator of its performance in Li-ion batteries and related applications. In some designs, it was found that the (002) spacing of carbon should preferably range from around 4.40 Å to around 3.45 Å (in some designs, from about 4.40 Å to about 4.00 Å; in other designs, from about from about 4.00 Å to about 3.80 Å; in yet other designs, from about from about 3.80 Å to about 3.60 Å; in yet other designs, from about from about 3.60 Å to about 3.45 Å), depending on various other parameters of the composites and their environment and electrochemical operation potential in Li-ion battery cells.

Figure 3A:
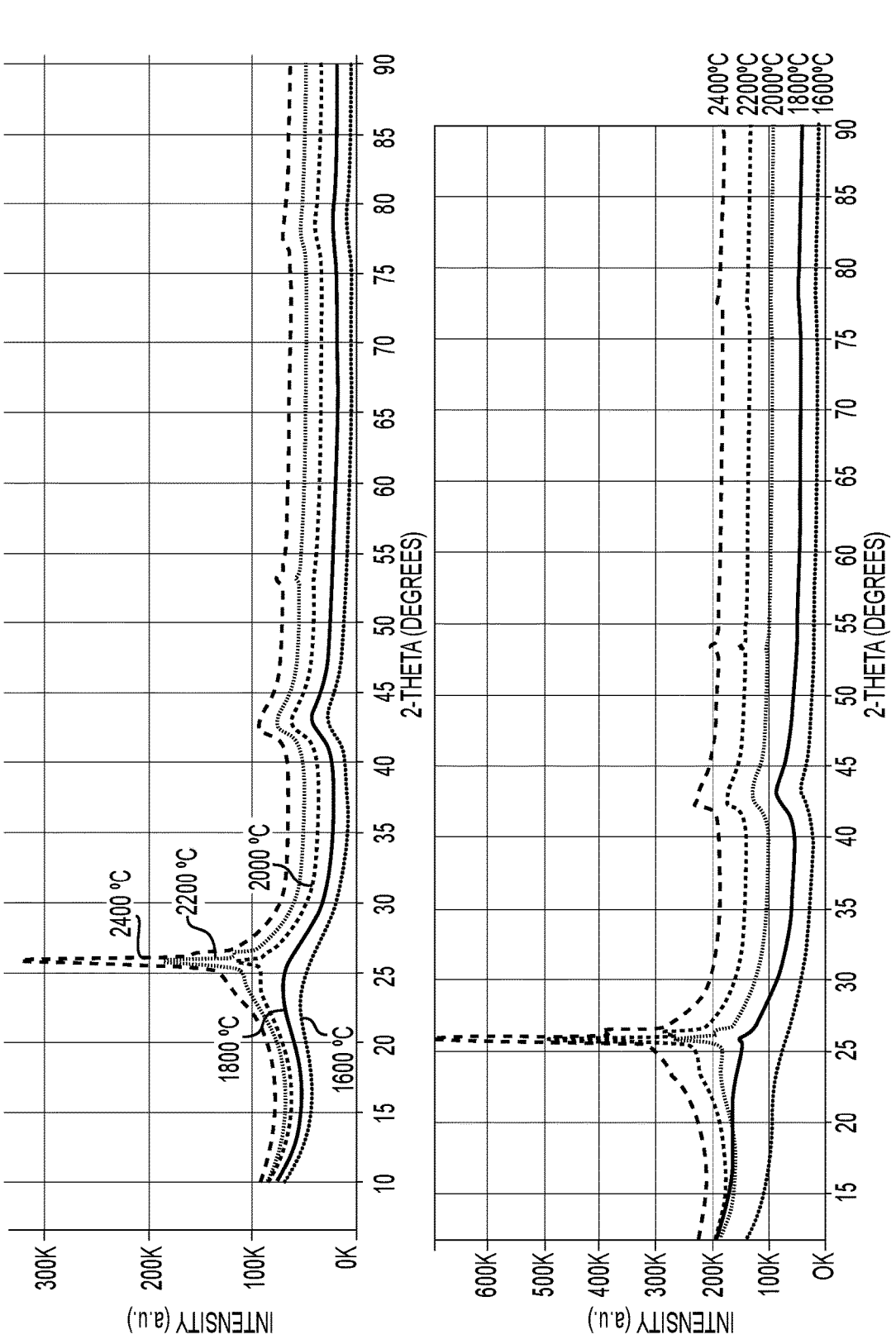
FIG. 3A is an x-ray diffraction pattern of two suitable porous carbon materials annealed at several vacuum annealing temperatures.
Figure 3B:
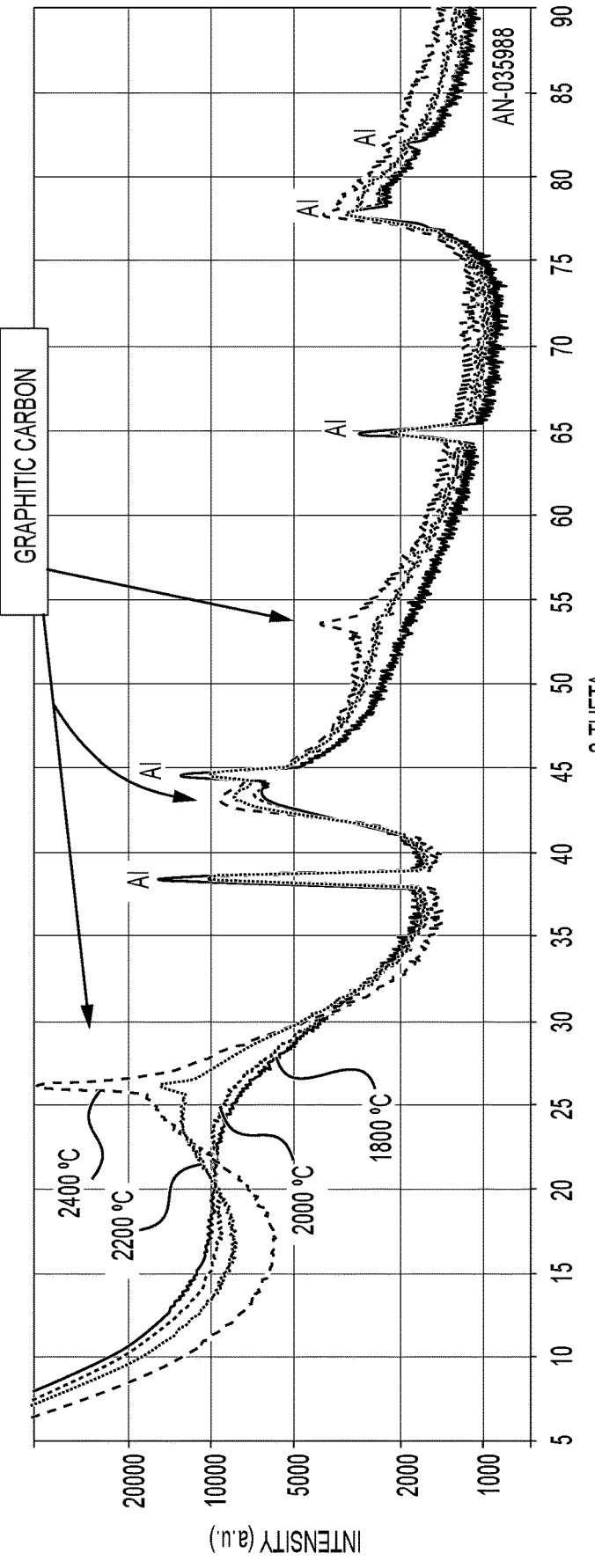
FIG. 3B is an x-ray diffraction pattern of another suitable porous carbon material annealed at several vacuum annealing temperatures.

FIG. 3A illustrate example of two suitable porous carbon samples that exhibit crystallization onset temperature between 1600° C. and 1800° C. upon annealing in vacuum for around 1 hour, as indicated by the formation of sharp d(002) XRD peak upon annealing at 1800° C. FIG. 3B illustrate another example of a suitable porous carbon that exhibit crystallization onset temperature between around 2100° C. and around 2200° C. upon annealing in vacuum for around 1 hour, as indicated by the formation of sharp d(002) XRD peak upon annealing at 2200° C. FIG. 3C illustrates another example of suitable porous carbons that exhibit (002) carbon spacing exceeding that of graphite, which is about 3.34 Å.

Certain physical and chemical properties of the carbon-containing composites were found to correlate well with their performance in cells. Such properties may be specific for the composition of active materials and cell construction and operating parameters (e.g., electrolyte, amount of such composites in anodes and cathodes, areal capacity loadings, cell operating temperatures, charging rate, voltage ranges, among others). As such, as illustrative examples, certain properties of carbon-containing composites with Si-based active material (e.g., near-pure Si) are disclosed that facilitate their superior performance in anodes (e.g., either as component of the anode together with graphitic carbon material or as the only Li storing material in the anode, apart from very small Li storage in carbon-based conductive additives).

In some designs, it may be advantageous for such composites (e.g., in the form of composite particles) comprising both active (ion storing) materials (including, for example, Si-based active materials, etc.) and carbon to have a relatively small fraction of hydrogen. In some design, the fraction of hydrogen may preferably range from around 0.00 wt. % to around 1.00 wt. % of the total weight of the composite particle (in some designs, below around 0.05 wt. %; in other designs, from around 0.05 wt. % to around 0.35 wt. %; in yet other designs, from around 0.35 wt. % to around 1.00 wt. %). Too high a fraction of hydrogen may undesirably lead to excessive first cycle losses and faster degradation. Very low fraction of H may be challenging to attain, provided other desired structural, chemical, physical and other properties of the carbon-containing composites.

In some designs, it may be advantageous for such composites (e.g., in the form of composite particles) comprising both active (ion storing) materials (including, for example, Si-based active materials, etc.) and carbon to have a relatively small fraction of nitrogen. In some designs, the fraction of nitrogen (N) element may preferably range from around 0.00 wt. % to around 5.00 wt. % of the total weight of the composite particle (in some designs, below around 0.5 wt. %; in other designs, from around 0.5 wt. % to around 1 wt. %; in yet other designs, from around 1 wt. % to around 2.50 wt. %; in yet other designs, from around 2.5 wt. % to around 5.0 wt. %;). Too high a fraction of N may undesirably lead to excessive first cycle losses and faster degradation. Very low fraction of N may be challenging to attain, provided other desired structural, chemical, physical and other properties of the carbon-containing composites.

In some designs, it may be advantageous for such composites (e.g., in the form of composite particles) comprising both active (ion storing) materials (including, for example, Si-based active materials, etc.) and carbon to have a relatively small fraction of oxygen. In some designs, the fraction of oxygen (0) may preferably range from around 0.00 wt. % to around 5.00 wt. % of the total weight of the composite particle (in some designs, below around 0.01 wt. %; in other designs, from around 0.01 wt. % to around 0.25 wt. %; in yet other designs, from around 0.25 wt. % to around 2 wt. %; in yet other designs, from around 2 wt. % to around 5.0 wt. %;). Too high a fraction of O may undesirably lead to excessive first cycle losses and faster degradation. Very low fraction of O may be challenging to attain, provided other desired structural, chemical, physical and other properties of the carbon-containing composites.

It was unexpectedly found that values of the nitrogen (N) uptake during annealing of (e.g., porous) carbon-based composites with Si (or Si-based) active material in a relatively inert nitrogen gas ($N_2$) correlate well with the performance of carbon-containing electrode composites in Li-ion batteries. For example, in some designs, it may be preferable that during annealing of a suitable carbon-based and Si-comprising composites (e.g., composite particles with Si-based active material and/or Si-comprising active material) in nitrogen gas ($N_2$) for a period of 2 hours at 1050° C., the composite may exhibit nitrogen uptake (incorporation into carbon structure) in the range from around 1.5 wt. % to around 25 wt. % nitrogen of the total weight of the composite (in some designs, from around 1.5 wt. % to around 2.5 wt. %; in other designs, from around 2.5 wt. % to around 7.5 wt. %; in yet other designs, from around 7.5 to around 15 wt. %; in yet other designs, from around 15 wt. % to around 25 wt. %), depending on the active material (e.g., Si-based active material and/or Si-comprising active material, etc.) particle size, fraction, cell designs and other factors. Either too little or too large nitrogen uptake may result in undesirable cell performance (e.g., lower cycle life; lower rate performance; lower first cycle efficiency, etc.). In a further example, a suitable carbon-based and Si-comprising composite on average exhibits uptake from around 1.5 wt. % to around 25 wt. % nitrogen (N) when heated in a nitrogen gas (N$_2$) at 1050° C. for a period of 2 hours, as measured on a powder that comprises the composite particle. For example, the powder may comprise mostly (e.g., all or substantially all or a majority, etc.) of carbon-based and Si-comprising composite particles (e.g., a large statistical number of particles conducive for such a measurement).

In another example, in some designs, it may be preferable that during annealing of a suitable carbon-based and Si-comprising composites (e.g., composite particles with Si-based active material and/or Si-comprising active material) in nitrogen gas (N$_2$) for a period of 2 hours at 850° C., the composite particle may exhibit nitrogen uptake (incorporation into carbon structure) in the range from around 0.5 wt. % to around 10 wt. % nitrogen of the total weight of the composite (in some designs, from around 0.5 wt. % to around 2.5 wt. %; in other designs, from around 2.5 wt. % to around 7.5 wt. %; in yet other designs, from around 7.5 to around 10 wt. %), depending on the size of active material (e.g., Si-based active material and/or Si-comprising active material, etc.) particle particles in the composites, active material wt. % in the composites, cell designs and other factors. Either too little or too large nitrogen uptake may result in undesirable cell performance (e.g., lower cycle life; lower rate performance; lower first cycle efficiency, etc.). Conducting such annealing in N$_2$ tests may enable one to tune processing and synthesis routes for the formation of such Si- and C-containing composites for superior performance in Li-ion battery anodes.

Figure 4:
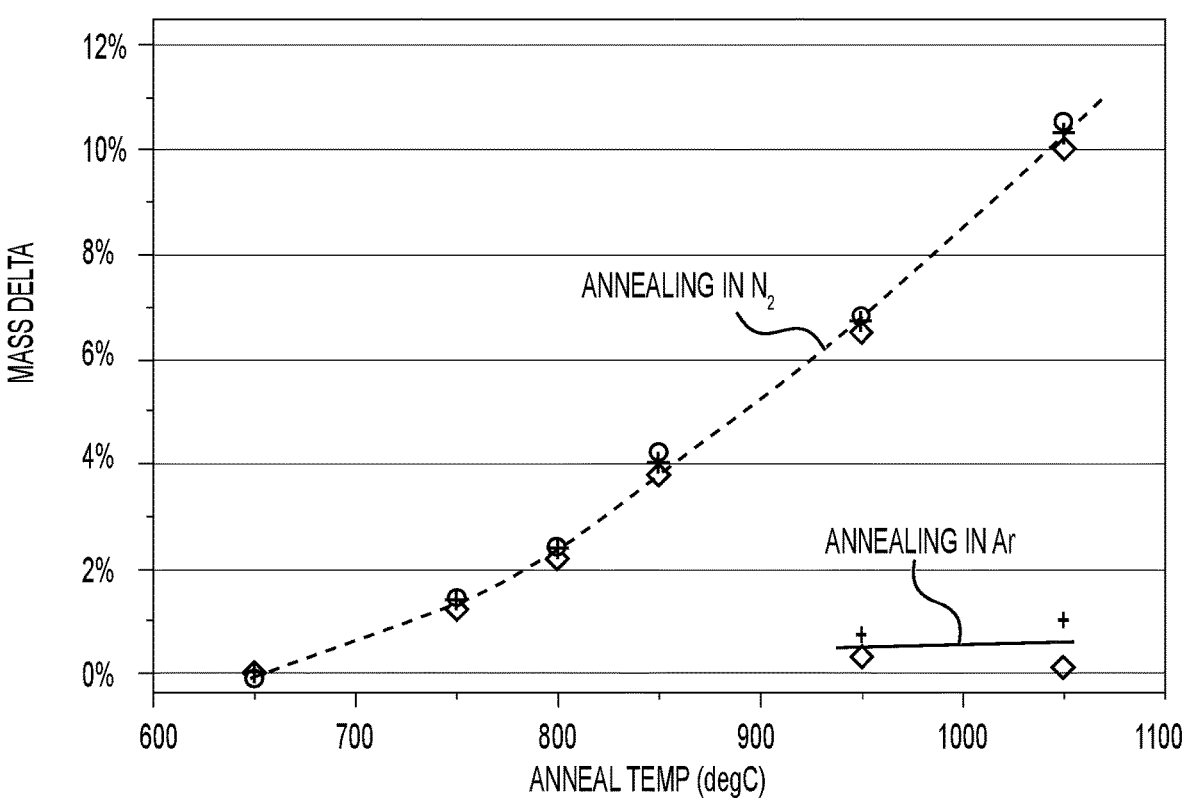
FIG. 4 is a graphical plot of nitrogen uptake (change in mass) as a function of annealing temperature, for a carbon-containing composite powder.

FIG. 4 shows illustrative examples of the nitrogen (N) uptake by annealing of example suitable carbon-containing composite powder (comprising Si-based active material) in N$_2$ gas for 2 h. Higher annealing temperature results in larger N$_2$ gas uptake. The measurement error is estimated to be less than around 1.5 wt. %.

Annealing of (e.g., porous) carbon-based composites with Si-based and/or Si-comprising active material in a relatively inert nitrogen gas (N$_2$) or argon gas (Ar) for, for example, 2 hours at high temperatures typically leads to the formation of silicon carbide (SiC) crystals, which could be detected by X-ray diffraction (XRD) or by Fourier Transform Infrared Spectroscopy (FTIR) or other suitable technique. In some implementations, the porous composite particle forms from around 1 wt. % to around 100 wt. % silicon carbide (SiC) when heated in a nitrogen gas (N$_2$) or in an argon gas (Ar) in a temperature range from around 750° C. to around 950° C. for a period of 2 hours or more, as detected by XRD or FTIR or other suitable techniques. The total weight of SiC may be identified by using suitable calibration standards. In some designs, it may be advantageous to oxidize Si or C remaining in the sample to increase measurement precision. It was unexpectedly found that the minimum temperature at which SiC forms correlates with the performance of carbon-containing electrode composites in Li-ion batteries. For example, in some designs, it may be preferable that during annealing of a suitable carbon-based and Si-comprising composites in N$_2$ gas for 2 h the minimum temperature needed for the SiC to be detected by XRD (e.g., have SiC(111) XRD peak at 2-theta of around 35 degrees with intensity of at least 10% of the Si(111) XRD peak at around 28 degrees, after the background subtraction) may preferably range from around 750° C. to around 950° C. (in some designs, from around 750° C. to around 875° C.; in other designs, from around 875° C. to around 950° C.). Too high or too low SiC formation temperature typically results in inferior performance in Li-ion battery anodes.

Figure 5:
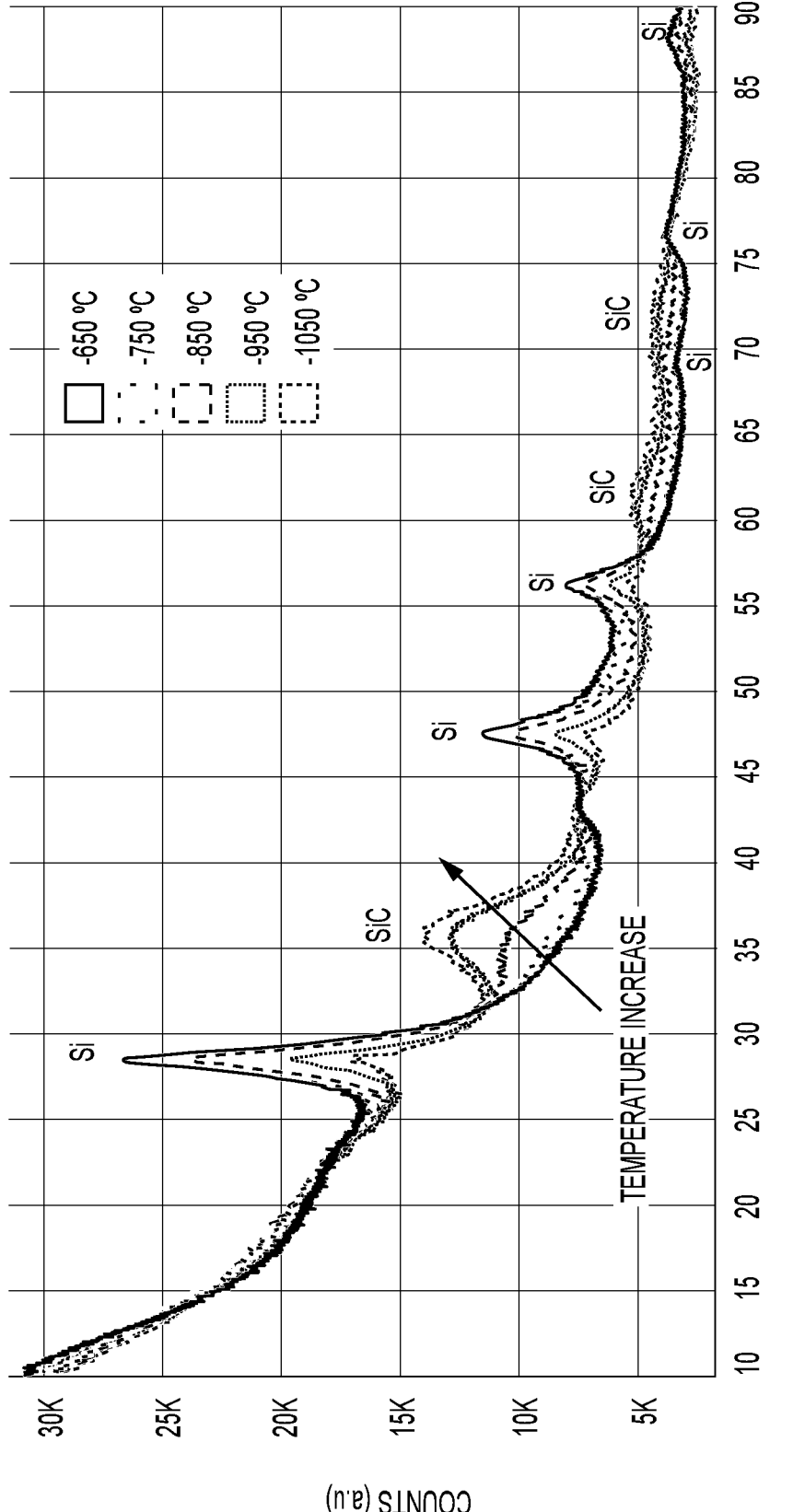
FIG. 5 is an x-ray diffraction pattern of suitable composite powder, containing C and Si, annealed in $N_2$ at different temperatures.

FIG. 5 shows an illustrative example of the XRD patterns of the suitable carbon-based Si-comprising composite annealed in N$_2$ at different temperatures and showing SiC formation at around 850° C.

It was unexpectedly found that the specific capacity (as measured in mAh/g) reduction (in %) upon annealing of suitable carbon-based silicon-containing anode composites (e.g., in the form of a powder) in N$_2$ gas at a relatively low temperature of 750° C. for 2 hours correlates with their performance in Li-ion batteries (e.g., cycle stability, calendar life, rate performance, etc.). For example, in some designs, it may be preferable that the capacity reduction during 2 h annealing in N$_2$ ranges from around 2% to around 25% (in some designs, from around 2 to around 12%; in other designs, from around 12 to around 25%). Too low or too high reduction in specific capacity upon annealing at such conditions may result in reduced performance characteristics in Li-ion battery anodes. As such, the synthesis and processing conditions for the formation of suitable carbon-containing and silicon-containing composite anode particles may be tuned to attain the proper capacity reductions.

In some designs, it may be preferable for superior performance of porous carbon-containing composites (e.g., comprising Si as part of an Si-based or Si-comprising active material, among others), to exhibit a variable porosity across the diameter (cross-section) of the particles. In some designs (e.g., when active material exhibits substantial volume changes during cycling, such as conversion-type active materials, such as Si-based and/or Si-comprising active material), it may be preferable for the central part of the particles to comprise larger pore volume (e.g., large volume fraction of pores relative to the fraction of active material or the fraction of active material and carbon combined) as compared to the part of the particle closer to the surface.

In some designs, it may be preferable for superior performance of porous carbon-containing composites (e.g., comprising Si as active material, among others), to comprise closed pores and a certain range of true densities, as measured using an argon (Ar) pycnometry or, in some designs, nitrogen (N$_2$) pycnometry. In some designs when active material in the carbon-comprising composite (particles) is Si-based or Si-comprising active material (e.g., Si or Si alloy or Si-based oxide or nitride or oxy-nitride or their various combinations (and preferably when the BET SSA is in the range from around 1 m$^2$/g to around 40 m$^2$/g)), it may be preferable for true (Ar pycnometry-measured or N$_2$ pycnometry-measured) density of such composites to range from around 0.9 g/cm$^3$ to around 2.2 g/cm$^3$, the optimum values being dependent on the fraction and type of Si-based or Si-comprising active materials, the presence of other elements (e.g., metals), among other parameters. In some designs, such a density may preferably range from around 0.9 g/cm$^3$ to around 1.4 g/cm$^3$; in other designs, from around 1.4 g/cm$^3$ to around 1.8 g/cm$^3$; in yet other designs, from around 1.8 g/cm$^3$ to around 2.2 g/cm$^3$). Too low or two high densities may often lead to inferior performance (e.g., undesirably fast degradation, low rate performance, high losses, etc.).

In some designs, it may be preferable (for superior performance in Li ion battery anodes) for the porous carbon-containing anode composites comprising Si-based or Si-comprising active material (e.g., Si or Si-based active material (among other suitable active anode materials)), to exhibit a relatively uniform distribution of active material (e.g., Si) and C, as measured by energy dispersive spectroscopy (EDS) on the cross-sections of such composite particles. In particular, apart from the 20-100 nm surface layer, in some designs, it may be preferable for the EDS mapping (with, e.g., around 2-50 nm lateral resolution) on the cross-section of the composite particles to show less than around 50% deviation from the average Si:C ratio (of total elemental Si and total elemental C in the composite particles) (which, for example, may be in the range from 5:1 to 1:5, in some designs).

In some cell designs, it may be preferable for the for the porous carbon-containing anode composites (e.g., composites comprising Si or Si-based or Si-comprising active material, among other suitable active anode materials)) to be used in combination with intercalation-type anode materials (e.g., synthetic/artificial or natural graphite, soft carbon, card carbon and their various combinations) in the formation of anodes. In some designs, the suitable fraction of areal capacity provided by the porous carbon-containing anode composites may range from around 10% to about 100%. For example, in some designs, for Li-ion battery anodes with an areal capacity of, say, 3.5 mAh/cm², the porous carbon-containing anode composites may provide from around 0.35 mAh/cm² to around 3.5 mAh/cm² of areal capacity. In some designs, the porous carbon-containing anode composites may provide from around 10% to around 25% of the areal capacity; in other designs, from around 25% to around 50% of the areal capacity; in yet other designs, from around 50% to around 75% of the areal capacity; in yet other designs, from around 75% to around 100% of the areal capacity, depending on the volume changes in carbon-containing anode composites during cycling, cell designs (e.g., stacked vs. wound), cell operating conditions (e.g., temperature, charging rate, discharge rate, pulse current requirements, etc.), areal capacity loadings, requirements for the cycle life and calendar life, requirements for the charging rate, restrictions on the electrolyte or electrolyte additives selections, type of the copper foil used; total areal loadings, among other requirements.

In some designs, it may be preferable (for superior performance in Li ion battery anodes) for the porous carbon-containing anode composites comprising Si or Si-based active material, to exhibit certain microstructural, structural, thermal (or more generally, physical) and chemical properties and certain microstructural, structural, thermal (or more generally, physical) and chemical properties of its components (e.g., Si-based or Si-comprising active materials or carbon).

Unexpectedly, microstructural features of carbon (e.g., porous carbon) used for (or used in) the formation of carbon-containing electrode composites were found to be an important indicator of its performance in Li-ion batteries and related applications. As such, suitable processing of carbon should preferably be conducted in order to gain certain microstructural features for superior performance in some designs. Atomic pair distribution function analysis was found to be particularly insightful.

Atomic pair distribution function (APDF) or atomic PDF analysis is an XRD technique also commonly referred to as "total scattering analysis". Herein, we sometimes refer to APDF as PDF. Most commonly, an XRD experiment focuses on the crystallographic information held within the Bragg diffraction of X-Rays from periodic structures within the crystalline material in order to conduct phase identity, composition, purity, lattice parameters, atomic displacement, strain, crystallite size, bond length, and angle, among others. However, many engineered materials exhibit many aspects of their structure that deviate from that of a perfect crystal; for example, exhibit very little or even no long-range structural coherence.

A total scattering approach to X-ray structural characterization considers both the Bragg (coherent scattering for crystalline materials) and diffuse scattering (incoherent scattering). When analyzing the total sum of scattering in a diffraction experiment additional corrections are typically used to account for background resulting from Compton scattering, air scatter, and fluorescence, to name a few. This normalized function is termed I(Q), and can be defined further as:

$$I(Q) = I_{Bragg} + I_{Diffuse} = I_{coherent} + I_{incoherent} + I_{background} \qquad \text{(Equation 1)}$$

To subtract Compton scattering from this function knowledge of the chemical composition of the sample is necessary. The intensity of X-ray scattering as a function of the scattering vector I(Q) is typically further normalized correcting for the X-ray absorbance of the sample resulting in the function S(Q), where S(Q) is defined as:

$$S(Q) = \frac{I(Q)}{\langle b \rangle^2} \qquad \text{(Equation 2)}$$

where S(Q) is the diffraction from the sample normalized by the incident flux per atom in the sample and is termed the total scattering structure function. In Equation 2, <b> is the average scattering factor of atoms within the sample. Q is the scattering vector, which is the difference between the scattered wave vector and the incident wave vector. The magnitude of the scattering vector Q is given by $4\pi \sin \theta / \lambda$, where $2\theta$ is the angle between the incident and scattered x-rays and $\lambda$ is the x-ray wavelength.

that the X-Ray diffraction is a reciprocal space measurement resulting in data with units of $\text{Å}^{-1}$, while the atomic pair distribution function is a real space function with units of Å.

$$G(r) = \frac{2}{\pi} \int_{Qmin}^{Qmax} Q[S(Q) - 1] \sin(Qr) \, dQ \qquad \text{(Equation 3)}$$

The pair distribution function G(r) is the Fourier transformation of the total scattering structure function S(Q). The peaks of the pair distribution function G(r) whose positions are independent of the Fourier transform parameters represent atom-atom pairs in real space, with real space distances in units of A between them. The existence of these peaks indicates that there are statistically significant populations of atoms exhibiting these real space atom-atom separation distances. Data from a total scattering experiment requires minimal structural coherence within the material and is therefore an excellent technique for the analysis of amorphous, nanocrystalline, or low order materials, including carbons (e.g., porous carbons). Detailed structural information may be gained from the APDF even when a model-based approach is not utilized. Some structural characteristics that may be probed by direct analysis of the G(r) are: scattering domain size, coordination number, atomic density, and a broad variety of information from peak analysis and quantitative comparison across various atom-atom pairs.

Scattering domain size may be determined by observing the radial distance at which structural coherence is no longer present. Coordination number is available through integration of the peak in the G(r) as the intensity of that peak is a direct measure of the quantity of atom-atom pairs. In the context of carbonaceous materials, this may lead to, for example, a determination of $sp^2$:$sp^3$ carbon ratio, as the coordination numbers for these are 3 and 4, respectively. Atomic density, a value that truly differs from macroscopic measurement techniques in that it is not affected by trapped porosity in a material, may be found through careful analysis of the G(r). Determination of atomic density relies on the fact that at G(r)=0 at radial distances below that of the first atom-atom interactions in the material. At these low radial distances, the slope of $G(r)=-4\pi\rho_0 r^2$ allows the atomic number density to be directly determined by a linear fit of the G(r). Finally, a rich set of information may be gained by analysis of the peaks within the G(r). Examples of notable peak metrics for structural analysis include: peak position, full width at half maximum, peak height, and ratios of width and height across various atom-atom pairs.

Also note that for analysis of data, it is common to convert the pair distribution function G(r) to a radial distribution function, R(r). The relationship between the pair distribution function, G(r), and the radial distribution function, R(r), is as follows ($\rho_0$ is a number density of scatterers in the object):

$$R(r)=g(R)R+4\pi r^2 \rho_0 \qquad \text{(Equation 4)}$$

Following the mathematical transformation to R(r), it is straightforward to fit peaks of interest using a Gaussian function, from which area, width, height, and position are available.

In some illustrative examples, Synchrotron XRD data was collected on (i) suitable composite anode powders comprising both carbon (porous carbon) and Si active material and (ii) suitable porous carbon material utilized for the formation of suitable composite electrode powders. Such XRD experiments were conducted at beamline 11-ID at the Advanced Photon Source at Argonne National Laboratory. An X-Ray wavelength of 0.21150 Å was used. Collected data were 2D plate images which were fit and integrated using GSASII software for further analysis. Data were collected at detector distances of 1000 and 180 mm with collection times of 1 to 5 minutes.

Fourier Transforms were conducted using xPDFsuite with the following transform conditions. Diffraction data were plotted in Q, where Q is the vector that describes the moment of scattering to discuss diffraction data independent of X-Ray wavelength/energy ($Q=4\pi \cdot \sin(\text{Theta})/\lambda$), where $\lambda$ is the X-ray wavelength. The $Q_{max}$ (Instrument) is the maximum $\varrho$ cutoff (for a particular instrument) for the meaningful input intensities in inverse ångströms (note that some data files may contain trailing zeros or unreliable intensities at the upper bound of the detector range and so the $Q_{max}$ (Instrument) defines a threshold for the reliable data). This parameter is also used as an upper boundary for the polynomial fit correction of the S($\varrho$) data. $Q_{max}$ (Instrument) is defined independently of the $Q_{max}$ used in the Fourier transform. The $Q_{min}$ is the lower $\varrho$-limit for the Fourier transformation of the F($\varrho$) curve in inverse angstroms. The $Q_{max}$ is the upper $\varrho$-limit for the Fourier transformation of the F($\varrho$) curve in inverse ångströms. The $r_{poly}$ is the r-limit for the maximum frequency in the F($\varrho$) correction polynomial. The pair distribution function (PDF) may be unreliable at shorter r, however a very small $r_{poly}$ would disable polynomial correction and give noisy PDF. Larger values would produce closer fits with a higher degree polynomial, but when too large, they might smooth-out a useful signal in the data. The default was set to 0.9. The $r_{step}$ is the spacing of the r-grid for the calculated PDF in ångströms (number of points in G(r)).

Fourier Transforms where conducted on the collected data using xPDF software suite with the following conditions and assumptions: (i) prior to transformation the collected data was corrected by subtracting data from an empty polyimide (KAPTON) capillary sample holder to eliminate contribution from the sample holder and air scattering effects; (ii) suitable high-purity porous carbon materials were considered to comprise only carbon (the following values for used for analysis: $Q_{max}$(instrument)=29.0; $Q_{min}$=0.99984; $Q_{max}$=23.4697; $Q_{max}$ was selected such that spurious artifacts in F(Q) are truncated and such that F(Q) terminates at 0; $r_{step}$=0.01; $r_{poly}$=0.8898); (iii) suitable composite anode powders comprising both high purity carbon and high purity Si active material were considered to comprise only carbon and silicon in atomic ratio carefully determined by a combination of other techniques, such as inductively-coupled plasma-mass spectrometry (ICP-MS), inductively-coupled plasma-optical emission spectrometry (ICP-OES), gravimetric burnout data, recording mass gains during synthesis and other methods (the following values for used for analysis: $Q_{max}$ (instrument)=28.998; $Q_{min}$=0.71731; $Q_{max}$=23.0; $Q_{max}$ was selected such that spurious artifacts in F(Q) are truncated and such that F(Q) terminates at 0; $r_{step}$=0.01; $r_{poly}$=0.9); (iv) determination of $\rho_0$ for the conversion of G(r) to R(r) in Equation 4 was achieved through a Nonlinear Leasi Squares nls) fit of the slope of the G(r) between r=0 and r=0.75 Å; some adjustments were made to account for any concentrated error built up at low radial distances such that R(r) does not fall below R(r)=0. The domain size (the size of coherently scattering structural domains, averaged over the material within the beam path) was calculated from the PDF data. The domain size (r) was estimated by the dimensions (r) above which one observes the loss of substantial coherence, as defined by the function G(r) falling below around +/−0.01. Note that for crystalline nanoparticles the coherence length is equal to the nanoparticle size, but for nanoparticles with defects or with diameter-dependent structural relaxation the coherence length is not equal to the nanoparticle size. So, the scattering coherence length places a robust lower bound on the average nanoparticle size ("at least this size"), which may be larger. This is particularly useful for materials that do not display Bragg scattering (e.g., amorphous or highly disordered), which cannot be typically analyzed using Scherrer analysis.

The average domain size of suitable carbon (e.g., porous carbon) used for the formation of (or used in) carbon-containing electrode composites (e.g., composite particles) may preferably (for good performance in cells) range from around 10 Å to around 60 Å, with the most preferable domain size depending on the composite composition and microstructure (e.g., type and amount of active material (e.g., Si vs. LTO vs. LiF/Fe vs. NaCl vs. $FeF_3$, etc.), size of active material particles, volume expansion of active material, pore volume remaining in the composite, pore size, etc.) and a particular cell design and cell operating conditions (e.g., electrochemical potential during cycling, types of active ions (e.g., $Li^+$ vs. $Na^+$), operating temperature, etc.). In some designs, such a suitable domain size in carbon may preferably range from around 10 Å to around 15 Å; in other designs, from around 15 Å to around 25 Å; in yet other designs, from around 25 Å to around 30 Å; in yet other designs, from around 30 Å to around 40 Å; in yet other designs, from around 40 Å to around 50 Å; in yet other designs, from around 50 Å to around 60 Å. Such Synchrotron XRD measurements and PDF analysis may be conducted either on the carbon materials (e.g., to select proper synthesis/processing conditions) or on the carbon-containing composites (e.g., with Si-based or Si-containing active material) (e.g., to detect the presence or retention of suitable carbon in the composites).

Figure 6A:
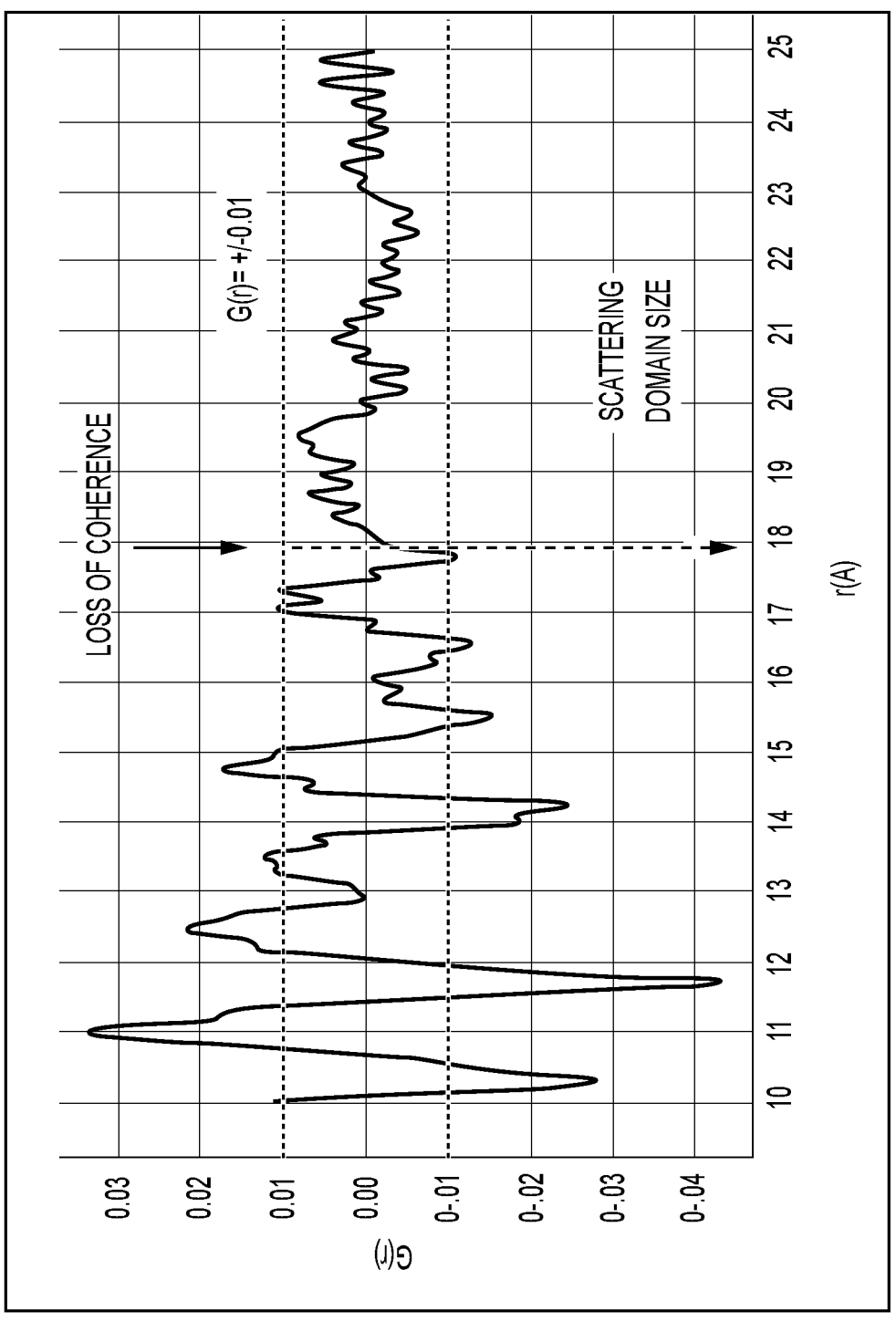

FIGS. 6A-6B show illustrative examples of PDF analysis of suitable carbons with a scattering domain size of (601) between around 15 Å and around 19 Å (where loss of coherence is defined as the function falling below $G(r)=+/-$ 0.01); (602) around 19 Å and around 22 Å; (603) between around 24 Å and around 28 Å; (604) between 40 Å and 55 Å. Such Synchrotron XRD measurements and PDF analysis may be conducted either on the carbon materials (e.g., to select proper synthesis/processing conditions) or on the carbon-containing composites (e.g., with Si based or Si containing active material, among others) (e.g., to detect presence or retention of suitable carbon in the composites).

FIG. 7 shows illustrative examples of PDF analysis of suitable carbons with a scattering domain size of ~17.5 Å, ~21 Å, ~26 Å and ~45 Å.

In some designs, the average scattering domain size of suitable carbon-containing and suitable active material-containing electrode composites (e.g., composite particles) may preferably (for good performance in cells) range from around 1 nm to around 40 nm, with the most preferable domain size depending on the composite composition and microstructure (e.g., type and amount of active material (e.g., Si based vs. Si containing vs. LTO vs. LiF/Fe vs. NaCl vs. $FeF_3$, etc.), size of active material particles, volume expansion of active material, pore volume remaining in the composite, pore size, etc.) and a particular cell design and cell operating conditions (e.g., electrochemical potential during cycling, types of active ions (e.g., Li+ vs. Na+), operating temperature, etc.). In some designs, such a suitable domain size may range from around 1 nm (10 Å) to around 5 nm (50 Å); in other designs, from around 5 nm to around 10 nm; in yet other designs, from around 10 nm to around 20 nm; in yet other designs, from around 20 nm to around 40 nm.

The average scattering domain size of active material (e.g., Si-based and/or Si-comprising active material in case of anodes for Li-ion batteries) in suitable carbon-containing electrode composites (e.g., composite cathode or anode particles) may preferably (for good performance in cells) range from around 1 nm to around 40 nm, with the most preferable domain size depending on the composite composition and microstructure, a particular cell design and cell operating conditions. In some designs, such a suitable domain size may range from around 1 nm (10 Å) to around 5 nm (50 Å); in other designs, from around 5 nm to around 10 nm; in yet other designs, from around 10 nm to around 20 nm; in yet other designs, from around 20 nm to around 40 nm.

FIG. 8 shows illustrative examples of PDF analysis of (i) suitable carbon (suitable porous carbon in this example) used in the formation of carbon-containing electrode composites and (ii) two carbon-containing anode composites comprising Si-based active material. In one illustrative example, the composite domain size is around ~2.5 nm (limited by the Si domain size). In another illustrative example, the domain size is around ~3.5 nm (limited by the Si domain size; the increased Si scattering domain size relative to the first example was due to deviation in the synthesis/processing conditions). Other suitable processing conditions may further increase Si scattering domain size (e.g., up to 5 nm in some cases or up to 10 nm in other cases or up to 20 nm in yet other cases or even up to 40 nm yet other cases).

In the case of a perfect crystalline graphite, the real space center maximum values for the first 3 coordination spheres of carbon are 1.42, 2.45, and 2.85 Å. The first coordination sphere is defined as a sphere defined by atoms with the shortest real space distance to a central reference atom. Atoms sitting in real space positions at farther distances from a central reference atom will fall into 2nd, 3rd, up to nth coordination spheres defined by their distance from the central atom. These bond lengths or peak center maximums, however, can be shifted substantially if the structure of carbon is substantially distorted (e.g., as in some porous or structured or partially disordered carbons) or if the ratio of $sp^2:sp^3$ carbon changes significantly. For a perfect crystalline graphite, the ratio of the heights of the real space peaks for the first and second coordination sphere should be equal to 0.5. However, disordered carbon (e.g., with vacancies or non-hexagonal rings) may exhibit higher ratios. In some designs of suitable carbon (e.g., porous carbon) used for (or used in) the formation of carbon-containing electrode composites (e.g., in the form of composite particles), synchrotron PDF peaks' height and their full width at half maximum (FWHM) within the first 3 coordination spheres may preferably (for good performance in cells) be within a certain range of values. In some designs, the ratio of the heights of the real space peaks for the first and second coordination sphere in suitable carbons (e.g., as components of suitable carbon-containing electrode composites) may preferably range from around 0.700 to around 0.590 (in some designs, from around 0.700 to around 0.650; in other designs, from around 0.650 to around 0.620; in yet other example, from around 0.620 to around 0.590, depending on the composite particle chemistry, microstructure, and electrode operation conditions). Such Synchrotron XRD measurements and PDF analysis may be conducted either on the carbon materials (e.g., to select proper synthesis/processing conditions) or on the carbon-containing composites (e.g., with Si-based and/or Si-comprising active material, among others) (e.g., to detect the presence or retention of suitable carbon in the composites).

For a perfectly ordered crystalline graphite, the ratio of the FWHM values for the first and the second coordination spheres should be 1. In some artificial graphite samples with significant degrees of disorder, such values may be smaller, such as in the range from around 0.850 to around 0.950. However, in some designs, in suitable carbons the ratio of FWHM values may preferably be even smaller (which is related to the certain degree of variations in bond lengths and disorder that benefit carbon performance in composites and may potentially be related to various distortions, such as vacancies, off-membered rings, etc.). In some designs, the ratio the FWHM values for the first and second coordination sphere in suitable carbons may preferably range from around 0.700 to around 0.850 (in some designs, from around 0.700 to around 0.760; in other designs, from around 0.760 to around 0.810; in yet other designs, from around 0.810 to around 0.830; in yet other designs, from around 0.830 to around 0.850), depending on the composite electrode particle active material and composition and electrode operational conditions, among other factors. Such Synchrotron XRD measurements and PDF analysis may be conducted either on the carbon materials (e.g., to select proper synthesis/processing conditions) or on the carbon-containing composites (e.g., with Si-based and/or Si-comprising active material, among others) (e.g., to detect the presence or retention of suitable carbon in the composites).

In case of a perfect crystalline graphite, the ratio of the heights of the real space peaks for the first and third coordination sphere should be 1. However, in some designs, in suitable carbons the ratio of the heights of the real space peaks for the first and third coordination sphere may preferably be larger (which may be related to certain disorders that benefit carbon performance in composites and may potentially be related to various distortions, such as vacancies, off-membered rings, etc.). In some designs, the ratio of the heights of the real space peaks for the first and the third coordination sphere in suitable carbons should preferably range from around to around 1.100 to around 1.300 (in some designs, from around 1.100 to around 1.150; in other designs, from around 1.150 to around 1.180; in yet other designs, from around 1.180 to around 1.240; in yet other designs, from around 1.240 to around 1.300), depending on the composite electrode particle active material and composition and electrode operational conditions, among other factors. Such Synchrotron XRD measurements and PDF analysis may be conducted either on the carbon materials (e.g., to select proper synthesis/processing conditions) or on the carbon-containing composites (e.g., with Si-based and/or Si-comprising active material, among others) (e.g., to detect the presence or retention of suitable carbon in the composites).

For a perfectly ordered crystalline graphite, the ratio of the FWHM values for the first and the third coordination spheres should be 1. However, in suitable carbons the ratio of FWHM values may preferably be even smaller (which is related to the certain degree of variations in bond lengths and disorder that benefit carbon performance in composites and may potentially be related to various distortions, such as vacancies, off-membered rings, etc.). In some designs, the ratio of the FWHM values for the first and the third coordination sphere in suitable carbons may preferably range from around 0.600 to around 0.850 (in some designs, from around 0.600 to around 0.700; in some designs, from around 0.700 to around 0.760; in other designs, from around 0.760 to around 0.810; in yet other designs, from around 0.810 to around 0.830; in yet other designs, from around 0.830 to around 0.850), depending on the composite electrode particle active material and composition and electrode operational conditions, among other factors. Such Synchrotron XRD measurements and PDF analysis may be conducted either on the carbon materials (e.g., to select proper synthesis/processing conditions) or on the carbon-containing composites (e.g., with Si-based and/or Si-comprising active material, among others) (e.g., to detect the presence or retention of suitable carbon in the composites).

Figure 9A:
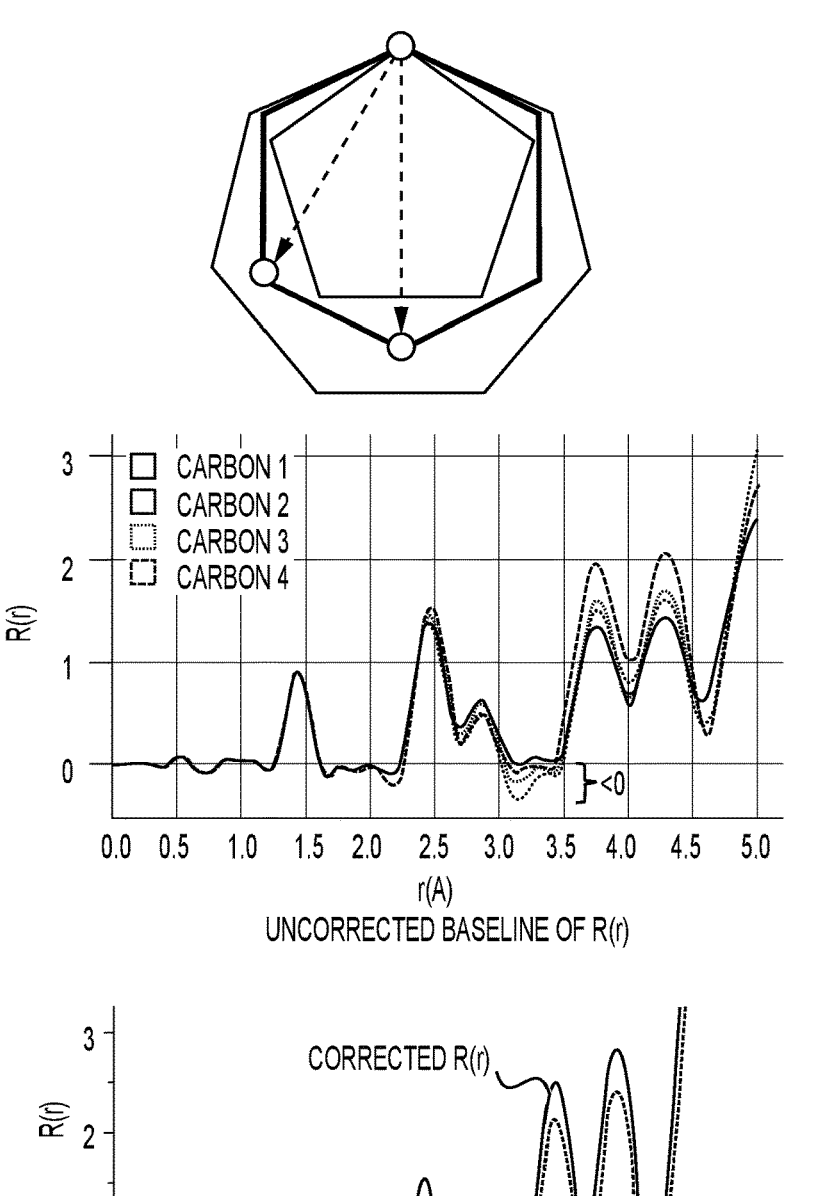
FIG. 9A tabulates the ratios of the peak amplitudes (values of the atomic pair distribution function) of the first and second carbon-carbon coordination spheres, for illustrative carbon materials.

FIG. 9A shows illustrative examples of structural properties for suitable carbons (e.g., porous carbons in this example) that may be used in the formation of suitable, high-performance carbon-containing electrode composites (e.g., with Si-based and/or Si-comprising active material). In such illustrative examples, the ratio of the heights of the real space peaks for the first and the second coordination sphere in suitable carbons are: 0.660, 0.625, 0.596 and 0.595. Lower value of the ratio indicates a higher degree of order in the suitable carbons' examples. An inset at the top of FIG. 9A shows a 5-membered ring, a 6-membered ring, and a 7-membered ring. Arrow lines schematically representing the second and third coordination spheres in the case of the six-membered rings are shown. It will be appreciated that the second and third coordination spheres (as well as the first coordination sphere and higher-order coordination spheres) would be altered in the case of the five-membered and seven-membered rings.

FIG. 9B shows illustrative examples of structural properties for the suitable (e.g., porous carbons in this example) that may be used in the formation of suitable, high-performance carbon-containing electrode composites (e.g., with Si-based and/or Si-comprising active material). In such illustrative examples, the ratio of the FWHM values for the first and the second coordination sphere in suitable carbons are 0.773, 0.771, 0.795, 0.814 and 0.830.

FIG. 9C shows illustrative examples of structural properties for the suitable carbons (e.g., porous carbons in this example) that may be used in the formation of suitable, high-performance carbon-containing electrode composites (e.g., with Si-based and/or Si-comprising active material). In such illustrative examples, the ratio of the heights of the real space peaks for the first and the third coordination sphere in suitable carbons: are 1.237, 1.210, 1.194 and 1.230.

FIG. 9D shows illustrative examples of structural properties for the suitable carbons (e.g., porous carbons in this example) that may be used in the formation of suitable, high-performance carbon-containing electrode composites (e.g., with Si-based and/or Si-comprising active material). In such illustrative examples, the ratio of the FWHM values for the first and the second coordination sphere in suitable carbons are 0.657, 0.625, 0.650, 0.695, 0.839.

Unexpectedly, certain values of the relative intensities of the C—C bonds in the first coordination sphere in the radial distribution function, R(r), with that of bonds between C and active materials (e.g., Si in the case of Si-based anodes for Li-ion batteries, such as Si—C bonds) may correlate with the performance of carbon-containing and active material-containing composites. As such, processing conditions for the formation of such carbon-containing composites may be optimized. In a crystalline SiC the first atom-atom (Si—C) pair is located at around r=1.9 Å. In a crystalline graphite (and many graphitic carbons, even if disordered) the first carbon atom-atom (C—C) pair is located at around r=1.42 Å and the second C—C bond is found at around r=2.47 Å. In a crystalline Si the first atom-atom (Si—Si) pair bond is located at around r=2.37 Å, which is close to the second C—C bond in graphitic carbon. In composites that comprise both carbon (C) and Si, the intensities of the corresponding peaks in R(r) may be used for performance optimization. However, the first Si—Si bond distance overlaps with the second C—C bond distance. In some designs of composites comprising both Si and C, the ratio of the intensity of the first Si—C pair bond to that of the first C—C pair bond in R(r) should preferably range from around 0.050 to around 1.000 (in some designs, from around 0.050 to around 0.350; in other designs, from around 0.350 to around 0.700; in yet other designs, from around 0.700 to around 1.000). Too large intensity ratio (e.g., substantially above 1.000, such as 1.25 or 1.95, in some examples) may typically lead to significantly inferior performance in cells (e.g., lower capacity, stability, rate performance, etc.). In general, lower intensity ratio values (reduced Si—C bond formation) may often be preferable; however, too small intensity ratio (e.g., substantially below around 0.050) may also reduce some aspects of performance (e.g., first cycle efficiency, stability, etc.). While the first coordination sphere of silicon (at around r=2.37 Å) and the second one of graphitic carbon (at around r=2.47 Å) are convoluted with each other, the position of the real space peak maximum of this convoluted peak in composites comprising both Si and C may also be used for the performance optimization during tuning of the synthesis/ processing conditions. For example, in some designs, it may be preferable for the position of maximum of this convoluted peak to range from around 2.375 Å to around 2.425 Å (in some designs, from around 2.375 Å to around 2.395 Å; in other designs, from around 2.395 Å to around 2.405 Å; in yet other designs, from around 2.405 Å to around 2.425 Å). The ratio of the intensity of the convoluted (first Si—Si and second C—C) to that of the first C—C peak should preferably be also within a certain range for optimum performance of the carbon-based composites with Si as active material. In some designs, it may be preferable for the ratio of such intensities to range from around 1.500 to around 6.500 (in some designs, from around 1.500 to around 3.000; in other designs, from around 3.000 to around 4.500; in yet other designs, from around 4.500 to around 6.500).

Figure 10:
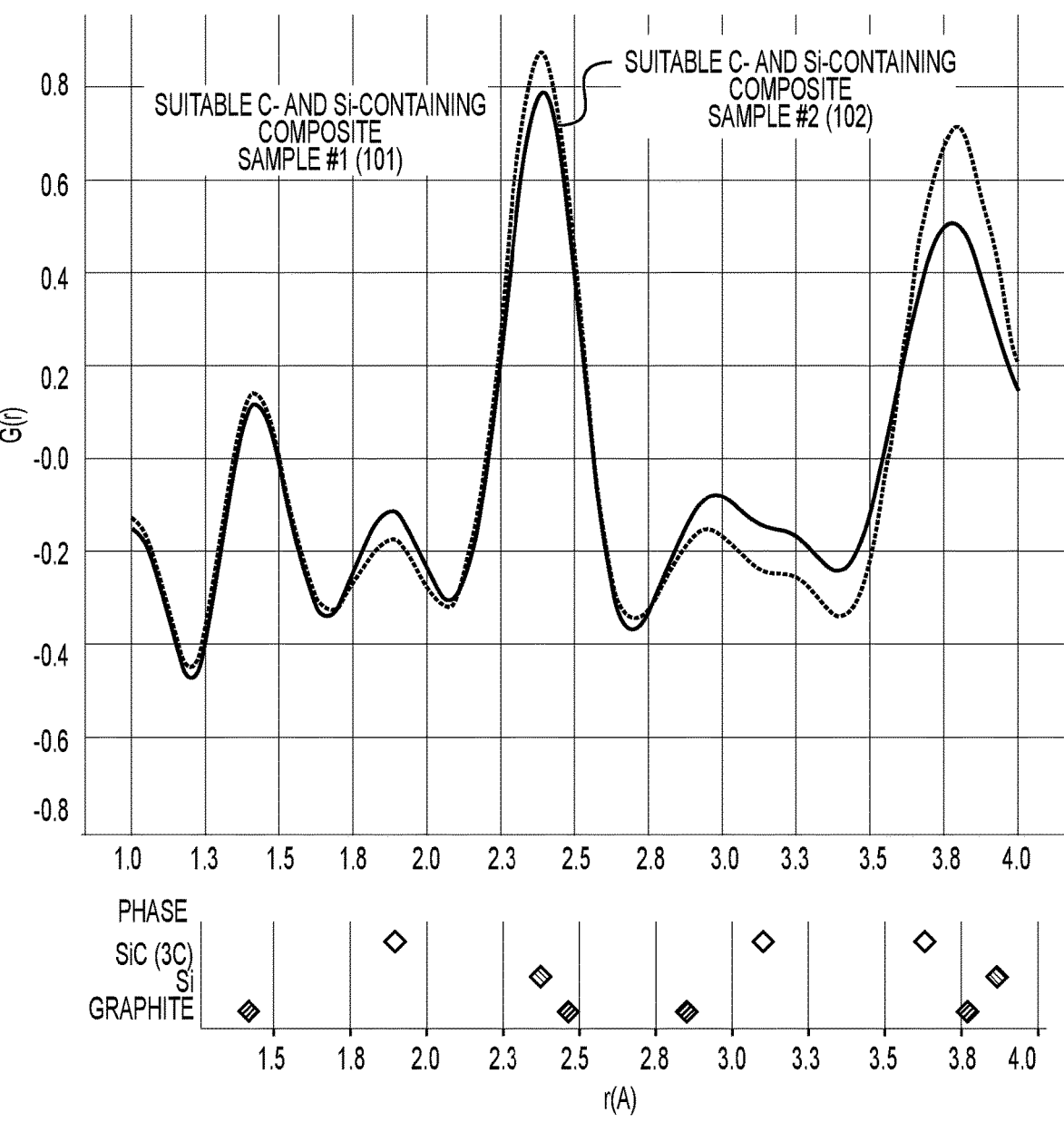
FIG. 10 shows graphical plots of atomic pair distribution function G(r) for composite materials comprising carbon and silicon active material.

FIG. 10 illustrates examples of the G(r) of illustrative suitable carbon-containing composites that comprise Si as active material. In these particular examples, the ratio of the intensity of the first Si—C pair bond to that of the first C—C pair bond in R(r) is around 0.642 and 0.522, respectively (with the example having 0.522 offering slightly superior performance). In these particular examples, the positions of maximum of the (first Si—Si and second C—C) convoluted peaks are around r=2.391 Å and r=2.385 Å, respectively (with the example having r=2.385 Å offering slightly superior performance). In these particular examples, ratio of the intensity of the convoluted (first Si—Si and second C—C) to that of the first C—C peak are around 3.333 and 3.363, respectively (with the example having 3.363 peak intensity ratio offering slightly superior performance).

In some designs, it may be advantageous (for various performance characteristics) for the carbon-containing composites (e.g., composite particles) to exhibit a certain spectral signature detected in Raman spectroscopy studies. In particular, in some designs, it may be advantageous for the ratio of intensities of the carbon D band and carbon G band ($I_D/I_G$) in the Raman spectra of the majority (e.g., about 50-100 wt. %) of composite particles (measured, for example, using the laser wavelength of about 532 nm; and analyzed, for example, in the spectral wavenumber range from about 1000 to about 2000 cm$^{-1}$ by fitting two Gaussian peaks after a linear background subtraction in this range) to range from $I_D/I_G$ of about 0.7 to $I_D/I_G$ of about 2.7 (in some designs, from about 0.9 to about 2.1). Note that these ranges use the ratio of the absolute intensities of the D and G peaks (obtained by fitting the spectra by two G peaks and two D peaks using Gaussian models and using the intensities/heights of the tallest G peak and the tallest D peak), and not the ratio of the integrated intensities (areas under each of the D and G peaks). However, in some designs, it may be advantageous for the ratio of the integrated intensities of the D peak to G peak (areas under the corresponding peaks) (obtained by fitting the spectra by two G peaks and two D peaks using Gaussian models, calculating the sum of the areas under both Gaussian model G peaks ($I_{G\ total\ area}$), calculating the sum of the areas under both Gaussian model D peaks ($I_{D\ total\ area}$) and calculating the ratio of these two sums: $I_{D\ total\ area}/I_{G\ total\ area}$) to range from about 0.7 to about 2.7 (or 4, in some designs).

In some designs, it may be advantageous for the full width at half maximum (FWHM) of the carbon G band in the Raman spectra of the majority of carbon-containing composite particles (measured, for example, using the laser wavelength of about 532 nm; and analyzed, for example, in the spectral wavenumber range from about 1000 to about 2000 cm$^{-1}$ by fitting two Gaussian peaks after a linear background subtraction in this range) to range from about 10 cm$^{-1}$ to about 150 cm$^{-1}$ (in some designs, from about 50 cm$^{-1}$ to about 100 cm$^{-1}$).

In some designs, the sources of carbon for the formation of suitable carbon-containing composites may include, but are not limited to: (i) various carbon-containing gases (e.g., various hydrocarbon (e.g., $C_5H_{12}$, $C_5H_{10}$, $C_5H_8$, $C_6H_6$, etc.) vapors; hydrocarbon gases (e.g., $CH_4$, $C_2H_2$, $C_2H_4$, $C_2H_6$, $C_3H_6$, $C_3H_8$, $C_3H_4$, $C_4H_{10}$, $C_4H_8$, $C_4H_6$, etc.), among others or their combinations), (ii) various carbon-containing liquids (e.g., solutions of monosaccharides, disaccharides and polysaccharides such as glucose, fructose, galactose, ribose, deoxyribose, sucrose, lactose, maltose, starch, alginate, amylose, amylopectin, glycogen, lignin, among others), crude oil, coal tar pitch, petroleum pitch, bio-pitch and their various solutions, plant-derived oils, propane, butane, ethane, various olefins and many other liquid hydrocarbons) and (iii) various carbon-containing solids (e.g., various nut shells (e.g., coconut shells, apricot shells, almond shells, among others), various pits (e.g., olive pits, cherry stone, apricot stone, peach stone, avocado stone, among others), various wood and wood waste products (e.g., saw dust), bamboo, grass/straw and (dry) leaves (e.g., banana fibers, rice husk, corncob, kelp, among others), coal and various saccharides and saccharide-comprising natural compounds, including monosaccharides, disaccharides and polysaccharides (glucose, fructose, galactose, ribose, deoxyribose, sucrose, lactose, maltose, starch, gum arabic, lignin, cellulose, chitin, alginate, amylose, amylopectin, glycogen, among others), various human wastes, various food processing wastes and food wastes, wastepaper products, various polymers (e.g., natural glycoproteins and their mixtures, phenolic and furfural resins including poly(furfuryl alcohol), rayon, polyethylene, polypropylene, nylons, polyurethanes, polylactide, polyglycolide, polyamides, polyaramids, polyethylene terephthalate, polyacrylonitrile, poly(p-phenylene vinylene), various polyoxymethylenes, various vinyl polymers, among many other known carbon polymer precursors)) and their various combinations, various metal (e.g., Mg, Al, Si, Zn, Sn, Sb, or Ti, etc.) or ammonium ($NH_3$) salts of various organic acids (e.g., lactic acid, acetic acid, formic acid, citric acid, oxalic acid, uric acid, malic acid, tartaric acid, carboxylic acids, etc.) or various organic acids (e.g., lactic acid, acetic acid, formic acid, citric acid, oxalic acid, uric acid, malic acid, tartaric acid, carboxylic acids, etc.) and their combinations, to provide a few illustrative examples. In some designs, inorganic residues (e.g., oxides or others) produced by (e.g., thermal) decomposition of some of such carbon precursors or carbon-comprising precursors (by carbonization) may be dissolved in (e.g., mild) acids or bases or, in some designs, converted to active material (e.g., Si) by known means (e.g., by magnesiothermic reduction of silicon oxide residues followed by dissolution of magnesium oxide or other suitable means).

In some designs, carbon comprising composite particles may be produced by first producing porous carbon and then infiltrating the pores with intercalation-type or conversion-type (including alloying-type) active materials. In some designs, such an infiltration process may be conducted by using vapor deposition techniques (such as CVD, atomic layer deposition (ALD), among others) or solution infiltration techniques (including a sol-gel or hydrothermal synthesis or layer-by-layer deposition or electrodeposition or electroless deposition or electrophoretic deposition or salt infiltration followed by solvent evaporation and decomposition or conversion in a controlled environment, among others) or melt-infiltration (e.g., infiltrating a precursor or a component of a precursor from a melt) or various combination(s) of more than one of such techniques (e.g., an infiltration of a precursor (e.g., inorganic or metal-organic or organometallic, etc.) salt(s) from solution or vapor phases or melt followed by annealing or heat-treatment in controlled gaseous environment—reducing (e.g., in $H_2$ or hydrogen-containing gases such as hydrocarbon gases or vapors, among others) or oxidizing (e.g., in O or F or Cl or S containing gases, among others) or neutral (e.g., as $N_2$ or Ar or He gases or vacuum), where the gaseous environment may comprise molecules comprising fluorine or hydrogen or oxygen or sulfur or phosphorous or lithium or sodium or potassium or calcium atoms, etc.). As such, in some designs, precursors may first be infiltrated and then converted to suitable intercalation-type or psuodocapacitive-type active materials by, for example, heat-treatment under a suitable gaseous (or vaporous) environment.

In some designs, as previously mentioned, an additional shelling (or pore-plugging) material layer may at least partially enclose (or coat) active materials, carbon or the whole composite particles. The maximum heat-treatment (e.g., in a controlled environment) temperature of such processes during the composite formation may vary depending on composite properties and composition of the intercalation-type active material (e.g., its thermal stability, mobility, reactivity in contact with carbon, etc.), but in some designs may be in a range from around 100° C. to around 1,100° C. (sometimes, from around 300 to around 800° C.). In some designs, more than one heat-treatment in different gaseous environments (e.g., initially in O- or F-containing and then in Ar or $N_2$) at different temperatures (e.g., from around 50° C. to around 1,100° C.) or pressures (e.g., from around 0.0001 Torr to 20,000 Torr; in some designs—near atmospheric pressure) and/or for different time durations (e.g., from around 0.0001 sec to around 240 hours) may be implemented to tune material synthesis (e.g., for the formation of composites with a desired active particle size residing primarily within the carbon pores and with a desired phase and stoichiometry of active material particles, etc.).

In some designs, synthesis of carbon-containing composites may involve mixing carbon powders (e.g., exfoliated carbon, graphene, activated carbon, carbon black, dendritic carbon, carbon nanotubes, etc.) with organic carbon precursors (e.g., starch, various sugars, cellulose and cellulose-derived products, alginate and alginate-derived products, pitch (e.g., mesophase pitch, plant-derived pitch, coal tar pitch, etc.) and its various components, coal, coal tar, lignins, gum arabic, various other polysaccharides, natural glycoproteins and their mixtures, phenolic and furfural resins including poly(furfuryl alcohol), ayon, polyethylene, polyacrylonitrile, poly(p-phenylene vinylene), various vinyl polymers, among many other known carbon precursors) and active material (nano)particles (e.g., silicon or silicon oxide or nitride in case of the formation of Si-based composites as illustrative example) or active material precursor (e.g., oxides and other salts; including salt solutions) (either in a dry state or in a solution/suspension) and carbonize such a mixture to obtain carbon-containing composites. In some designs, such mixtures may comprise just organic carbon precursors (e.g., polymers) and active material (or active material precursor) (without carbon particles). In an example, the temperature of the carbonization (pyrolysis) or the subsequent (e.g., to spraying or particle formation) heat treatment may vary depending on the active material composition and may range from around 300° C. to around 1200° C. (in some designs, from around 450° C. to around 1000° C.). In some designs, higher temperatures may lead to the undesirable reaction of active material or active material with carbon forming carbides and other undesirable compositions. In some designs, lower temperatures may limit rate performance and capacity of the produced composites.

In some designs, it may be advantageous to utilize a spray-drying technique or a spray pyrolysis technique as at least one of the stages in composite synthesis. In some designs, it may be advantageous to utilize hydrothermal (or solvothermal) treatment during at least one of the stages in composite synthesis (e.g., to induce oxidation or crystallization of the precursor at relatively low temperatures without burning/over-oxidizing carbon, etc.). In some designs, it may be advantageous to utilize hydrothermal treatment in combination with heat-treatment in a controlled environment (e.g., a reactive environment such as oxygen-containing or fluorine-containing at low temperatures (e.g., from around room temperature to around 350-400° C.) or inert at higher temperatures (e.g., from around 400° C. to around 600-1200° C., depending on a particular chemistry and its stability of active material in contact with carbon) or both).

In some designs, thus produced carbon/active material composite particles may be at least partially milled to produce the desired particle size distribution.

In some designs, thus produced carbon/active material composite particles may be further (at least partially) enclosed in a functional shelling (or pore-plugging) layer (e.g., to enhance electrical conductivity or to enhance ionic conductivity or to enhance wetting by electrolyte or to prevent undesirable interactions between electrolyte and active material or for other advantageous purposes). In some designs, the shelling material layer may preferentially coat either the active material or the carbon walls (e.g., by having different wetting or different nucleating time on the carbon surface vs. that of the active material). In some designs, the volume fraction of the functional shelling layer may range from around 0.001 vol. % to around 20 vol. % of the volume of the composite particles. In some designs, the functional shelling material layer may also act as "active" material in terms of its ion storage capability (e.g., exhibit capacity in the range from around 0.1% to around 75% of that of the active material when expressed in the units of capacity per unit mass, mAh/g, or capacity per unit volume, mAh/cc). In some designs, such a shelling material layer may be deposited by using vapor deposition techniques (such as CVD, ALD, among others), electrochemical deposition, electrodeposition, electroless deposition, electrophoretic deposition, layer-by-layer deposition or various other solution-based deposition techniques or combination of both solution and vapor depositions. In some designs, after the shelling material deposition, the composite may be heat-treated (e.g., at temperatures from around 100 to around 1000° C.) in a suitable gaseous environment (e.g., inert gas, such as $N_2$ or Ar or He, among others) or vacuum to enhance composite properties. In some designs, the average thickness of the shelling material layer may vary depending on the particle size, ionic and electrical conductivity of such a layer and/or other properties. In some designs, a suitable thickness (e.g., average thickness) of the shelling material layer may range from around 0.2 nm to around 200 nm, although a larger thickness may also be acceptable in some applications (although possibly at the expense of reduced volumetric capacity of the electrodes or reduced electrode porosity). In some designs, the shelling material layer may comprise carbon (C) (e.g., in some designs, mostly conductive $sp^2$-bonded carbon, as in graphite or graphitic carbon or turbostratic carbons or most amorphous carbons). In some designs, various carbon atoms comprising solvents or various hydrocarbon (e.g., $C_5H_{12}$, $C_5H_{10}$, $C_5H_8$, $C_6H_6$, etc.) vapors may be used as precursors for carbon deposition. In some designs, hydrocarbon gases (e.g., $CH_4$, $C_2H_2$, $C_2H_4$, $C_2H_6$, $C_3H_6$, $C_3H_8$, $C_3H_4$, $C_4H_{10}$, $C_4H_8$, $C_4H_6$, etc.) or their combinations may advantageously be used as precursors for carbon deposition. In some designs, viscoelastic polymers (including bio-derived ones, such as pitch) may be used as precursors for carbon layer formation. In some designs, the pitch may be derived from petroleum, coal tar, plants (including wood). In some designs, the shelling material layer may be a composite of two more materials. In some designs, the shelling material may comprise flake-shaped particles. In some designs, the shelling material may comprise one or more of the following elements: transition, alkali or alkaline-earth metal (such as iron (Fe), manganese (Mn), copper (Cu), yttrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur (S), selenium (Se), tellurium (Te), hydrogen (H) and carbon (C). In some designs, the shelling material layer may comprise a polymer. In some designs, a polymer used in the shelling material layer may exhibit high electrical and/or ionic conductivity (e.g., in the range from around $10^{-7}$ to around $10^{+4}$ S/cm). In some designs, a polymer layer in the shelling material layer may be at least partially carbonized. In some designs, the shelling material layer may comprise a glass or ceramic layer. In some designs, a glass or ceramic layer may exhibit high electrical and/or ionic conductivity (e.g., in the range from around $10^{-7}$ to around $10^{+4}$ S/cm). In some designs, the shelling material layer may comprise a metal or metal alloy.

In some designs, formation of suitable porous carbons may involve carbonization (e.g., by thermal annealing or by hydrothermal treatment or by other means) of a suitable organic precursor followed by chemical or physical activation and/or dissolution or conversion of inorganic residues. In some designs, formation of so-called hydrochars (carbons produced by hydrothermal treatment of the hydrocarbon precursors) may be advantageous relative to other carbonization techniques due to high carbon conversion efficiency, uniform distribution of oxygen in the material and other favorable characteristics. Suitable examples of the hydrochar precursors include, but are not limited to various nut shells (e.g., coconut shells, apricot shells, almond shells, among others), various pits (e.g., olive pits, cherry stone, apricot stone, peach stone, avocado stone, among others), various wood and wood waste products (e.g., saw dust), bamboo, grass/straw and (dry) leaves (e.g., banana fibers, rice husk, corncob, kelp, among others), various human wastes, various food processing wastes and food wastes, waste paper products, coal and coal tar pitch, petroleum pitch, crude oil, various saccharides, including monosaccharides, disaccharides and polysaccharides (glucose, fructose, galactose, ribose, deoxyribose, sucrose, lactose, maltose, starch, lignin, cellulose, amylose, amylopectin, glycogen, among other suitable precursors). In some designs, hydrochars may be annealed in an inert environment (e.g., in vacuum or in $N_2$ or Ar or He gas, etc.) prior to (e.g., the first) activation. Suitable temperatures may range from around 500° C. to around 2000° C., depending on the precursor and the desired porosity after activation. In some designs, heat-treatment at temperatures lower than around 500° C. may have little impact on activation and may not remove (a desired) amount of impurities (e.g., as effluent(s)). In some designs, heat-treatment at temperatures higher than around 2000° C. is very effective in obtaining high-purity material but may prevent one from achieving high BET SSA and retaining (sometimes desirable) small pores after activation.

In some designs, it may be advantageous to use so-called physical activation techniques (such as activation in a stream of $CO_2$ or $H_2O$ or both, among others) to induce additional pores and increase pore volume and surface area of carbons produced by carbonization. Suitable activation temperature may vary depending on the types of the carbons and pre-treatment history. However, as an example, suitable temperatures may be in the range from around 700° C. to around 1300° C. (in some designs—from around 800 to around 1150° C.). In an example, temperatures higher than around 1300° C. may make the activation process very difficult to control to a desired uniformity and may additionally induce undesirable pore size distribution within carbon. In another example, temperatures lower than around 700° C. may make the activation process too slow and may not achieve the desired pore size and surface area characteristics in the produced activated carbon.

In some designs, formation of suitable porous carbons (e.g., when attaining a larger pore volume) may involve the use of sacrificial template materials prior to carbonization and activation.

In some designs, formation of so-called hydrochars (carbons produced by hydrothermal treatment of the hydrocarbon precursors, including various biomaterials, such as shells, wood wastes, etc.) may be advantageous prior to activation.

In some designs, carbon precursors may be annealed in an inert environment (e.g., in vacuum or in $N_2$ or Ar or He gas, etc.) prior to activation. In some designs, suitable temperatures may range from around 500° C. to around 2800° C. (in some designs, from around 500° C. to around 800° C.; in other designs, from around 800° C. to around 1200° C.; in yet other designs, from around 1200° C. to around 1600° C.; in yet other designs, from around 1600° C. to around 2000° C.; in yet other designs, from around 2000° C. to around 2800° C.), depending on the precursor and the desired porosity after activation. In some designs, heat-treatment at temperatures lower than around 500° C. may have too little impact on activation and may not remove (a sometimes desired) amount of impurities (e.g., as effluent(s)). In some designs, heat-treatment at temperatures higher than around 2800° C. is very effective in obtaining high-purity material, but may prevent one from achieving high BET SSA and forming (sometimes desirable) small pores after activation.

In some designs, chemical activation may be used instead or in addition to physical activation. Examples of suitable chemical activation agents include, but are not limited to, KOH, NaOH, $ZnCl_2$, $H_3PO_4$, $K_2CO_3$, or $H_2SO_4$. In some designs, the carbonization stage proceeds concurrently with the chemical activation. In other designs, after carbonizing the precursor, the obtained carbon may then be mixed with chemical activation agent, heat-treated for activation and then purified.

In some designs (e.g., to maximize rate performance or battery stability), porous carbon may be annealed in an inert environment (e.g., in vacuum or in $N_2$ or Ar or He gas, etc.) after the activation. The annealing process may provide additional purification, may enhance electrical conductivity of carbon, may enhance mechanical properties of carbon, may reduce the number of nucleation cites (for deposition of active materials) and may lead to reduced self-discharge and other performance benefits in cells (e.g., better rate, better stability, etc.). In some designs, suitable temperatures may range from around 800° C. to around 2800° C. (in some designs, from around 800° C. to around 1200° C.; in yet other designs, from around 1200° C. to around 1400° C.; in yet other designs, from around 1400° C. to around 1800° C.; in yet other designs, from around 1800° C. to around 2800° C.), depending on the precursor and the desired porosity after activation. In some designs, heat-treatment at temperatures lower than around 800° C. may have too little impact on infiltration of active materials into the porous structure or bonding of active material with carbon or carbon conductivity or purity. In some designs, heat-treatment at temperatures higher than around 2800° C. may prevent one from achieving high BET SSA and induce excessive pore closer after the activation.

In some designs, porous carbons may be annealed and activated more than once (e.g., two or three or more times) in order to attain the most desirable characteristics for use in carbon-containing electrode composites. In some designs, different thermal treatment (annealing) temperatures may be intentionally used prior to the different activation procedures.

In some designs, it may be advantageous for the electrodes comprising conversion-type (including alloying-type or metal-type) active materials or intercalation-type or pseudocapacitive-type active materials to be prepared in certain ways or to comprise certain conductive or other additives.

In some designs, it may be advantageous to use nanoparticles (e.g., carbon black, including those that comprise linked carbon particles into larger agglomerates) or one dimensional (1D) conductive additives (such as single-walled carbon nanotubes, double-walled carbon nanotubes, multiwall carbon nanotubes, carbon (nano)fibers, compatible metal nanofibers, nanotubes and nanowires (e.g., copper, nickel, titanium, iron nanowires/nanofibers, aluminum nanowires/nanofibers, nickel nanowires/nanofibers, etc.)) or their combination in electrodes comprising the carbon containing composite electrode materials.

In some designs, it may be advantageous to attach conductive additives to the (nano)composite electrode particles by some mechanisms. In one example, conductive additives (e.g., carbon nanotubes or graphene or metal nanoparticles or metal nanowires) may be directly on the surface of the electrode particles (e.g., by CVD or by solution chemistry routes). In another example, the conductive particles (of various shapes and sizes) may be strongly attached to the surface of the electrode particles by making the surface of each (or most) particle(s) charged and by using the opposite charge on the electrode particles vs. conductive additive particles. In yet another example, the conductive particles may be attached to the surface of the electrode particles using an organic (e.g., a polymer) binder and by carbonizing the binder forming a conductive carbon interlayer (e.g., which effectively acts as a conductive glue) between the conductive additive(s) and the electrode particle(s). In yet another example, one may CVD deposit a carbon layer on the mixture of conductive additive particles and active electrode particles, thereby preferentially depositing carbon at the contact points between the electrode particles and conductive additives. In an example, the CVD carbon layer may similarly act as a conductive glue to strongly attach conductive additive(s) to the electrode particle(s).

In some designs, the optimal wt. % of slurry components, given as a ratio of the mass of non-active components to the external surface area of composite electrode particles, may exhibit values ranging from around 1 to around 5,000 m$^2$ active/g non-actives (e.g., from around 5 to around 200 m$^2$ active/g non-actives). In some designs, the optimal wt. % of slurry components for a particular electrode composition may depend on the size of the active particles, type of conductive additives, surface chemistry of the conductive additives, surface chemistry of the active particles, density of the particles, volume changes during cycling, type and molecular weight of the binder(s), thickness of the electrode, density of the electrode and/or other parameters.

In some applications, it may be advantageous to induce an opposite charge on the surface of conductive additives and the (composite) electrode particles in order to enhance their contact area and contact strength and achieve more uniform mixing. For example, a positive charge may be introduced on the surface of the composite particles and a negative charge may be introduced on the surface of conductive additives. In another example, a negative charge may be introduced on the surface of the composite particles and a positive charge may be introduced on the surface of conductive additives. In some applications, it may be advantageous to induce a chemical reaction between conductive additives and the electrode particles during or after electrode drying.

In some designs, it may be advantageous to use more than one type of conductive additive (e.g., having different dimensions, aspect ratio or morphology) for most optimal performance. In some designs, it may be further advantageous to chemically bond one type of conductive additive to the surface of electrode particles. In this case, as an example, the requirements on the lack of swelling for maintaining stability of the electrode particle/conductive additive interface may be substantially reduced or even completely avoided. In one example, short (e.g., around 0.01-10 micron) carbon nanofibers, carbon nanotubes, or graphene/graphite ribbons may be grown from the surface of electrode particles (e.g., by using catalyst-assisted chemical vapor deposition, CVD, or other mechanisms). In another example, a mixture of conductive carbon additive particles (e.g., carbon black, carbon nanotubes, etc.) with one charge and electrode particles with the opposite charge may be additionally mixed with a small sacrificial binder content and then carbonized. In some designs, the carbonized binder may firmly and permanently attach some of the carbon additives to the surface of the electrode particles. In an example, such electrode particles/carbon additives composites may be used in slurries with various suitable binders and additional conductive additives to form (or cast) more stable electrodes that experience moderate volume changes during cycling (e.g., as applicable in the context of one or more embodiments of the present disclosure).

In some applications, it may be advantageous to use two or more conductive additives with different surface charges or different surface chemistries. In particular, in some designs, when one type of additive exhibits higher affinity to the electrode particles, such an additive may be selected to form a uniform coating around the electrode particles. In some designs, such an additive may also be selected to form chemical bonds with the electrode particles at some stage of the electrode assembling or slurry preparation. As an example, the second additive may be incorporated into the binder in significantly higher fraction than the first additive and thus be optimized for forming robust and uniform binder/additive (nano)composites that yield stable electrodes.

In some applications, two or more conductive additives may be selected to achieve different functions. In one example, one type of additive (e.g., with larger dimensions or higher conductivity, such as carbon nanofibers, other conductive nanofibers, long (e.g., above around 10 micron in length) carbon nanotubes, graphite or graphene flakes with linear dimensions in excess of around 5-10 micron, other conductive flakes, metal nanowires, etc.) may be selected to provide higher electrical conductivity within the electrode as a whole, while the second type of conductive additive (e.g., carbon black and other conductive nanoparticles, shorter (e.g., around 0.25-10 micron in average length) carbon nanotubes or conductive nanowires or (e.g., chopped) conductive nanofibers, smaller graphene or graphite flakes, shorter graphite ribbons, etc.) may be selected to ensure that each individual electrode particle is effectively electrically connected to multiple neighboring electrode particles and the first type of additive, thereby forming an efficient conductive network that results in high capacity utilization of the electrode material. In another example one type of additive may be selected to perform multiple functions (e.g., to enhance both electrical conductivity and mechanical stability of the electrodes or to enhance electrical conductivity of the electrode and provide faster ionic pathways (e.g., if it is porous or if it prevents electrode pore closing)). In some designs, one type of conductive additive may also assist in better dispersing the second type during the slurry mixing. In particular, in some designs, it may be advantageous to use a mixture of two of the following types of conductive additives in the same slurry: (i) various types of single walled carbon nanotubes (SWCNTs) (with or without surface coatings); (ii) various types of double-walled (DWCNTs), triple-walled (TWCNTs) and other types of multiwalled carbon nanotubes (MWCNTs) (with or without surface coatings); (iii) various types of carbon black (including those that are annealed at above 1000° C. in inert environment); (iv) various types of carbon fibers (including those that are annealed at above 1000° C. in an inert environment); (v) various types of carbon nanofibers; (vi) various types of metal nanowires (without or with protective or functional surface coating layers) (e.g., Cu, Fe, Ti, or Ni nanowires for low potential anodes in Li-ion batteries, such as Si comprising anodes; Al nanowires for cathodes or high voltage anodes in Li-ion batteries, or other nanowires (e.g., Ni or Ti nanowires) for various aqueous batteries, etc.); (vii) various types of carbon-coated or metal—(e.g., Cu, Fe, Ni, Ti or Al, etc.) coated ceramic nanowires or fibers (e.g., $Al_2O_3$ nanowires or fibers); (viii) various types of carbon onions; (ix) various types of graphite ribbons (including metal-coated graphite ribbons); (x) various types of metal (e.g., Cu, Fe, Ni, Ti or Al, etc.) nanoparticles (with or without coatings by a protective or functional surface layer); and (xi) various types of metal (e.g., Cu, Fe, Ni, Ti or Al, etc.) (nano)flakes (with or without coatings by a protective or functional surface layer), to name a few examples. In some designs, the surface chemistry of each type of such additive could be individually optimized for optimum performance in cells.

In some applications, it may be advantageous to restrict the overall volume fraction of all conductive additive particles within the electrode to less than around 5 vol. % (even more preferably below around 2 vol. %). In some designs, by mass, the fraction of all conductive additive particles within the electrode may preferably be less than around 7 wt. % (e.g., even more preferably below around 3 wt. %) if only carbon materials are used as conductive additives and less than around 10 wt. % (e.g., even more preferably below around 5 wt. %) if some of the conductive additives comprise suitable metals. In an example, a higher volume fraction of conductive additives may reduce ionic transport and volumetric capacity of electrodes and may increase the extent of undesirable side reactions. In a further example, a higher gravimetric (mass) fraction of conductive additives may reduce the specific capacity of the electrodes.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A lithium-ion battery anode composition, comprising: a porous composite particle comprising carbon (C) and an active material comprising silicon (Si), wherein the carbon is characterized by a domain size (r), as estimated from an atomic pair distribution function G(r) obtained from a synchrotron x-ray diffraction measurement of the porous composite particle, ranging from around 10 Å (1 nm) to around 60 Å (6 nm).

Clause 2. The lithium-ion battery anode composition of clause 1, wherein the carbon is characterized by one or more of the following: (1) a domain size ranging between around 15 Å and around 19 Å, (2) a domain size ranging between around 19 Å and around 22 Å, (3) a domain size ranging between around 24 Å and around 28 Å, and (4) a domain size ranging between around 28 Å and 55 Å, and wherein the domain sizes are as estimated from the atomic pair distribution function G(r).

Clause 3. The lithium-ion battery anode composition of any of clauses 1 to 2, wherein the carbon comprises porous carbon.

Clause 4. The lithium-ion battery anode composition of any of clauses 1 to 3, wherein $G(r=r_1)$ is a value of the atomic pair distribution function at a real space position of a first coordination sphere of the carbon, wherein $G(r=r_2)$ is a value of the atomic pair distribution function at a real space position of a second coordination sphere of the carbon, and wherein a ratio $G(r=r_1)/G(r=r_2)$ is in a range of around 0.700 to around 0.590.

Clause 5. The lithium-ion battery anode composition of any of clauses 1 to 4, wherein $W(r=r_1)$ is a value of a full width at half maximum of the atomic pair distribution function at a real space position of a first coordination sphere of the carbon, wherein $W(r=r_2)$ is a value of a full width at half maximum of the atomic pair distribution function at a real space position of a second coordination sphere of the carbon; and wherein a ratio $W(r=r_1)/W(r=r_2)$ is in a range of around 0.700 to around 0.850.

Clause 6. The lithium-ion battery anode composition of any of clauses 1 to 5, wherein $G(r=r_1)$ is a value of the atomic pair distribution function at a real space position of a first coordination sphere of the carbon, wherein $G(r=r_3)$ is a value of the atomic pair distribution function at a real space position of a third coordination sphere of the carbon, and wherein a ratio $G(r=r_1)/G(r=r_3)$ is in a range of around 1.100 to around 1.300.

Clause 7. The lithium-ion battery anode composition of any of clauses 1 to 6, wherein $W(r=r_1)$ is a value of a full width at half maximum of the atomic pair distribution function at a real space position of a first coordination sphere of the carbon, wherein $W(r=r_3)$ is a value of a full width at half maximum of the atomic pair distribution function at a real space position of a third coordination sphere of the carbon, and wherein a ratio $W(r=r_1)/W(r=r_3)$ is in a range of around 0.600 to around 0.850.

Clause 8. The lithium-ion battery anode composition of any of clauses 1 to 7, wherein an anode comprising the anode composition exhibits an areal capacity loading that ranges from around 2 mAh/cm$^2$ to around 16 mAh/cm$^2$.

Clause 9. The lithium-ion battery anode composition of clause 8, wherein from around 10% to around 100% of the areal capacity loading of the anode is provided by composite particles that are each configured as the porous composite particle.

Clause 10. The lithium-ion battery anode composition of any of clauses 8 to 9, wherein the composite particles on average exhibit a silicon (Si) to carbon (C) weight ratio in the range from around 5:1 to 1:5.

Clause 11. The lithium-ion battery anode composition of any of clauses 1 to 10, wherein the porous composite particle is characterized by an average scattering domain size (r), as estimated from the atomic pair distribution function G(r), ranging from around 1 nm to around 40 nm.

Clause 12. The lithium-ion battery anode composition of clause 11, wherein the porous composite particle is characterized by the average scattering domain size (r) ranging from around 1 nm to around 10 nm.

Clause 13. The lithium-ion battery anode composition of any of clauses 1 to 12, wherein the porous composite particle on average comprises less than about 1 wt. % hydrogen (H), less than about 5 wt. % nitrogen (N) and less than about 2 wt. % oxygen (O).

Clause 14. The lithium-ion battery anode composition of any of clauses 1 to 13, wherein the porous composite particle on average exhibits uptake from around 1.5 wt. % to around 25 wt. % nitrogen (N) when heated in a nitrogen gas (N$_2$) at 1050° C. for a period of 2 hours, as measured on a powder that comprises the porous composite particle.

Clause 15. The lithium-ion battery anode composition of any of clauses 1 to 14, wherein the porous composite particle exhibits average uptake from around 0.5 wt. % to around 10 wt. % nitrogen (N) when heated in a nitrogen gas (N$_2$) at 850° C. for a period of 2 hours, as measured on a powder that comprises the porous composite particle.

Clause 16. The lithium-ion battery anode composition of any of clauses 1 to 15, wherein the porous composite particle forms from around 1 wt. % to around 100 wt. % silicon carbide (SiC) when heated in a nitrogen gas (N$_2$) or in an argon gas (Ar) in a temperature range from around 750° C. to around 950° C. for a period of 2 hours or more, as detected by X-ray diffraction (XRD) or Fourier Transform Infrared Spectroscopy (FTIR).

Clause 17. The lithium-ion battery anode composition of any of clauses 1 to 16, wherein the porous composite particle exhibits an average Brunauer—Emmett—Teller (BET) specific surface area in the range from around 1 to around 40 m$^2$/g, as measured using nitrogen sorption isotherm on a powder that comprises the porous composite particle.

Clause 18. The lithium-ion battery anode composition of any of clauses 1 to 17, wherein the porous composite particle exhibits average density in the range from around 0.9 g/cm$^3$ to around 2.2 g/cm$^3$, as measured using nitrogen or argon pycnometry on a powder that comprises the porous composite particle.

Clause 19. The lithium-ion battery anode composition of any of clauses 1 to 18, wherein the porous composite particle exhibits volume-average particle size in the range from around 0.2 micron to around 20 microns, as measured using scanning electron microscope (SEM) image analysis or particle scattering techniques on a powder that comprises the porous composite particle.

Clause 20. The lithium-ion battery anode composition of any of clauses 1 to 19, wherein Raman spectra of the porous composite particle exhibits carbon D and G peaks, wherein a ratio of average intensities of the D to G peaks (ID/IG) ranges from around 0.7 to around 2.7.

Clause 21. A Li-ion battery comprising: an anode comprising the lithium-ion battery anode composition of any of clauses 1 to 20, a cathode that is electrically separated from the anode; and an electrolyte ionically coupling the anode and the cathode.

Clause 22. The Li-ion battery of clause 21, wherein the battery capacity ranges from around 0.2 Ah to around 400 Ah.

Clause 23. The Li-ion battery of any of clauses 21 to 22, wherein $R(r=rSi—C)$ is a value of a radial distribution function $R(r)$ at a real space position of a first coordination sphere of a Si—C pair in the porous composite particle, wherein $R(r=rC—C)$ is a value of the radial distribution function $R(r)$ at a real space position of a first coordination sphere of a C—C pair in the porous composite particle, wherein the radial distribution function $R(r)$ and the atomic pair distribution function are related by $R(r)=R(r)=G(r)r+4\pi r^2 \rho_0$, $\rho_0$ being a constant relating to a number density of scatterers, and wherein a ratio $R(r=rSi—C)/R(r=rC—C)$ is in a range of 0.050 to around 1.000.

Clause 24. A carbon material for use in making an anode composition for use in a Li-ion battery, wherein the carbon material is characterized by a domain size (r), as estimated from an atomic pair distribution function G(r) obtained from a synchrotron x-ray diffraction measurement of the carbon material, ranging from around 10 Å (1 nm) to around 60 Å (6 nm).

Clause 25. The carbon material of clause 24, wherein the domain size (r) corresponds to one of the following: (1) a first domain size ranging between around 15 Å and around 19 Å, (2) a second domain size ranging between around 19 Å and around 22 Å, (3) a third domain size ranging between around 24 Å and around 28 Å, and (4) a fourth domain size ranging between around 40 Å and around 55 Å.

Clause 26. The carbon material of any of clauses 24 to 25, wherein the carbon material comprises porous carbon.

Clause 27. The carbon material of any of clauses 24 to 26, wherein $G(r=r_1)$ is a value of the atomic pair distribution function at a real space position of a first coordination sphere of the carbon material, wherein $G(r=r_2)$ is a value of the atomic pair distribution function at a real space position of a second coordination sphere of the carbon material, and wherein a ratio $G(r=r_1)/G(r=r_2)$ is in a range of around 0.700 to around 0.590.

Clause 28. The carbon material of any of clauses 24 to 27, wherein $W(r=r_1)$ is a value of a full width at half maximum of the atomic pair distribution function at a real space position of a first coordination sphere of the carbon material, wherein $W(r=r_2)$ is a value of a full width at half maximum of the atomic pair distribution function at a real space position of a second coordination sphere of the carbon material, and wherein a ratio $W(r=r_1)/W(r=r_2)$ is in a range of around 0.700 to around 0.850.

Clause 29. The carbon material of any of clauses 24 to 28, wherein $G(r=r_1)$ is a value of the atomic pair distribution function at a real space position of a first coordination sphere of the carbon material, wherein $G(r=r_3)$ is a value of the atomic pair distribution function at a real space position of a third coordination sphere of the carbon material, and wherein a ratio $G(r=r_1)/G(r=r_3)$ is in a range of around 1.100 to around 1.300.

Clause 30. The carbon material of any of clauses 24 to 29, wherein $W(r=r_1)$ is a value of a full width at half maximum of the atomic pair distribution function at a real space position of a first coordination sphere of the carbon material, wherein $W(r=r_3)$ is a value of a full width at half maximum of the atomic pair distribution function at a real space position of a third coordination sphere of the carbon material, and wherein a ratio $W(r=r_1)/W(r=r_3)$ is in a range of around 0.600 to around 0.850.

This description is provided to enable any person skilled in the art to make or use embodiments of the present invention. It will be appreciated, however, that the present invention is not limited to the particular formulations, process stages, and materials disclosed herein, as various modifications to these embodiments will be readily apparent to those skilled in the art. That is, the generic principles defined herein may be applied to other embodiments without departing from the spirit or scope of the invention.

The invention claimed is:

1. Porous composite particles, each of the porous composite particles comprising:
   carbon (C) atoms and silicon (Si) atoms; and
   a protective layer at least partially coating the porous composite particle,
   wherein:
   a weight ratio of the Si atoms to the C atoms is in a range of about 5:1 to about 1:5;
   each of the porous composite particles comprises active material;
   the active material comprises one or more of the following: (i) Si, (ii) Si doped with nitrogen (N), phosphorus (P), or boron (B), (iii) silicon oxide ($SiO_x$), (iv) $SiO_x$ partially reduced by Li or Mg, (v) silicon nitride ($SiN_x$) or silicon oxynitride ($SiO_xN_y$) or silicon hydride;
   the porous composite particles comprise C with a (002) carbon spacing in a range from about 4.40 Å to about 3.45 Å;
   at least some of the C atoms are in the form of porous carbon that comprises pores that are infiltrated with nanoparticles of the active material; and
   around 50 wt. % to around 100 wt. % of the active material is confined within the pores.

2. The porous composite particles of claim 1, wherein: the (002) carbon spacing is in a range from about 4.40 Å to about 4.00 Å.

3. The porous composite particles of claim 1, wherein: the (002) carbon spacing is in a range from about 4.00 Å to about 3.80 Å.

4. The porous composite particles of claim 1, wherein: about 90% to about 100% of the carbon atoms are present in the form of $sp^2$-bonded carbon atoms.

5. The porous composite particles of claim 1, wherein the porous composite particles comprise less than about 2 wt. % of hydrogen (H) atoms.

6. The porous composite particles of claim 1, wherein the porous composite particles comprise from about 0 wt. % to about 5 wt. % of nitrogen (N) atoms.

7. The porous composite particles of claim 1, wherein the porous composite particles comprise from about 0 wt. % to about 5 wt. % of oxygen (O) atoms.

8. The porous composite particles of claim 1, wherein a volume-average size of crystalline grains of the active material is in a range of about 0.5 nm to about 200 nm.

9. The porous composite particles of claim 1, wherein:
   the porous composite particles are characterized by a Brunauer-Emmett-Teller (BET) specific surface area (SSA) in a range of around 1 $m^2/g$ to around 100 $m^2/g$.

10. The porous composite particles of claim 9, wherein: the BET SSA is in a range of around 1 $m^2/g$ to around 40 $m^2/g$.

11. The porous composite particles of claim 1, wherein:
   the porous composite particles exhibit, during annealing in nitrogen ($N_2$) gas for a period of 2 hours at 1050° C., a nitrogen uptake in a range of about 1.5 wt. % to about 25 wt. % of a total weight of the porous composite particles.

12. The porous composite particles of claim 1, wherein:
   the porous composite particles exhibit, during annealing in nitrogen ($N_2$) gas for a period of 2 hours at 850° C., a nitrogen uptake in a range of about 0.5 wt. % to about 10 wt. % of a total weight of the porous composite particles.

13. The porous composite particles of claim 1, wherein:
   The porous composite particles form, during annealing in argon (Ar) gas for a period of 2 hours or more in a temperature range of 750° C. to 950° C., silicon carbide (SiC) at a weight fraction in a range of 1 wt. % to 100 wt. %.

14. The porous composite particles of claim 1, wherein:
   the porous composite particles, as a material for an anode of a Li-ion battery, exhibits a decrease in specific capacity in a range of about 2% to about 25% upon annealing in nitrogen ($N_2$) gas for a period of 2 hours at 750° C.

15. The porous composite particles of claim 1, wherein:
   the porous composite particles exhibit a true density in a range of around 0.9 $g/cm^3$ to around 2.2 $g/cm^3$, as measured by $N_2$ pycnometry.

16. The porous composite particles of claim 1, wherein:
   the porous composite particles are characterized by a Raman spectrum exhibiting a carbon D band and a carbon G band; and
   an $I_D/I_G$ ratio, defined as an intensity of the carbon D band ($I_D$) divided by an intensity of the carbon G band ($I_G$), is in a range of about 0.7 to about 2.7.

17. The porous composite particles of claim 16, wherein: the $I_D/I_G$ ratio is in a range of about 0.9 to about 2.1.

18. The porous composite particles of claim 16, wherein: the Raman spectrum is measured at a laser wavelength of about 532 nm.

19. The porous composite particles of claim 16, wherein: the $I_D$ and the $I_G$ are estimated by (i) performing a linear background subtraction on the Raman spectrum in a spectral wavenumber range of about 1000 cm$^{-1}$ to about 2000 cm$^{-1}$, and (ii) curve-fitting two Gaussian peaks to the linear background-subtracted Raman spectrum in the spectral wavenumber range.

20. The porous composite particles of claim 1, wherein:

the porous composite particles are characterized by a Raman spectrum exhibiting a carbon D band and a carbon G band; and a full width at half-maximum (FWHM) of the carbon G band is in a range about 10 cm$^{-1}$ to about 150 cm$^{-1}$.

21. The porous composite particles of claim 20, wherein: the FWHM is in a range about 50 cm$^{-1}$ to about 100 cm$^{-1}$.

22. The porous composite particles of claim 20, wherein: the Raman spectrum is measured at a laser wavelength of about 532 nm.

23. The porous composite particles of claim 20, wherein:

the FWHM is estimated by (i) performing a linear background subtraction on the Raman spectrum in a spectral wavenumber range of about 1000 cm$^{-1}$ to about 2000 cm$^{-1}$, and (ii) curve-fitting two Gaussian peaks to the linear background-subtracted Raman spectrum in the spectral wavenumber range.

24. A Li-ion battery comprising:

an anode comprising the porous composite particles of claim 1;

a cathode; and an electrolyte ionically coupling the anode and the cathode.

25. The Li-ion battery of claim 24, wherein:

the anode comprises graphite mixed with the porous composite particles.

26. The Li-ion battery of claim 25, wherein:

a weight fraction of the porous composite particles is in a range of about 1 wt. % to about 99 wt. %; and the weight fraction is defined as a mass of the porous composite particles divided by a sum of the mass of the porous composite particles and a mass of the graphite.

27. The Li-ion battery of claim 24, wherein:

an areal capacity of the anode is in a range from about 2 mAh/cm$^2$ to about 8 mAh/cm$^2$.

28. The Li-ion battery of claim 24, wherein:

a capacity of the Li-ion battery is in a range of about 0.2 Ah to about 400 Ah.

\* \* \* \* \*